(12) United States Patent
Yoneda et al.

(10) Patent No.: US 12,438,311 B2
(45) Date of Patent: Oct. 7, 2025

(54) CONNECTOR AND CONNECTOR ASSEMBLY INCLUDING AT LEAST ONE CURRENT SENSOR

(71) Applicant: HOSIDEN CORPORATION, Yao (JP)

(72) Inventors: Kotaro Yoneda, Yao (JP); Hayato Kondo, Yao (JP)

(73) Assignee: HOSIDEN CORPORATION, Yao (JP)

( * ) Notice: Subject to any disclaimer, the term of this patent is extended or adjusted under 35 U.S.C. 154(b) by 326 days.

(21) Appl. No.: 18/196,563

(22) Filed: May 12, 2023

(65) Prior Publication Data

US 2024/0006825 A1 Jan. 4, 2024

(30) Foreign Application Priority Data

Jun. 29, 2022 (JP) .................... 2022-104986

(51) Int. Cl.
*H01R 13/66* (2006.01)
*H01R 12/72* (2011.01)
*H01R 13/6594* (2011.01)

(52) U.S. Cl.
CPC ....... *H01R 13/6683* (2013.01); *H01R 12/722* (2013.01); *H01R 13/6594* (2013.01)

(58) Field of Classification Search
CPC .............. H01R 13/6683; H01R 12/722; H01R 13/6594
USPC ..................................................... 439/78–79
See application file for complete search history.

(56) References Cited

U.S. PATENT DOCUMENTS

| | | | |
|---|---|---|---|
| 7,607,925 B2* | 10/2009 | Chuang | G09G 5/006 439/620.08 |
| 2012/0094509 A1* | 4/2012 | Bryan | B60Q 11/005 439/76.1 |
| 2012/0164850 A1* | 6/2012 | Kobayashi | G01N 27/4062 439/55 |
| 2015/0233980 A1 | 8/2015 | Umetsu et al. | |

FOREIGN PATENT DOCUMENTS

JP       2015-153641 A       8/2015

* cited by examiner

*Primary Examiner* — Hae Moon Hyeon
(74) *Attorney, Agent, or Firm* — Kilyk & Bowersox, P.L.L.C.

(57) ABSTRACT

A connector including a body having an insulating property, at least one terminal, a circuit board fixed to the body, and at least one current sensor mounted on the circuit board. The or each terminal includes a distal portion, an externally connectable lead portion, and a body portion therebetween. The distal portion protrudes from the body to one side in the first direction or is exposed from the body. The body portion is at least partly held by the body, and includes a measurement target extending in first and second directions and being disposed inside the body. The circuit board is spaced from the measurement target or targets of the at least one terminal in a third direction. The or each current sensor is disposed near the or a corresponding measurement target and configured to perform a non-contact detection of a current flowing through the or a corresponding terminal.

20 Claims, 22 Drawing Sheets

CONNECTOR AND CONNECTOR ASSEMBLY INCLUDING AT LEAST ONE CURRENT SENSOR

CROSS-REFERENCE TO RELATED APPLICATIONS

The present application claims priority under 35 U.S.C. § 119 of Japanese Patent Application No. 2022-104986 filed on Jun. 29, 2022, the disclosure of which is expressly incorporated by reference herein in its entirety.

BACKGROUND OF THE INVENTION

Technical Field

The invention relates to connectors and connector assemblies.

Background Art

Patent Publication No. JP 2015-153641 A discloses a conventional connector for a power supply device. The connector includes an electrically conductive shell, a plurality of terminals, an insulating body, an internal circuit board, a plurality of current sensors, and a plurality of signal lines. The shell has a generally tubular shape. Each of the terminals is a metal plate extending in the axial direction of the shell, and includes a distal portion, an intermediate portion, and a rear portion. The body holds the intermediate portions of the terminals in spaced relation in a direction substantially orthogonal to the axial direction, and is housed in the shell together with the distal portions and the intermediate portions of the terminals. The internal circuit board is held by the body and located below the intermediate portions of the terminals. The current sensors are giant magneto resistive effect (GMR) sensors mounted on the internal circuit board and configured to respectively detect magnetic fields generated by currents flowing through the terminals. The signal lines are electrically connected to the respective current sensors via the internal circuit board, and are led out of the body and the shell.

SUMMARY OF INVENTION

The invention provides a novel connector and a connector assembly.

A connector according to an aspect of the invention includes a body having an insulating property, at least one first terminal, an internal circuit board, and at least one current sensor. The or each first terminal includes a distal portion, a lead portion, and a body portion. The distal portion extends in a first direction. The distal portion protrudes from the body to one side in the first direction or is exposed from the body. The lead portion is externally connectable. The body portion is provided between the distal portion and the lead portion, extends in the first direction and a second direction, and is at least partly held by the body. The body portion includes a measurement target. The measurement target extends in the first and second directions and is disposed inside the body. The second direction is substantially orthogonal to the first direction. The internal circuit board is fixed to the body and disposed in spaced relation to the measurement target or targets of the at least one first terminal in a third direction. The third direction is substantially orthogonal to the first and second directions. The at least one current sensor is mounted on the internal circuit board. The or each current sensor is disposed near the measurement target of the or a corresponding first terminal and configured to perform a non-contact detection of a current flowing through the or a corresponding first terminal. Such a novel connector has been obtained.

The or each current sensor may be disposed in spaced relation to the measurement target of the or a corresponding first terminal in the third direction, and disposed such as to at least partly overlaps, in the third direction, a projected area of the measurement target of the or a corresponding first terminal.

The internal circuit board may be disposed on one side in the third direction relative to the measurement target or targets of the at least one first terminal. The or each current sensor may be disposed on the one or other side in the third direction relative to the internal circuit board and on the one side in the third direction relative to the measurement target of the or a corresponding first terminal.

The or each current sensor may be disposed on one side or the other side in the third direction relative to the internal circuit board and on the other side in the third direction relative to the measurement target of the or a corresponding first terminal. The internal circuit board may be disposed on the other side in the third direction relative to the measurement target or targets of the at least one first terminal.

The connector according to any of the above aspects may further include at least one shield having electrical conductivity. The or each shield may include at least one, or at least two, of a first plate, a second plate, or a third plate.

The first plate may be fixed to the internal circuit board and disposed in spaced relation to, and on one side in the second direction or the one side in the first direction relative to, the or a corresponding current sensor and the measurement target of the or a corresponding first terminal.

The second plate may be fixed to the internal circuit board and disposed in spaced relation to, and on the other side in the second direction or the other side in the first direction relative to, the or a corresponding current sensor and the measurement target of the or a corresponding first terminal.

The third plate may be contiguous with at least one of the first plate or the second plate, and disposed in spaced relation to, and on one side or the other side in the third direction relative to, the measurement target or targets of the corresponding one first terminal.

The lead portion of the or each first terminal may extend in the third direction or an oblique direction. The oblique direction may include components of the other side in the first direction and the other side in the third direction. The lead portion of the or each first terminal may include a mounting portion. The mounting portion may be an end portion on the other side in the third direction of the lead portion and may extend to the other side in the third direction or to the other side in the first direction.

The lead portion of the or each first terminal may be disposed on the one side in the second direction relative to the body. In this case, the body portion may be bent in a generally L shape. The mounting portion of the lead portion is an end portion on the other side in the third direction of the lead portion of the or each first terminal, and may extend to the other side in the third direction, to the one side in the second direction, or to the other side in the second direction.

In the or each first terminal, the measurement target may have a dimension in a first perpendicular direction that is larger than a dimension in a second perpendicular direction of a contact portion of the distal portion, and than a dimension in a third perpendicular direction of the mounting portion of the lead portion. The first perpendicular direction may be substantially perpendicular to a direction in which a current flows through the measurement target of the or each first terminal. The second perpendicular direction may be substantially perpendicular to a direction in which a current flows through the contact portion of the or each first terminal. The third perpendicular direction may be substantially perpendicular to a direction in which a current flows through the mounting portion of the or each first terminal.

Any of the above connectors may further include at least one second terminal.

The or each second terminal includes a distal portion, a lead portion, and a body portion. The distal portion of the or each second terminal may extend in the first direction. The distal portion of the or each second terminal may protrude from the body to the one side in the first direction or be exposed from the body. The body portion of the or each second terminal may be provided between the distal portion and the lead portion of the or each second terminal, may extend in the first and second directions, and may be at least partly held by the body. The lead portion of the or each second terminal is only required to be externally connectable. The lead portion of the or each second terminal may extend in the third direction or the oblique direction. The lead portion of the or each second terminal may include a mounting portion. The mounting portion of the lead portion of the or each second terminal may be an end portion on the other side in the third direction of the lead portion of the or each second terminal and may extend to the other side in the third direction or to the other side in the first direction. The lead portion of the or each second terminal may be disposed on the other side in the second direction relative to the body. In this case, the body portion of the or each second terminal may be bent in a generally L shape. The mounting portion of the lead portion of the or each second terminal may be an end portion on the other side in the third direction of the lead portion of the or each second terminal, and may extend to the other side in the third direction, to the other side in the second direction, or to the one side in the second direction.

The body may include a housing portion. The housing portion may include a housing space extending in the second direction and opening to one side in the third direction. The internal circuit board may be housed in the housing space from the one side in the third direction and held by the housing portion at least in the first and second directions.

The body may further include at least one positioning portion on the housing portion. The at least one positioning portion may be configured to position the internal circuit board relative to the measurement target or targets of the at least one first terminal in the third direction.

The at least one positioning portion may include a first positioning portion. The first positioning portion may abut on the internal circuit board from the other side in the third direction, directly or indirectly via an additional member.

The housing portion may further include at least one through hole extending in the third direction, communicating with the housing space, and opening out from the body to the other side in the third direction.

The at least one through hole may extend through the first positioning portion in the third direction. The at least one through hole may extend through the bottom of the housing space of the housing portion.

The lead portion of the or each first terminal may extend in the third direction. The mounting portion of the lead portion of the or each first terminal may be an end portion on the other side in the third direction of the lead portion, may extend to the other side in the third direction, and may be located on the other side in the third direction relative to the body.

The connector may further include at least one third terminal. The at least one third terminal may include an internal connecting portion and an external connecting portion.

The internal connecting portion of the or each third terminal may be connected to the internal circuit board.

The or each third terminal may extend in the third direction through the or a corresponding through hole of the body. The internal connecting portion of the or each third terminal may be an end portion on the one side in the third direction of the or each third terminal and may be connected to the internal circuit board. The external connecting portion of the or each third terminal may be an end portion on the other side in the third direction of the or each third terminal and may protrude from the or a corresponding through hole to the other side in the third direction.

Any of the above connectors may further include at least one first connecting member. The external connecting portion of the or each third terminal may be connected to the or a corresponding first connecting member.

Any of the above-described connectors may further include a shell having electrical conductivity. The shell may include a shell body, at least one first leg, and at least one second leg. The shell body may have a generally inverted U- or O-shape in a cross-sectional view taken along the second and third directions and may house the body. The at least one first leg may extend from the shell body to the other side in the third direction or to one side in the second direction. The at least one second leg may extend from the shell body to the other side in the third direction or to the other side in the second direction.

Any of the above-described connectors may further include at least one communication element mounted on the internal circuit board and connected to the at least one current sensor via the internal circuit board. The or each communication element may be configured to acquire a current value of a current flowing through the or a corresponding first terminal based on an output signal of the or a corresponding current sensor and output the acquired current value to a wireless antenna.

A connector assembly of an aspect of the invention may include any of the above-described connectors and an external circuit board mounted with the connector.

The external circuit board may include at least one first electrode. The mounting portion of the or each first terminal of the connector may be connected to the or a corresponding first electrode.

The external circuit board may further include at least one second electrode. The mounting portion of the or each second terminal of the connector may be connected to the or a corresponding second electrode.

The external circuit board may further include at least one third electrode. The external connecting portion of the or each third terminal of the connector may be connected to the or a corresponding third electrode.

The at least one first electrode may be a through-hole electrode. The at least one second electrode may be a through-hole electrode. The at least one third electrode may be a through-hole electrode. The mounting portion of the or each first terminal of the connector may be received in, and connected to, the or a corresponding first electrode. The mounting portion of the or each second terminal of the connector may be received in, and connected to, the or a corresponding second electrode. The external connecting portion of the or each third terminal of the connector may be received in, and connected to, the or a corresponding third electrode.

The external circuit board may further include at least one fourth electrode and at least one fifth electrode. The or each first leg of the shell of the connector may be connected to the or a corresponding fourth electrode. The or each second leg of the shell of the connector may be connected to the or a corresponding fifth electrode.

Figure 1A:
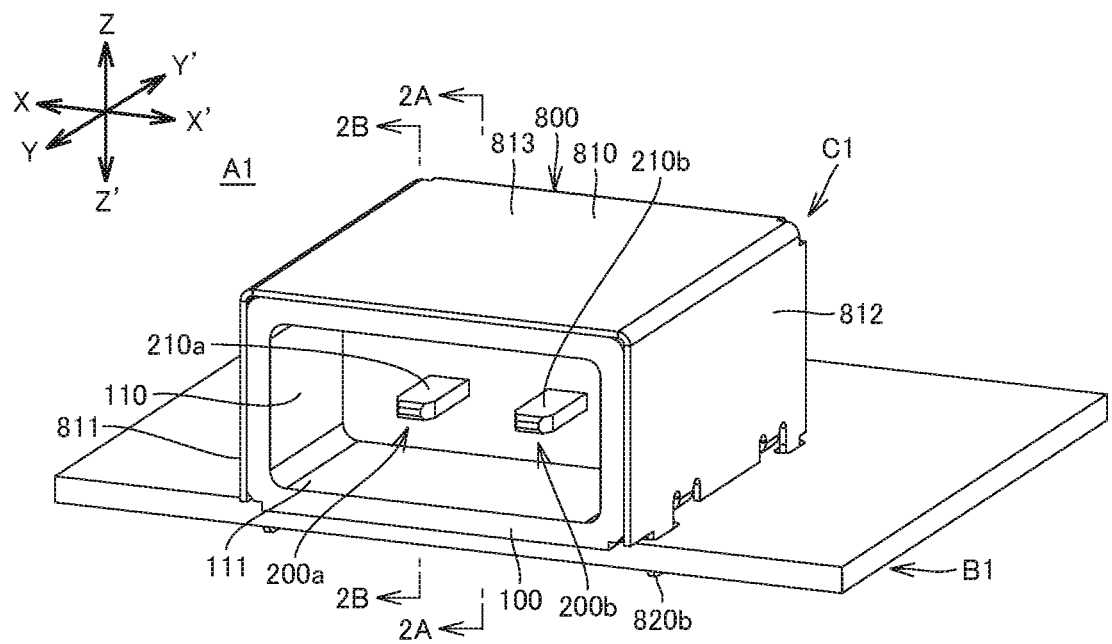
FIG. 1A is a front, top, right side perspective view of a connector assembly according to a first embodiment of the invention.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the connectors and connector assemblies, as well as their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

Hereinafter described are a plurality of embodiments, including first, second, and third embodiments and variants thereof, of the invention. It should be noted that constituents of the embodiments and their variants to be described can be combined in any possible manner. It should also be noted that the materials, the shapes, the dimensions, the numbers, the arrangements, etc. of the constituents of the embodiments and their variants to be described are presented by way of example only and can be modified in any manner as long as the same functions can be fulfilled.

First Embodiment

Figure 1B:
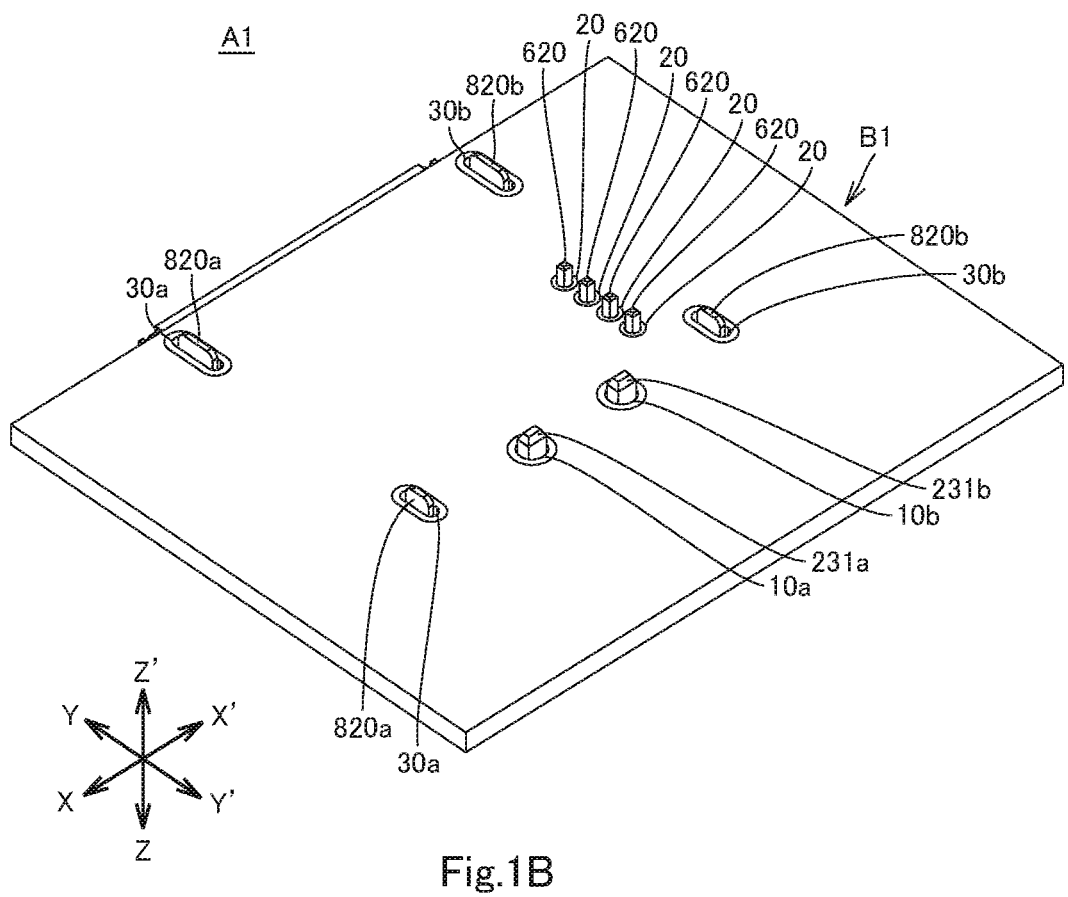
FIG. 1B is a rear, bottom, left side perspective view of the connector assembly according to the first embodiment.
Figure 2A:
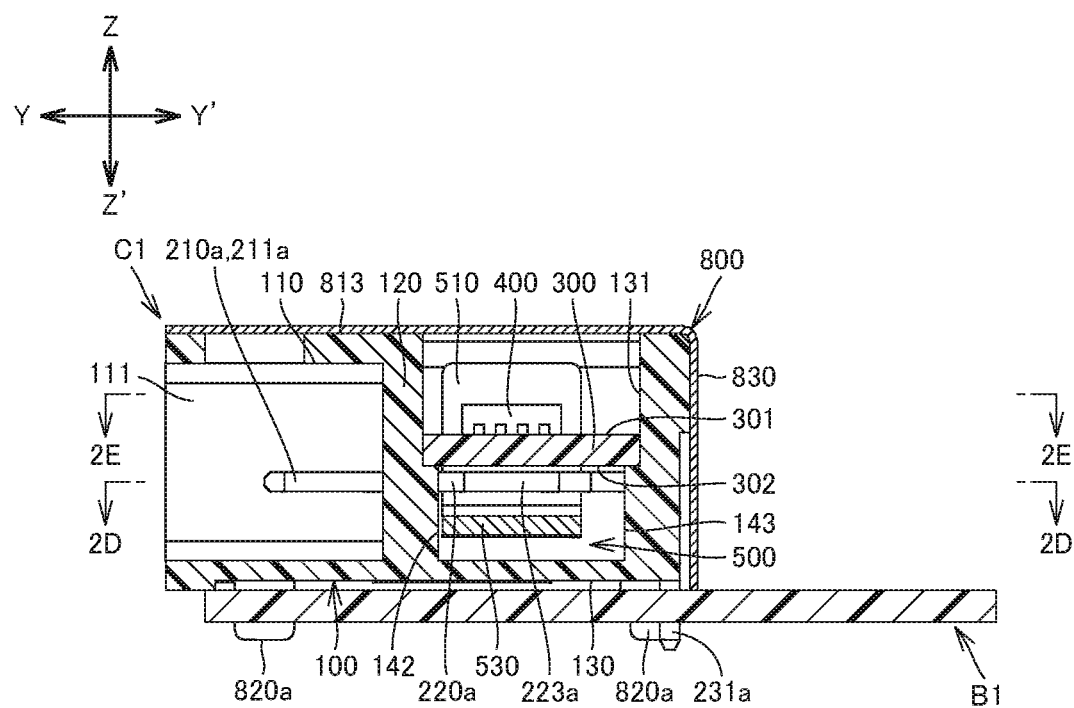
FIG. 2A is a cross-sectional view of a connector of the first embodiment, taken along line 2A-2A in FIG. 1A.
Figure 2B:
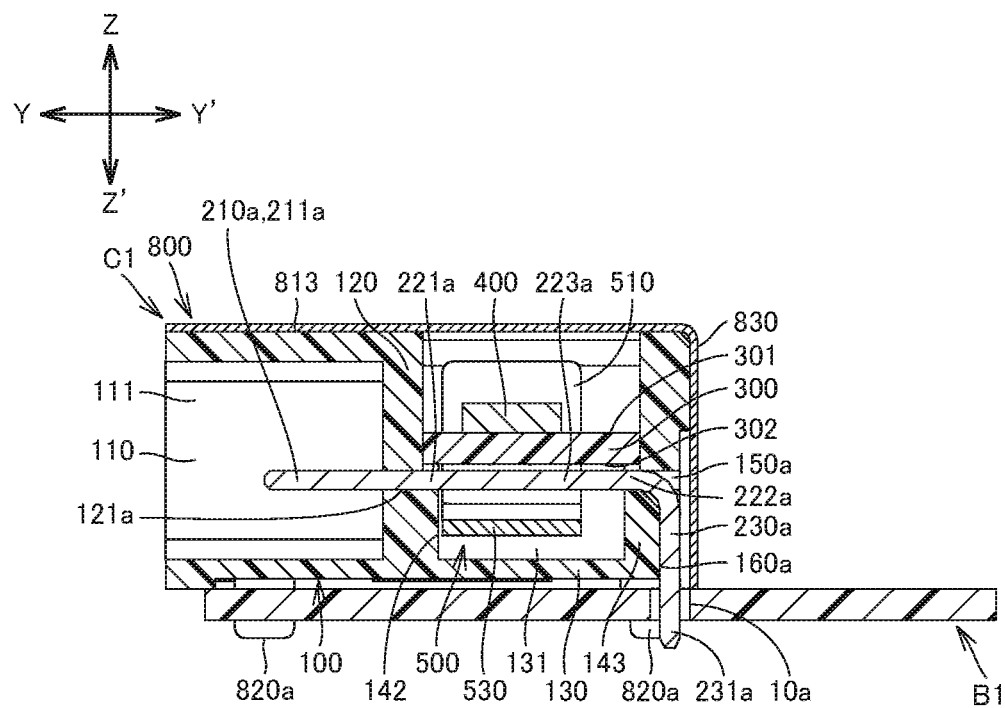
FIG. 2B is a cross-sectional view of the connector of the first embodiment, taken along line 2B-2B in FIG. 1A.
Figure 2C:
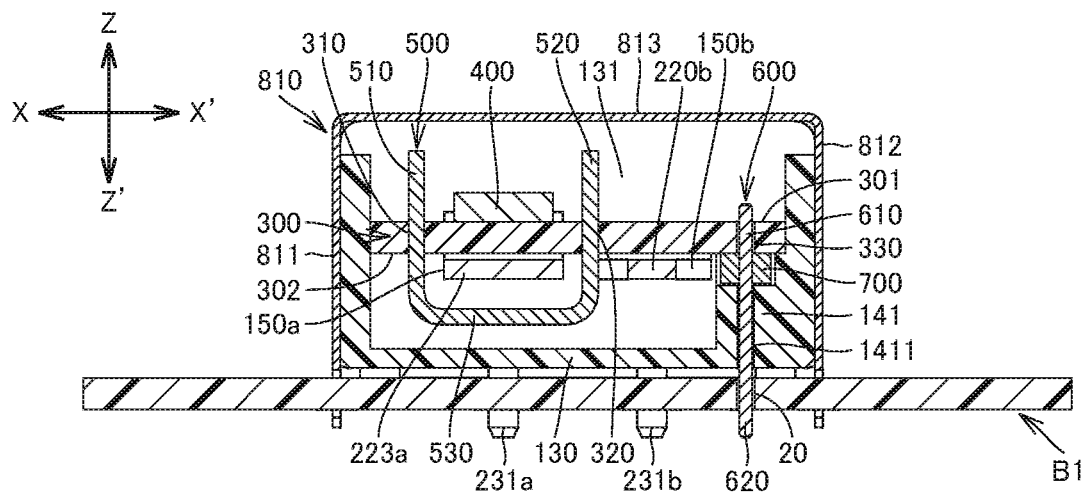
FIG. 2C is a cross-sectional view of the connector of the first embodiment, taken along line 2C-2C in FIG. 2E.
Figure 2D:
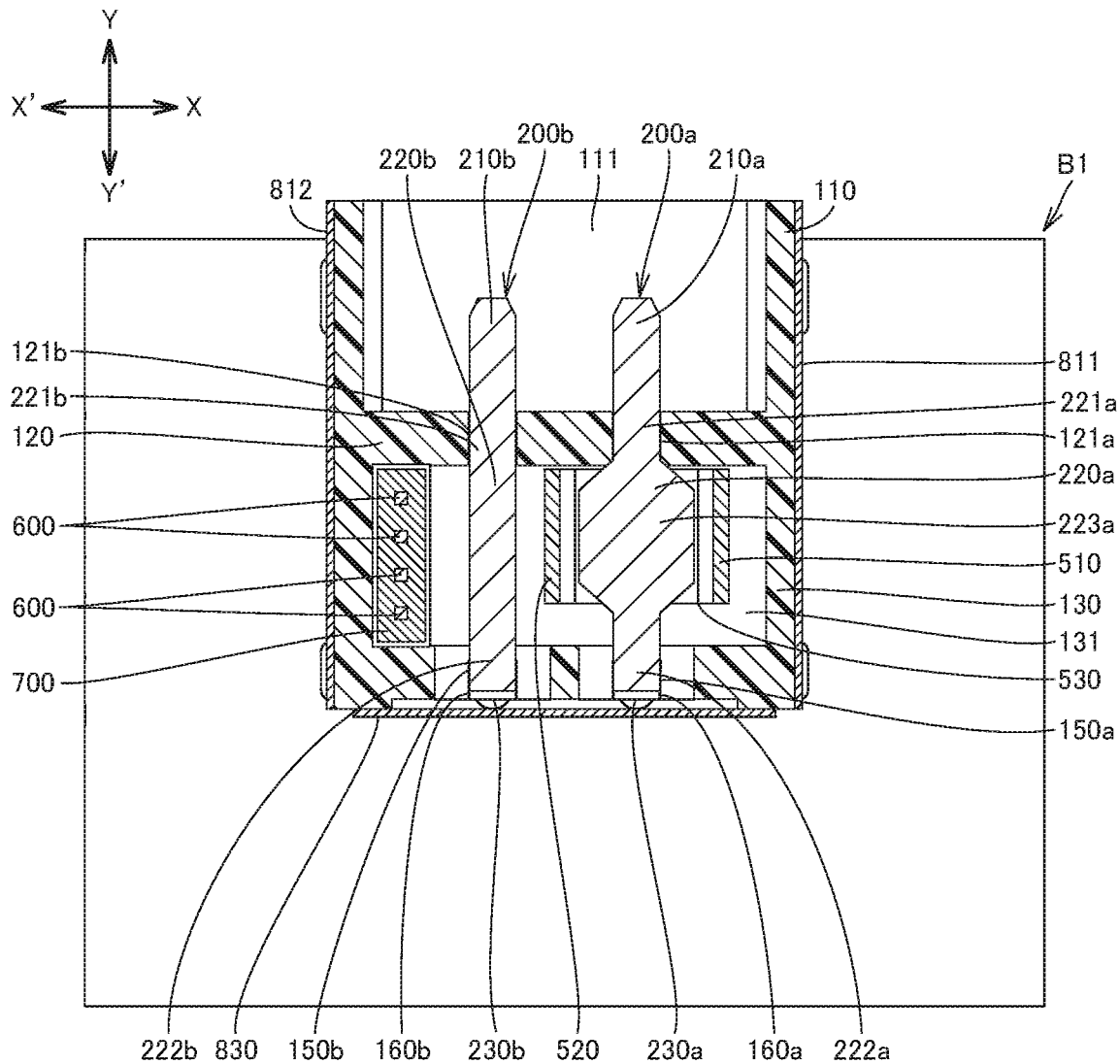
FIG. 2D is a cross-sectional view of the connector of the first embodiment, taken along line 2D-2D in FIG. 2A.
Figure 2E:
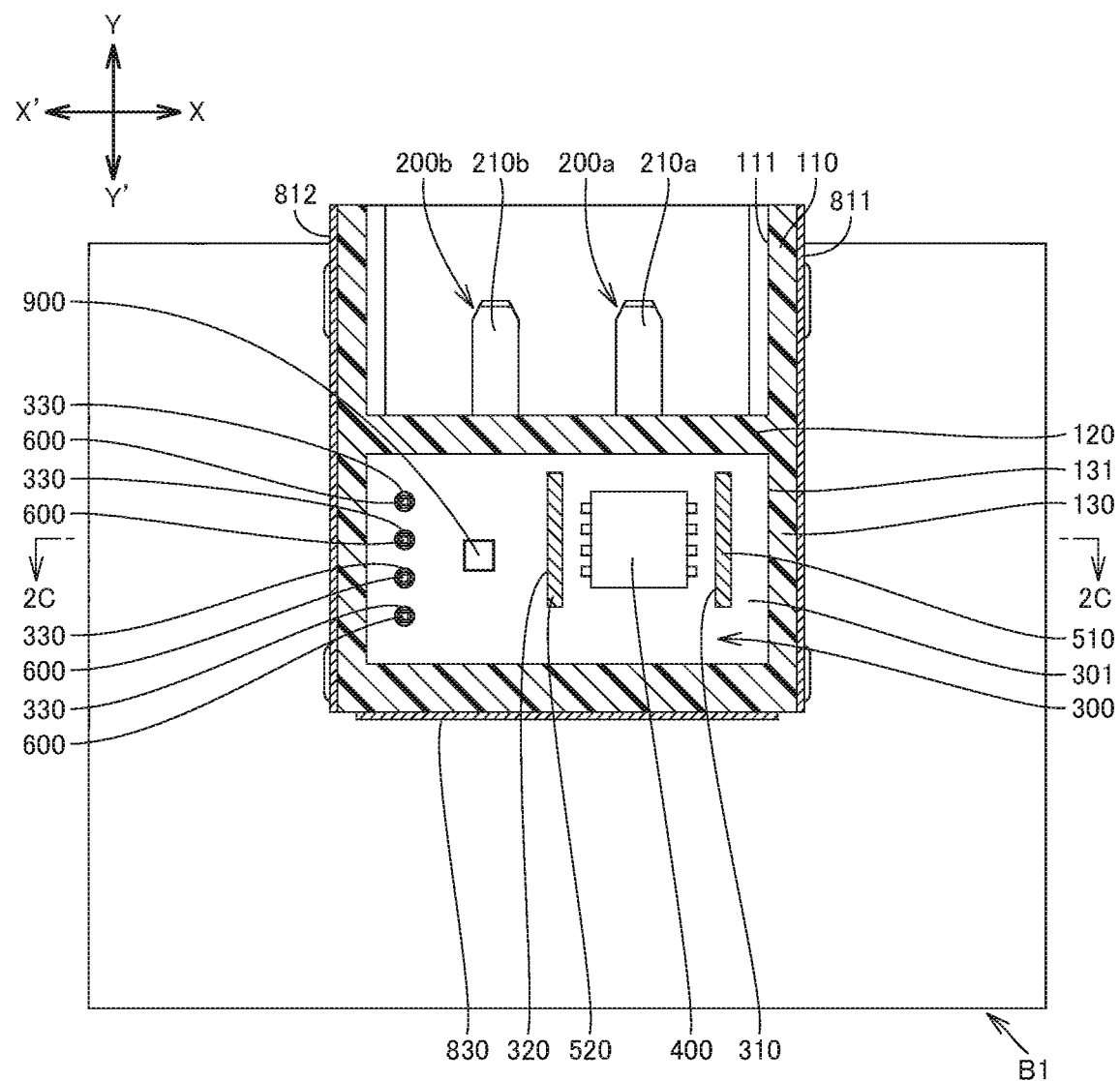
FIG. 2E is a cross-sectional view of the connector of the first embodiment, taken along line 2E-2E in FIG. 2A.
Figure 3A:
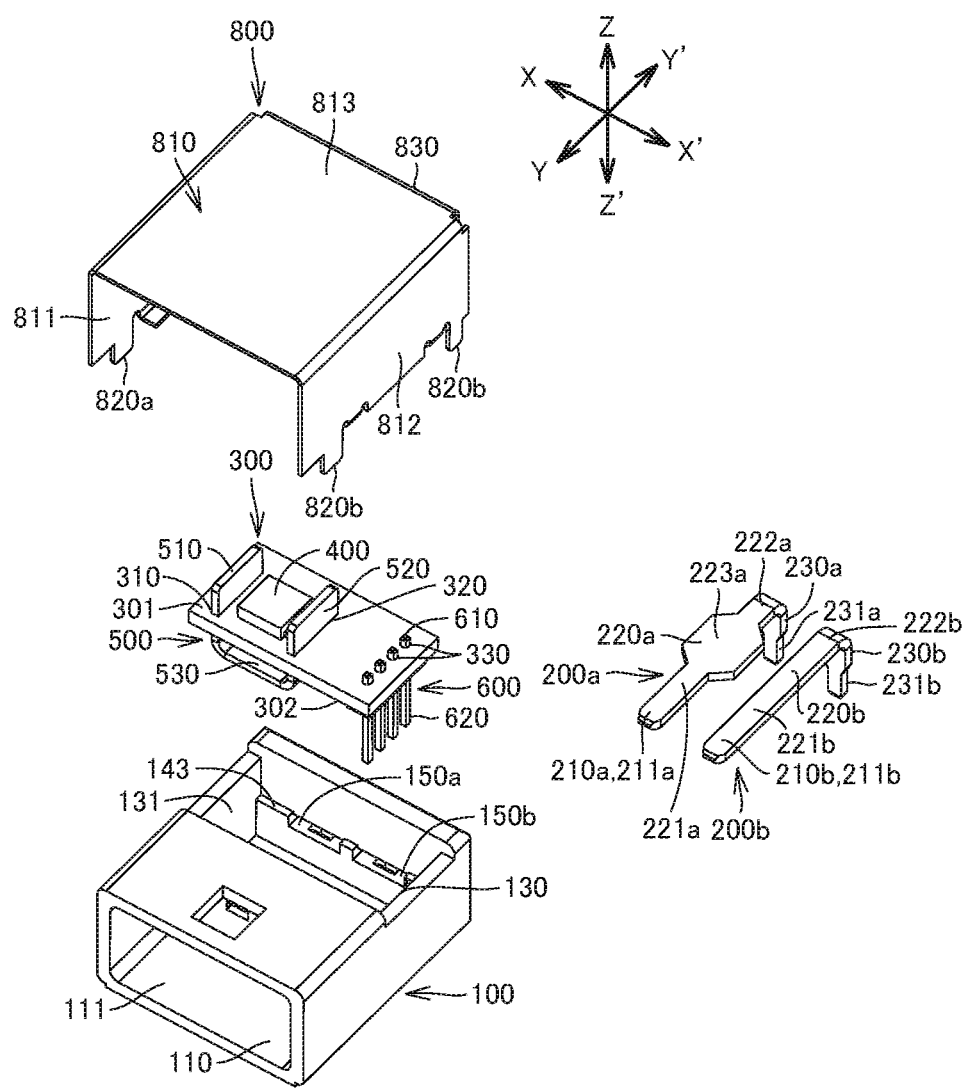
FIG. 3A is an exploded, front, top, right side perspective view of the connector according to the first embodiment.
Figure 3A:
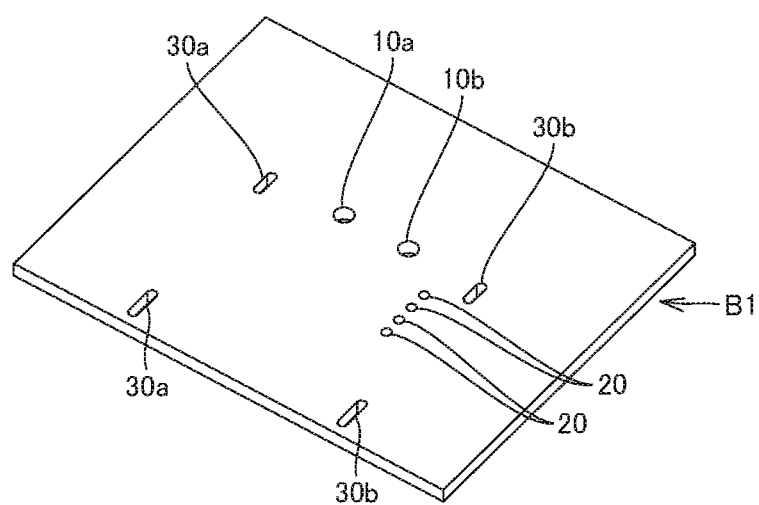
Figure 3B:
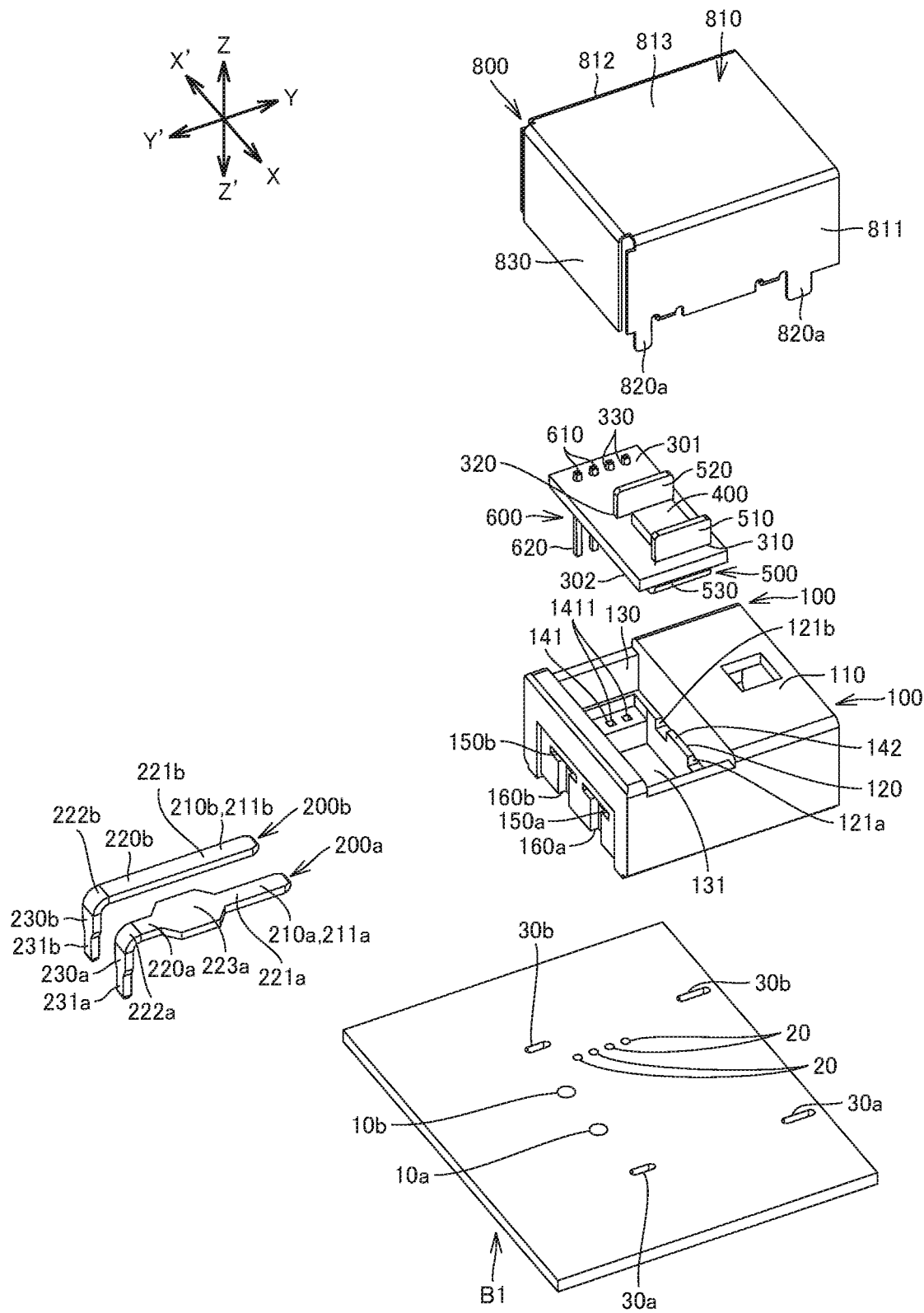
FIG. 3B is an exploded, rear, top, left side perspective view of the connector of the first embodiment.
Figure 4A:
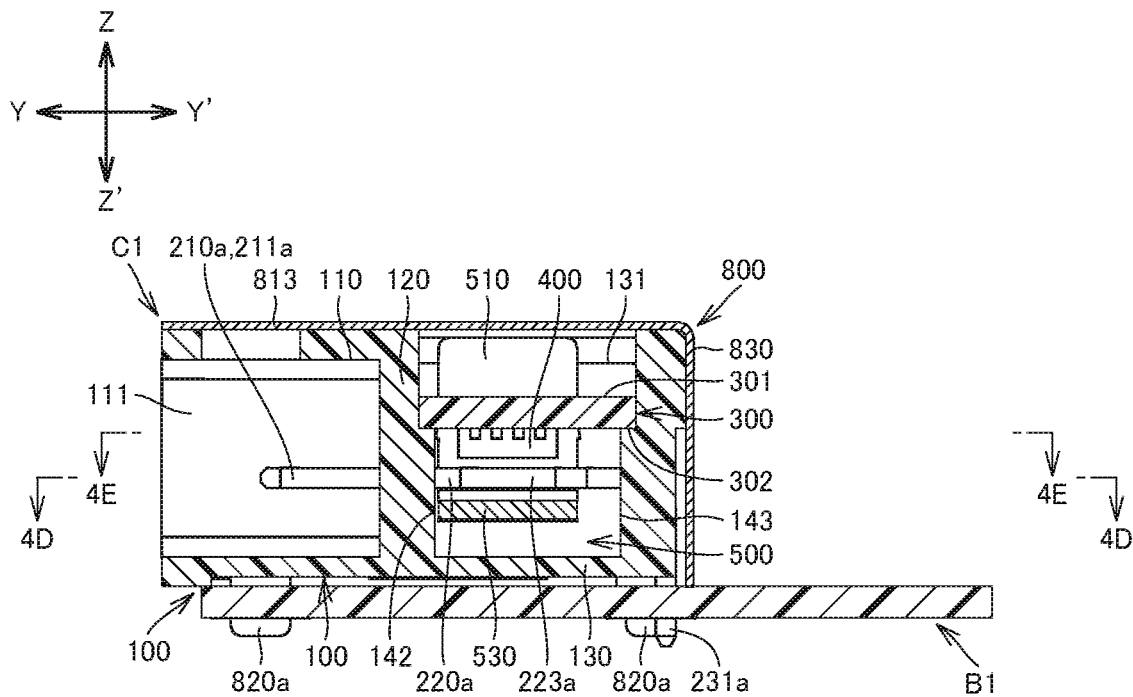
FIG. 4A is a cross-sectional view, corresponding to FIG. 2A, of a variant of the connector of the first embodiment.
Figure 4B:
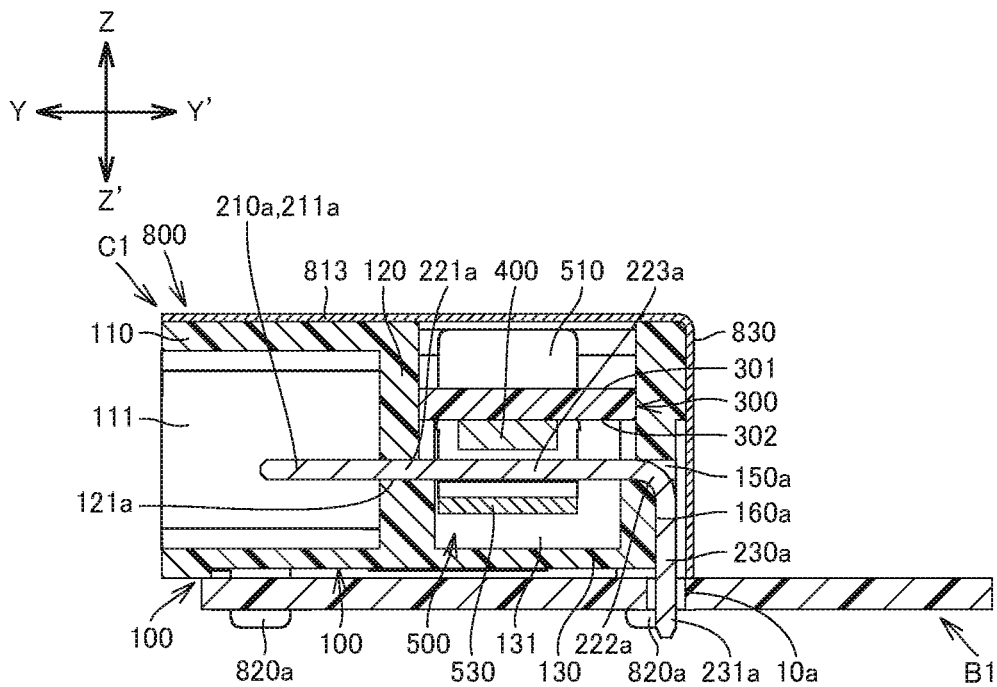
FIG. 4B is a cross-sectional view, corresponding to FIG. 2B, of the variant connector.
Figure 4C:
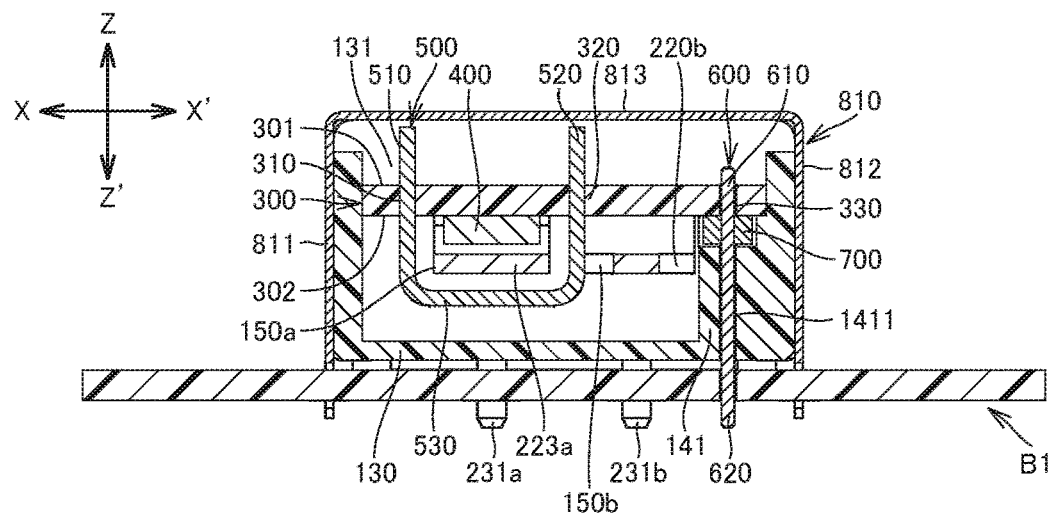
FIG. 4C is a cross-sectional view, corresponding to FIG. 2C, of the variant connector.
Figure 4D:
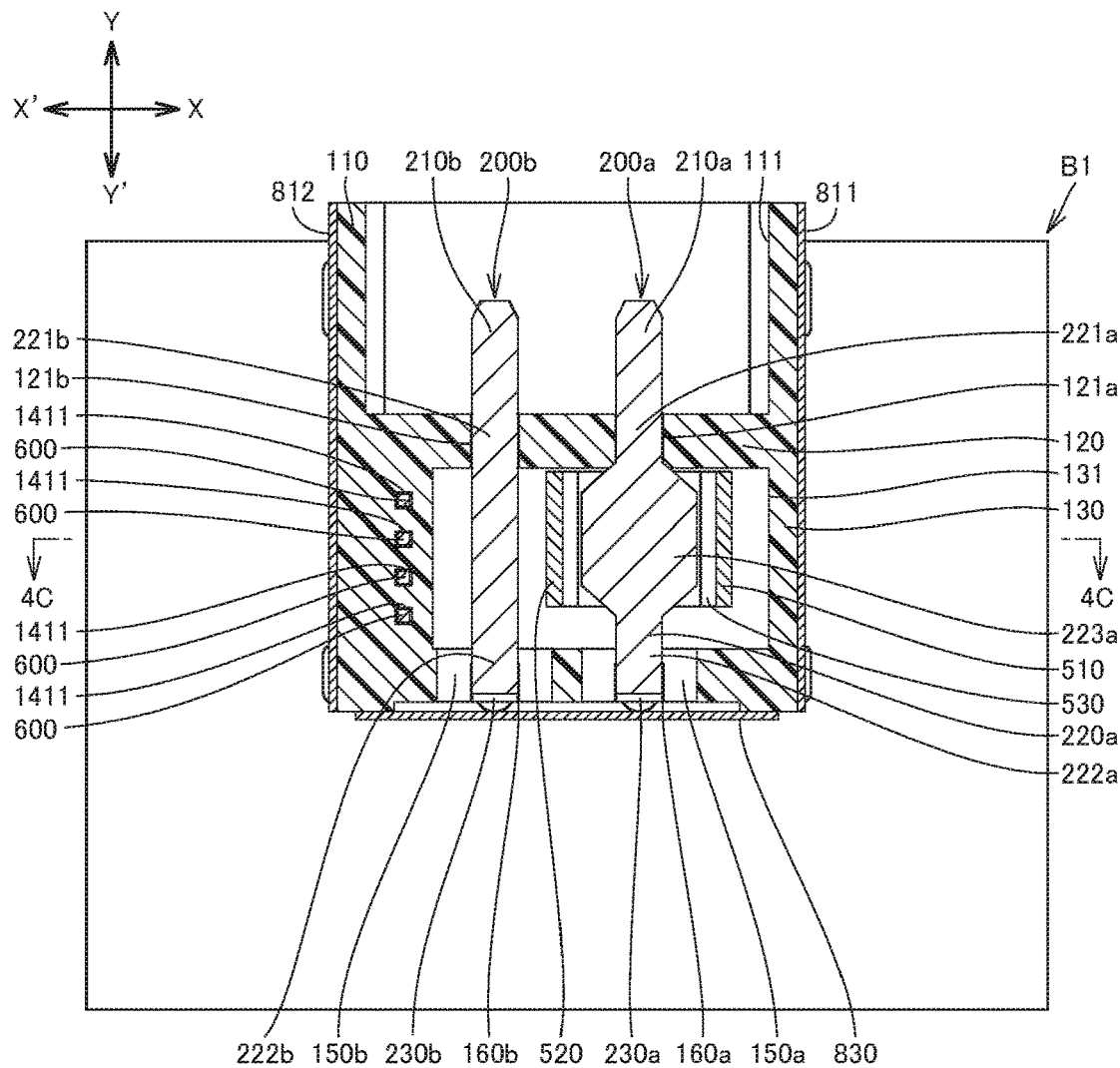
FIG. 4D is a cross-sectional view of the variant connector, taken along line 4D-4D in FIG. 4A.
Figure 4E:
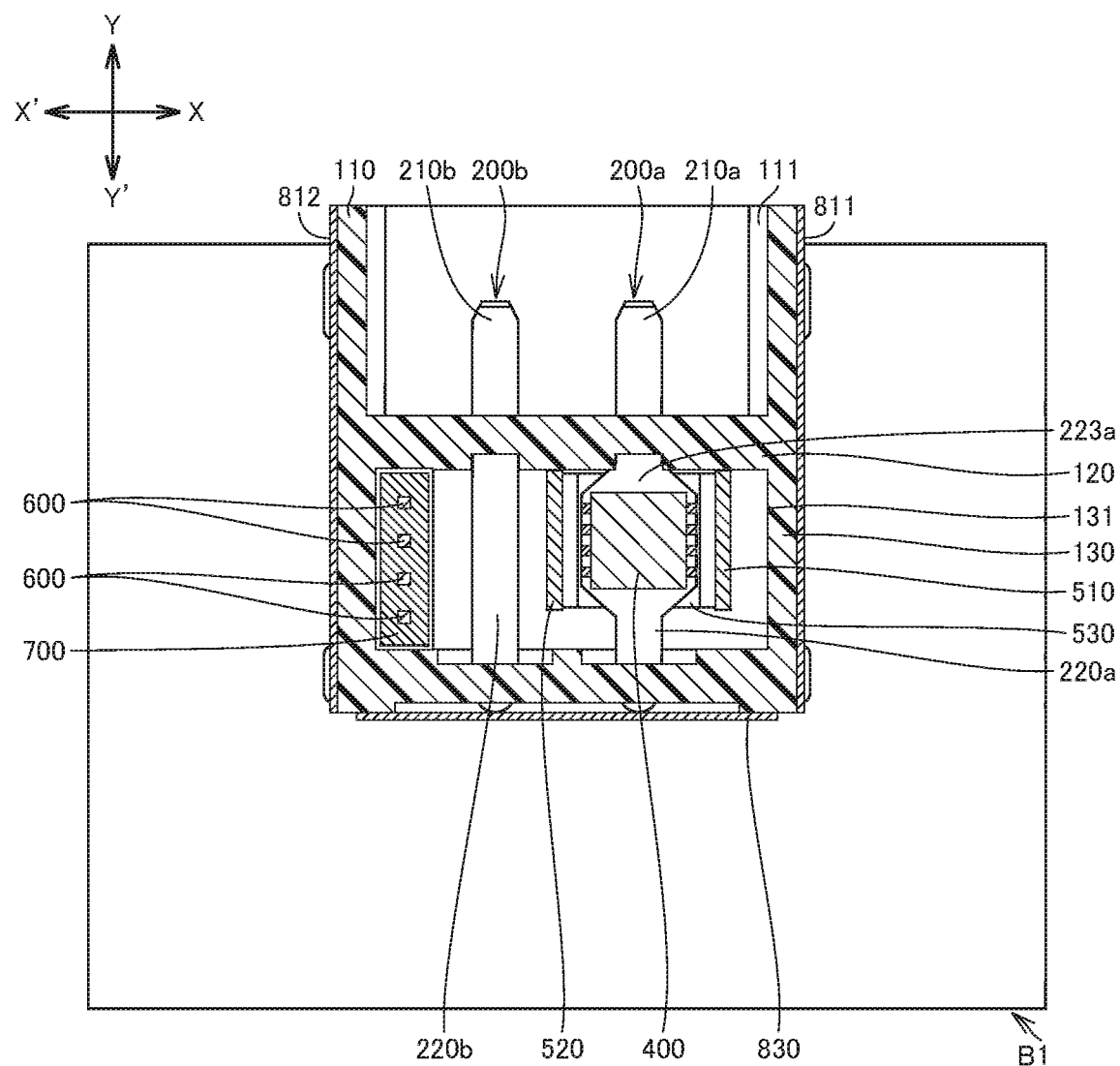
FIG. 4E is a cross-sectional view of the variant connector, taken along line 4E-4E in FIG. 4A.
Figure 5A:
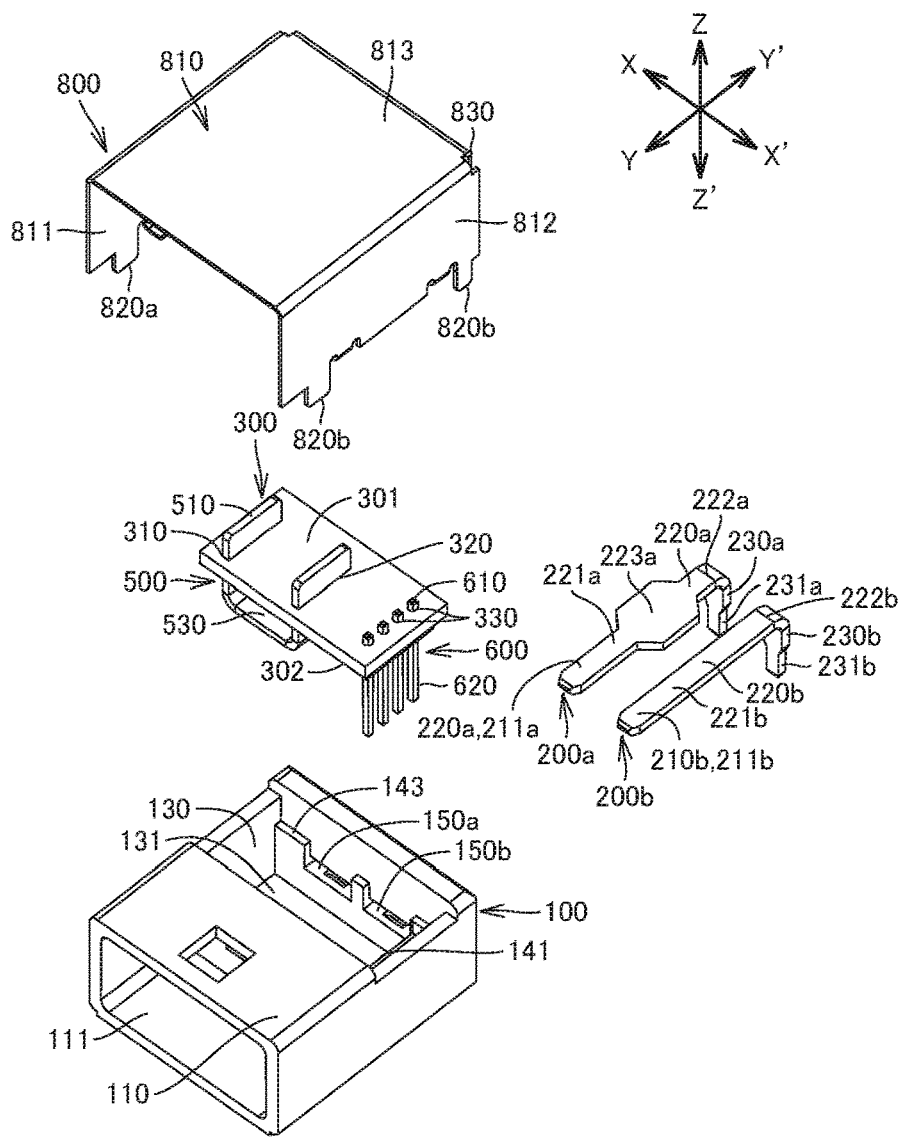
FIG. 5A is an exploded, front, top, right side perspective view of the variant connector.
Figure 5A:
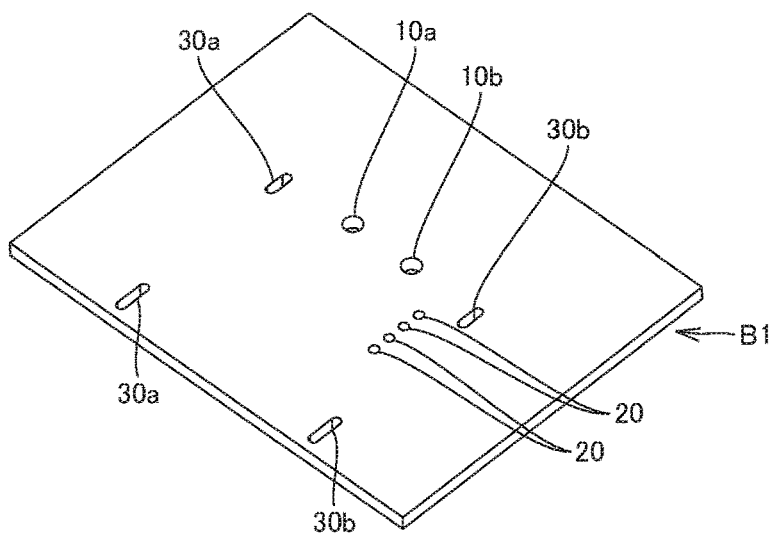
Figure 5B:
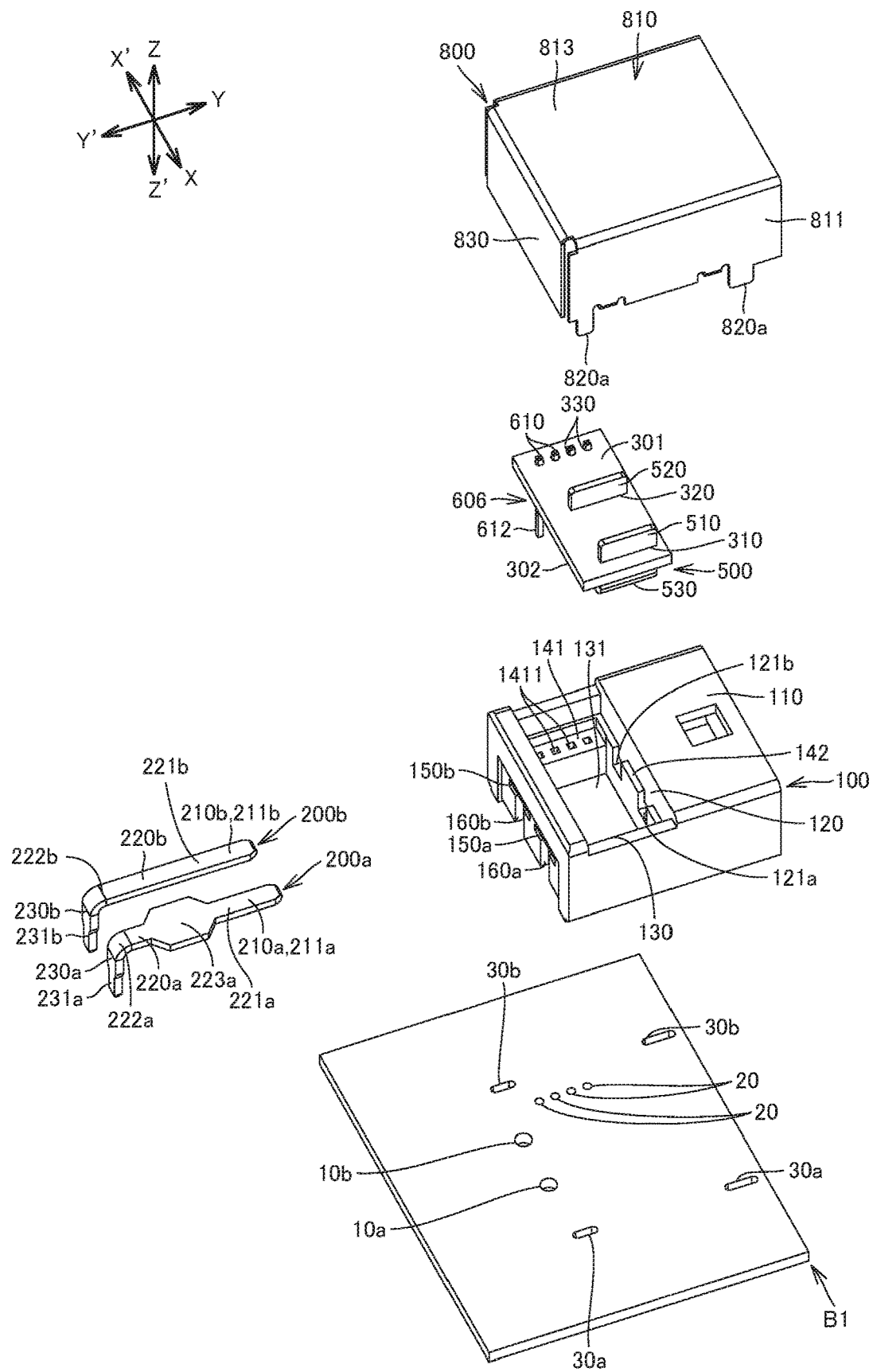
FIG. 5B is an exploded, rear, top, left side perspective view of the variant connector.

Hereinafter described is a connector assembly A1, which may be referred to simply as an "assembly A1", according to a plurality of embodiments, including a first embodiment and variants thereof, of the invention with reference to FIGS. 1A to 5B. FIGS. 1A to 3B illustrate the assembly A1 of the first embodiment. FIGS. 4A to 5B illustrate a variant of the assembly A1 of the first embodiment. FIGS. 1A to 2B, 2D to 4B, and 4D to 5B show a Y-Y' direction (first direction). The Y-Y' direction includes a Y direction (one side in the first direction) and a Y' direction (the other side in the first direction). FIGS. 1A to 1B, 2C to 3B, and 4C to 5B show an X-X' direction (second direction) substantially orthogonal to the Y-Y' direction. The X-X' direction includes an X direction (one side in the second direction) and an X' direction (the other side in the second direction). FIGS. 1A to 2C, 3A to 4C, 5A, and 5B show a Z-Z' direction (third direction) substantially orthogonal to the Y-Y' and X-X' directions. The Z-Z' direction includes a Z' direction (one side in the third direction) and a Z direction (the other side in the third direction).

The assembly A1 includes a connector C1. The connector C1 includes a body 100, which has an insulating property, and at least one first terminal 200a. The body 100 is made of an insulating resin. The at least one first terminal 200a is a single first terminal 200a or a plurality of first terminals 200a. Where the single first terminal 200a is provided, the first terminal 200a is partly held by the body 100. Where the plurality of first terminals 200a is provided, the first terminals 200a are partly held by the body 100 and arranged in spaced relation in the X-X' direction. For convenience of description, the at least one first terminal 200a may be hereinafter referred to as "the or each first terminal 200a". Where the single first terminal 200a is provided, the first terminal 200a of "the or each first terminal 200a" means the single first terminal 200a. Where the plurality of first terminals 200a is provided, each first terminal 200a of "the or each first terminal 200a" means each of the first terminals 200a. The or each first terminal 200a is used as a power source terminal for charge and discharge, a power supply terminal for power supply, a signal terminal for signal transmission, or a terminal of other kinds in a device to incorporate the assembly A1.

The or each first terminal 200a is made of an electrically conductive material, such as a metal, and includes a distal portion 210a, a body portion 220a, and a lead portion 230a. The distal portion 210a has a plate shape (including a shape having a cross section along the X-X' and Z-Z' directions of a rectangular, square, or other polygonal shape) extending in the Y-Y' and X-X' directions, or alternatively has a cylindrical shape extending in the Y-Y' direction. The distal portion 210a is located on the Y-direction side relative to the body portion 220a. The distal portion 210a may protrude from the body 100 in the Y direction. The distal portion 210a of the or each first terminal 200a includes a contact portion 211a to contact with the or a corresponding first terminal of at least one first terminal of a mating connector (not illustrated). The body portion 220a has a plate shape extending in the Y-Y' and X-X' directions, and is provided between the distal portion 210a and the lead portion 230a of the or each first terminal 200a. The body portion 220a is partly held by the body 100. The body portion 220a includes a measurement target 223a. The measurement target 223a has a plate shape extending in the Y-Y' and X-X' directions, and is disposed inside the body 100. The lead portion 230a is externally connectable. The lead portion 230a has a plate shape (including a shape having a cross section along the cross section along the X-X' and Y-Y' directions of a rectangular, square, or other polygonal shape) extending in the Z-Z' and X-X' directions, alternatively has a plate shape (including a shape having a cross section along the cross section along the X-X' and Y-Y' directions of a rectangular, square, or other polygonal shape) extending in an oblique direction and the X-X' direction, or still alternatively has a cylindrical shape extending in the Z-Z' direction or the oblique direction. The lead portion 230a is located on the Y'-direction side relative to the body portion 220a. The lead portion 230a includes a mounting portion 231a, which is an end portion on the Z'-direction side of the lead portion 230a, and a portion (which may be hereinafter referred to as a "main lead portion") on the Z-direction side relative to the mounting portion 231a of the lead portion 230a. The mounting portion 231a extends in the Z' direction from the main lead portion and is located on the Z'-direction side relative to the body 100 (outside the body 100) (see FIGS. 1A to 5B), or extends in the Y' direction from the main lead portion and is located on the Y'-direction side relative to the body 100 (outside the body 100) (not illustrated). The oblique direction is a direction including components of the Z' and Y' directions.

In the or each first terminal 200a, a dimension in a first perpendicular direction of the measurement target 223a may be, but is not required to be, larger than, or the same as, a dimension in a second perpendicular direction of the contact portion 211a of the distal portion 210a. Also, in the or each first terminal 200a, the dimension in the first perpendicular direction of the measurement target 223a may be, but is not required to be, larger than, or the same as, a dimension in a third perpendicular direction of the mounting portion 231a of the lead portion 230a. In the or each first terminal 200a, the Y' direction is the direction in which a current flows through the distal portion 210a and the body portion 220a (i.e. the direction in which a current flows through the contact portion 211a and the measurement target 223a); where the mounting portion 231a of the lead portion 230a extends in the Z' direction, the Z' direction is the direction in which a current flows through the mounting portion 231a of the lead portion 230a; and where the mounting portion 231a of the lead portion 230a extends in the Y' direction, the Y' direction is the direction in which a current flows through the mounting portion 231a of the lead portion 230a. The first perpendicular direction, defined as a direction substantially perpendicular to the direction in which a current flows through the measurement target 223a, is the X-X' direction. The second perpendicular direction, defined as a direction substantially perpendicular to the direction in which a current flows through the contact portion 211a, is the X-X' direction. The third perpendicular direction, defined as a direction substantially perpendicular to the direction in which a current flows through the mounting portion 231a, is the X-X' direction.

The or each first terminal 200a and the body 100 may further have any one of configurations (1) and (2) described below, for example.

(1) The body 100 includes a connecting portion 110, a holding portion 120, and a housing portion 130. The connecting portion 110 is a tube (polygonal-section tube or circular-section tube) extending in the Y-Y' direction, and has a connecting space 111 of a polygonal or circular shape in a cross-sectional view along the Z-Z' and X-X' directions. The connecting space 111 opens to the Y-direction side and configured to removably receive a connecting portion of the mating connector (not illustrated) along the Y-Y' direction. The holding portion 120 is located on the Y'-direction side relative to the connecting portion 110 of the body 100. The housing portion 130 is located on the Y'-direction side relative to the holding portion 120 and includes a housing space 131. The housing space 131 opens out to the Z-direction side. The housing portion 130 further includes a first wall on the X-direction side of the housing space 131, a second wall on the X'-direction side of the housing space 131, a third wall on the Y'-direction side of the housing space 131, and a bottom of the housing space 131. The end face on the Z-direction side of each of the first, second, and third walls may be located in the Z-Z' direction at the same height position as, or at a different height position from, an end face in the Z direction of the holding portion 120. The end faces on the Z-direction side of the first, second, and third walls may be located in the Z-Z' direction at the same height position or at different height positions.

The holding portion 120 has at least one first holding hole 121a. The at least one first holding hole 121a is a single holding hole 121a (see FIGS. 2D and 4D) or a plurality of holding holes 121a (not illustrated), in accordance with the number of the one or more first terminals 200a, extends through the holding portion 120 in the Y-Y' direction, and communicate between the connecting space 111 and the housing space 131. Where the plurality of first holding holes 121a is provided, the first holding holes 121a are disposed in spaced relation to each other in the X-X' direction.

The body 100 further includes at least one first receiving hole 150a. The at least one first receiving hole 150a may be a single first receiving hole 150a (see FIGS. 2D, 3A, 3B, 4D, 5A, and in accordance with the number of the single first terminal 200a. The single first receiving hole 150a extends through the third wall of the housing portion 130 in the Y-Y' direction and is located on the Y'-direction side relative to the single first holding holes 121a. Or alternatively, the at least one first receiving hole 150a may be a plurality of first receiving holes 150a (not illustrated) in accordance with the number of the first terminals 200a. The first receiving holes 150a extend through the third wall of the housing portion 130 in the Y-Y' direction, and are located on the Y'-direction side relative to the respective first holding holes 121a. The one or more first receiving holes 150a communicate with the housing space 131.

The body 100 may further include at least one first guide groove 160a. The at least one first guide groove 160a may be a single first guide groove 160a (see FIGS. 2D, 3A, 3B, 4D, 5A, and 5B) in accordance with the number of the single first terminal 200a. The single first guide groove 160a is provided in the face on the Y'-direction side of the third wall of the housing portion 130 and extends in the Y' direction from the single single first receiving hole 150a. Or alternatively, the at least one first guide groove 160a may be a plurality of first guide grooves 160a (not illustrated) in accordance with the number of the first terminals 200a. The first guide grooves 160a are provided in the face on the Y'-direction side of the third wall of the housing portion 130 and extend in the Y' direction from the respective first receiving holes 150a.

The distal portion 210a of the or each first terminal 200a protrudes in the Y direction from the holding portion 120 of the body 100 and is disposed in the connecting space 111 of the connecting portion 110 of the body 100 (see FIGS. 1A to 2B, 2D to 2E, 4A to 4B, and 4D to 4E). The body portion 220a of the or each first terminal 200a further includes a first portion 221a on the Y-direction side relative to the measurement target 223a and a second portion 222a on the Y'-direction side relative to the measurement target 223a. The first portion 221a of the body portion 220a is securely received in the corresponding first holding hole 121a of the holding portion 120 of the body 100. The second portion 222a of the body portion 220a is securely received in the corresponding first receiving hole 150a of the body 100. The measurement target 223a of the body portion 220a is housed in the housing space 131 of the housing portion 130 of the body 100. The main lead portion of the lead portion 230a of the or each first terminal 200a is received in, and disposed along, the corresponding first guide groove 160a of the body 100. Where the mounting portion 231a of the lead portion 230a extends in the Z' direction from the main lead portion, the mounting portion 231a of the lead portion 230a protrudes in the Z' direction from the corresponding first guide groove 160a and is located on the Z'-direction side relative to the body 100 (outside the body 100). Where the mounting portion 231a of the lead portion 230a extends in the Y' direction from the main lead portion, the mounting portion 231a of the lead portion 230a protrudes in the Y' direction from the corresponding first guide groove 160a and is located on the Y'-direction side relative to the body 100 (outside the body 100).

The first portion 221a of the body portion 220a may have a dimension in the Z-Z' direction that is substantially the same as, or larger than, the dimension in the Z-Z' direction of the distal portion 210a and is substantially the same as, or slightly larger than, the dimension in the Z-Z' direction of the corresponding first holding hole 121a. Additionally or alternatively, the first portion 221a of the body portion 220a may have a dimension in the X-X' direction that is substantially the same as, or larger than, the dimension in the X-X' direction of the distal portion 210a and is substantially the same as, or slightly larger than, the dimension in the X-X' direction of the corresponding first holding hole 121a. The second portion 222a of the body portion 220a has a dimension in the Z-Z' direction that is substantially the same as the dimension in the Z-Z' direction of the measurement target 223a of the body portion 220a and is substantially the same as, or slightly smaller than, the dimension in the Z-Z' direction of the corresponding first receiving hole 150a. The second portion 222a of the body portion 220a has a dimension in the X-X' direction that is smaller than, or substantially the same as, the dimension in the X-X' direction of the measurement target 223a of the body portion 220a. The corresponding first receiving hole 150a has a dimension in the X-X' direction that is slightly larger than the dimension in the X-X' direction of the measurement target 223a of the body portion 220a. The main lead portion of the lead portion 230a has a dimension in the X-X' direction that is smaller than the dimension in the X-X' direction of the corresponding first guide groove 160a. The main lead portion of the lead portion 230a has a dimension in the Z-Z' direction that is substantially the same as the dimension in the Z-Z' direction of the corresponding first guide groove 160a.

When the or each first terminal 200a thus dimensioned is attached to the body 100, the distal portion 210a is received into the corresponding first receiving hole 150a from the Y'-direction side, passes through the corresponding first holding hole 121a, and is disposed into the connecting space 111; the first portion 221a of the body portion 220a is received into the corresponding first receiving hole 150a from the Y'-direction side, and is securely received into the corresponding first holding hole 121a; the measurement target 223a of the body portion 220a is received into the corresponding first receiving hole 150a from the Y'-direction side and is disposed into the housing space 131 of the housing portion 130; the second portion 222a of the body portion 220a is securely received into the corresponding first receiving hole 150a from the Y'-direction side; and the main lead portion of the lead portion 230a is received into the corresponding first guide groove 160a from the Y'-direction side.

The corresponding first receiving hole 150a may open out in the Z' direction. In this case, the second portion 222a of the body portion 220a is received into the corresponding first receiving hole 150a from the Y'-direction side to be disposed in the corresponding first receiving hole 150a, but is not held by the corresponding first receiving hole 150a. The corresponding first guide groove 160a can be omitted. In this case, the lead portion 230a of the or each first terminal 200a is located on the Y'-direction side relative to the body 100.

(2) The body 100 (not illustrated) has the same configuration as the body 100 of configuration (1) described above, except that the at least one first receiving hole 150a and the at least one first guide groove 160a are not provided, and the end face on the Z-direction side of the third wall of the housing portion 130 is located at a height position in the Z-Z' direction that is on the Z'-direction side relative to the one or more first holding holes 121a. The distal portion 210a of the or each first terminal 200a is as described for configuration (1) above. The first portion 221a of the body portion 220a of the or each first terminal 200a is securely received in the corresponding first holding hole 121a of the holding portion 120 of the body 100. The second portion 222a of the body portion 220a of the or each first terminal 200a is located on the Z-direction side relative to the third wall of the housing portion 130 of the body 100. The second portion 222a may abut on, and is supported by, the end face on the Z-direction side of the third wall of the housing portion 130 from the Z-direction side, or may be disposed in the Z-Z' direction in spaced relation to the end face on the Z-direction side of the third wall of the housing portion 130. The measurement target 223a of the body portion 220a is disposed in the housing space 131 of the housing portion 130 (i.e., between the first wall and the second wall of the housing portion 130) of the body 100. The lead portion 230a of the or each first terminal 200a is located on the Y'-direction side relative to the body 100. Where the mounting portion 231a of the lead portion 230a extends in the Z' direction from the main lead portion, the mounting portion 231a of the lead portion 230a is located on the Z'-direction side relative to the body 100 (outside the body 100). Where the mounting portion 231a of the lead portion 230a extends in the Y' direction from the main lead portion, the mounting portion 231a of the lead portion 230a is located on the Y'-direction side relative to the body 100 (outside the body 100).

The connector C1 may further include at least one second terminal 200b. The at least one second terminal 200b is a single second terminal 200b or a plurality of second terminals 200a. The one or more second terminals 200b are partly held by the body 100. Where the single second terminal 200b and the single first terminal 200a or the plurality of first terminals 200a are provided, the single second terminal 200b may be disposed in the X-X' direction in spaced relation to the single first terminal 200a, in spaced relation to one of the first terminals 200a that is located at an endmost position to the X'- or X-direction side, or between two adjacent ones in the X-X' direction of the first terminals 200a. Where the plurality of second terminals 200b and the single first terminal 200a or the plurality of first terminals 200a are provided, the second terminals 200b may be spaced from each other in the X-X' direction. In this case, one of the second terminals 200b that is located at an endmost position X-direction side may be disposed in the X-X' direction in spaced relation to the single first terminal 200a or to the endmost first terminal 200a to the X'-direction side. Where the plurality of first terminals 200a and the plurality of second terminals 200b are provided, the first terminals 200a and the second terminals 200b may be disposed in spaced relation in the X-X' direction to form a one-to-one alternate array, a multiple-to-multiple alternate array, some other regular array, or an irregular array. For convenience of description, the at least one second terminal 200b may be hereinafter referred to as "the or each second terminal 200b". Where the single second terminal 200b is provided, the second terminal 200b of "the or each second terminal 200b" means the single second terminal 200b. Where the plurality of second terminals 200b is provided, each second terminal 200b of "the or each second terminal 200b" means each of the second terminals 200b. The or each second terminal 200b is used as a power source terminal for charge and discharge, a power supply terminal for power supply, a signal terminal for signal transmission, or a terminal of other kinds in a device to incorporate the assembly A1.

The or each second terminal 200b may have the same configuration as the or each first terminal 200a, except that the or each second terminal 200b does not include the measurement target 223a. In other words, the or each second terminal 200b may include a distal portion 210b having the same configuration as the distal portion 210a of the or each first terminal 200a. The or each second terminal 200b may include a body portion 220b having the same configuration as the body portion 220a of the or each first terminal 200a, except that the body portion 220b does not include the measurement target 223a. The or each second terminal 200b may include a lead portion 230b having the same configuration as the lead portion 230a of the or each first terminal 200a.

Where the body 100 has configuration (1), the body 100 and the or each second terminal 200b have configuration (3) described below. Where the body 100 has configuration (2), the body 100 and the or each second terminal 200b have configuration (4) described below.

(3) The holding portion 120 of the body 100 further includes at least one second holding hole 121b. The at least one second holding hole 121b is a single second holding hole 121b (see FIGS. 2D and 4D) or a plurality of second holding holes 121b (not illustrated), in accordance with the number of the one or more second terminals 200b, extends through the holding portion 120 in the Y-Y' direction, and communicate between the connecting space 111 and the housing space 131. Where the single second holding holes 121b is provided, the second holding hole 121b is disposed in the X-X' direction in spaced relation to the single first holding hole 121a or in spaced relation to one of the first holding holes 121a that is located at an endmost position to the X-direction side. Where the plurality of second holding holes 121b is provided, the second holding holes 121b are disposed in the X-X' direction in spaced relation to each other, and one of the second holding hole 121b that is located at an endmost position to the X'-direction side is disposed in the X-X' direction in spaced relation to the single first holding hole 121a or to the one of the first holding holes 121a that is located at an endmost position to the X-direction side.

The body 100 further includes at least one second receiving hole 150b. The at least one second receiving hole 150b may be a single second receiving hole 150b (see FIGS. 2D, 3A, 3B, 4D, and 5B) in accordance with the number of the single second terminal 200b. The single second receiving hole 150b extends through the third wall of the housing portion 130 in the Y-Y' direction and is located on the Y'-direction side relative to the single second terminal 200b. Or alternatively, the at least one second receiving hole 150b may be a plurality of second receiving holes 150b (not illustrated) in accordance with the number of the second terminals 200b. The second receiving holes 150b extend through the third wall of the housing portion 130 in the Y-Y' direction and are located on the Y'-direction side relative to the respective second terminals 200b. The one or more second terminals 200b communicate with the housing space 131.

The body 100 may further include at least one second guide groove 160b. The at least one second guide groove 160b may be a single second guide groove 160b (see FIGS. 2D, 3A, 3B, 4D, and 5B) in accordance with the number of the single second terminal 200b. The single second guide groove 160b is provided in the face on the Y'-direction side of the third wall of the housing portion 130, and extends in the Y' direction from the single second receiving hole 150b. Or alternatively, the at least one second guide groove 160b may be a plurality of second guide grooves 160b (not illustrated) in accordance with the number of the second terminals 200b. The second guide grooves 160b are provided in the face on the Y'-direction side of the third wall of the housing portion 130 and extend in the Y' direction from the respective second receiving holes 150b.

The distal portion 210b of the or each second terminal 200b protrudes in the Y direction from the holding portion 120 of the body 100 and is disposed in the connecting space 111 of the connecting portion 110 of the body 100 (see FIGS. 1A to 2B, 2D to 2E, 4A to 4B, and 4D to 4E). The body portion 220b of the or each second terminal 200b includes a first portion 221b and a second portion 222b. The first portion 221b of the body portion 220b is securely received in the corresponding second holding hole 121b of the holding portion 120 of the body 100. The second portion 222b of the body portion 220b is securely received in the corresponding second receiving hole 150b of the body 100. A main lead portion of the lead portion 230b of the or each second terminal 200b is received in, and disposed along, the corresponding second guide groove 160b of the body 100. Where a mounting portion 231b of the lead portion 230b extends in the Z' direction from the main lead portion, the mounting portion 231b of the lead portion 230b protrudes in the Z' direction from the corresponding second guide groove 160b and is located on the Z'-direction side relative to the body 100 (outside the body 100). Where the mounting portion 231b of the lead portion 230b extends in the Y' direction from the main lead portion, the mounting portion 231b of the lead portion 230b protrudes in the Y' direction from the corresponding second guide groove 160b and is located on the Y'-direction side relative to the body 100 (outside the body 100).

The first portion 221b of the body portion 220b may have a dimension in the Z-Z' direction that is substantially the same as, or larger than, the dimension in the Z-Z' direction of the distal portion 210b and is substantially the same as, or slightly larger than, the dimension in the Z-Z' direction of the corresponding second holding hole 121b. Additionally or alternatively, the first portion 221b of the body portion 220b may have a dimension in the X-X' direction that is substantially the same as, or larger than, the dimension in the X-X' direction of the distal portion 210b and is substantially the same as, or slightly larger than, the dimension in the X-X' direction of the corresponding second holding hole 121b. The second portion 222b of the body portion 220b has a dimension in the Z-Z' direction that is substantially the same as, or slightly smaller than, the dimension in the Z-Z' direction of the corresponding second receiving hole 150b. The second portion 222b of the body portion 220b has a dimension in the X-X' direction that is substantially the same as, or smaller than, the dimension in the X-X' direction of the corresponding second receiving hole 150b. The main lead portion of the lead portion 230b has a dimension in the X-X' direction that is smaller than the dimension in the X-X' direction of the corresponding second guide groove 160b. The main lead portion of the lead portion 230b has a dimension in the Z-Z' direction that is substantially the same as the dimension in the Z-Z' direction of the corresponding second guide groove 160b.

When the or each second terminal 200b thus dimensioned is attached to the body 100, the distal portion 210b is received into the corresponding second receiving hole 150b from the Y'-direction side, passes through the corresponding second holding hole 121b, and is disposed into the connecting space 111; the first portion 221b of the body portion 220b is received into the corresponding second receiving hole 150b from the Y'-direction side, and is securely received into the corresponding second holding hole 121b; the second portion 222b of the body portion 220b is securely received into the corresponding second receiving hole 150b from the Y'-direction side; and the main lead portion of the lead portion 230b is received into the corresponding second guide groove 160b from the Y'-direction side.

The corresponding second receiving hole 150b may open out in the Z' direction. In this case, the second portion 222b of the body portion 220b is received into the corresponding second receiving hole 150b from the Y'-direction side to be disposed in the corresponding second receiving hole 150b, but is not held by the corresponding second receiving hole 150b. The corresponding second guide groove 160b can be omitted. In this case, the lead portion 230b of the or each second terminal 200b is located on the Y'-direction side relative to the body 100.

(4) The body 100 (not illustrated) has the same configuration as the body 100 of configuration (3) described above, except that the at least one second receiving hole 150b and the at least one second guide groove 160b are not provided, and the end face on the Z-direction side of the third wall of the housing portion 130 is located at a height position in the Z-Z' direction that is on the Z'-direction side relative to the one or more first holding holes 121a and the one or more second holding holes 121b. The distal portion 210b of the or each second terminal 200b is as described for configuration (3) above. The first portion 221b of the body portion 220b of the or each second terminal 200b is securely received in the corresponding second holding hole 121b of the holding portion 120 of the body 100. The second portion 222b of the body portion 220b of the or each second terminal 200b is located on the Z-direction side relative to the third wall of the housing portion 130 of the body 100. The second portion 222b may abut on, and is supported by, the end face on the Z-direction side of the third wall of the housing portion 130 from the Z-direction side, or may be disposed in the Z-Z' direction in spaced relation to the end face on the Z-direction side of the third wall of the housing portion 130. The lead portion 230b of the or each second terminal 200b is located on the Y'-direction side relative to the body 100. Where the mounting portion 231b of the lead portion 230b extends in the Z' direction from the main lead portion, the mounting portion 231b of the lead portion 230b is located on the Z'-direction side relative to the body 100 (outside the body 100). Where the mounting portion 231b of the lead portion 230b extends in the Y' direction from the main lead portion, the mounting portion 231b of the lead portion 230b is located on the Y'-direction side relative to the body 100 (outside the body 100).

The at least one second terminal 200b can be omitted. In this case, the above-described configurations (3) to (4) of the body 100 are also omitted.

The connector C1 further includes an internal circuit board 300. The internal circuit board 300 includes a first face 301 on the Z-direction side and a second face 302 on the Z'-direction side. The internal circuit board 300 further includes one or more sets of first and second fixing holes 310 and 320. The or each first fixing hole 310 extends through the internal circuit board 300 in the Z-Z' direction. The or each second fixing hole 320 extends through the internal circuit board 300 in the Z-Z' direction. The internal circuit board 300 may further include one or more electrodes 330. The or each electrode 330 may be a through-hole electrode extending through the internal circuit board 300 in the Z-Z' direction, or may be a surface electrode provided on the second face 302 of the internal circuit board 300. The internal circuit board 300 is secured in position to the body 100 and is disposed in the Z-Z' direction in spaced relation to the measurement target 223a of the single first terminal 200a, or to the measurement targets 223a of the first terminals 200a. The internal circuit board 300 is located on the Z-direction side (see FIGS. 2A to 2C and 2E) relative to the measurement target 223a of the single first terminal 200a, or relative to the measurement targets 223a of the first terminals 200a. For example, the internal circuit board 300 may be secured in position to the body 100 in a manner described below. The first face 301 and the second face 302 of the internal circuit board 300 secured in position may, but is not required to, be substantially parallel to the face on the Z-direction side and the face on the Z'-direction side of the measurement target 223a of the one or more first terminals 200a.

The internal circuit board 300 may be housed in the housing space 131 of the housing portion 130 of the body 100, and is secured in position, in the Y-Y' and X-X' directions, to the housing portion 130. The internal circuit board 300 has a dimension in the Y-Y' direction that is substantially the same as the dimension in the Y-Y' direction of the housing space 131 of the housing portion 130, and has a dimension in the X-X' direction that is substantially the same as the dimension in the X-X' direction of the housing space 131 of the housing portion 130. The internal circuit board 300 may be secured in position in the Y-Y' and X-X' directions to the housing portion 130 by being fitted into the housing space 131, by being housed in the housing space 131 of the housing portion 130 of the body 100 and subsequently heated and deformed, or by being housed in the housing space 131 of the housing portion 130 of the body 100 and subsequently fixed to the housing portion 130 with adhesive or other means. Alternatively, the internal circuit board 300 may have a notch or through hole to engage with a positioning portion provided in the housing space 131 of the housing portion 130 of the body 100, and with such engagement the internal circuit board 300 may be secured in position in the Y-Y' and X-X' directions.

The body 100 may further include at least one positioning portion. The at least one positioning portion is provided on the housing portion 130 and configured to position the internal circuit board 300 in the Z-Z' direction relative to the measurement target 223a of the single first terminals 200a, or relative to the measurement targets 223a of the first terminals 200a. The at least one positioning portion includes at least one of a first positioning portion 141, a second positioning portion 142, or a third positioning portion 143.

The first positioning portion 141 is a pedestal extending in the Z direction from the bottom of the housing space 131 of the housing portion 130 of the body 100. The first positioning portion 141 has an end face on the Z-direction side located on the Z-direction side relative to the face on the Z-direction side of the measurement target 223a of the single first terminal 200a or relative to the faces on the Z-direction side of the measurement targets 223a of the first terminals 200a. The end face on the Z-direction side of the first positioning portion 141 abuts on the second face 302 of the internal circuit board 300 from the Z'-direction side, directly or indirectly via a first additional member (e.g., a support member 700).

The second positioning portion 142 is a step on a wall face on the Y-direction side or on a wall face on the X-direction side (an inner face of the first wall) of the housing space 131 of the housing portion 130 of the body 100. The second positioning portion 142 has an end face on the Z-direction side located on the Z-direction side relative to the face on the Z-direction side of the measurement target 223a of the single first terminal 200a or relative to the faces on the Z-direction side of the measurement targets 223a of the first terminals 200a. The end face on the Z-direction side of the second positioning portion 142 abuts on the second face 302 of the internal circuit board 300 from the Z'-direction side, directly or indirectly via a second additional member.

The third positioning portion 143 is a step on a wall face on the Y'-direction side (an inner face of the third wall) or a wall face on the X'-direction side (an inner face of the second wall) of the housing space 131 of the housing portion 130 of the body 100. The third positioning portion 143 has an end face on the Z-direction side located on the Z-direction side relative to the face on the Z-direction side of the measurement target 223a of the single first terminal 200a or relative to the faces on the Z-direction side of the measurement targets 223a of the first terminals 200a. The end face on the Z-direction side of the third positioning portion 143 abuts on the second face of the internal circuit board 300 from the Z'-direction side, directly or indirectly via a third additional member.

As described above, at least one of the first positioning portion 141, the second positioning portion 142, and the third positioning portion 143 abut on the internal circuit board 300, so that the internal circuit board 300 is secured in position on the Z-direction side relative to the measurement target 223a of the single first terminal 200a or relative to the measurement targets 223a of the first terminals 200a.

The connector C1 further includes at least one current sensor 400. The at least one current sensor 400 is a single current sensor 400 in accordance with the number of the measurement target 223a of the single first terminal 200a or a plurality of current sensors 400, in accordance with the number of the measurement targets 223a of the first terminals 200a. For convenience of description, the at least one current sensor 400 may be hereinafter referred to as "the or each current sensor 400". Where the single current sensor 400 is provided, the current sensor 400 of "the or each current sensor 400" means the single current sensor 400. Where the plurality of current sensors 400 is provided, each current sensor 400 of "the or each current sensor 400" means each of the current sensors 400.

The or each current sensor 400 is a magnetic sensor configured to perform a non-contact detection of a magnetic field generated around the measurement target 223a of the corresponding first terminal 200a and change an output signal (e.g., voltage) according to the strength of the magnetic field. The magnetic field is generated by a current flowing through the corresponding first terminal 200a, according to the Ampere's law. More particularly, the or each current sensor 400 may be, for example, a Hall sensor configured to perform a non-contact detection of the magnetic field utilizing the Hall effect, a magneto-resistive (MR) sensor configured to perform a non-contact detection of the magnetic field utilizing the magneto-resistive effect, a magneto-impedance (MI) sensor configured to perform a non-contact detection of the magnetic field utilizing the magneto-impedance effect, or a sensor of the like kind. The or each current sensor 400 is mounted on the internal circuit board 300. The or each current sensor 400 is disposed in the Z-Z' direction in spaced relation to the corresponding measurement target 223a. The or each current sensor 400 may be disposed such as to at least partly overlaps a projected area of the corresponding measurement target 223a in the Z-Z' direction. The or each current sensor is only required to be disposed sufficiently near the measurement target 223a of the corresponding first terminal 200a to allow non-contact detection of the magnetic field generated by a current flowing through the measurement target 223a of the corresponding first terminal 200a.

For example, where the or each current sensor 400 is mounted on the first face 301 of the internal circuit board 300 (see FIGS. 2A to 2C and 2E to 3B), the or each current sensor 400 is disposed such as to be located on the Z-direction side relative to the internal circuit board 300 and the corresponding measurement target 223a, and entirely or partly overlap the projected area of the corresponding measurement target 223a in the Z-Z' direction.

Where the or each current sensor 400 is mounted on the second face 302 of the internal circuit board 300 (see FIGS. 4A to 4C and 4E to 5B), the or each current sensor 400 is disposed such as to be located on the Z'-direction side relative to the internal circuit board 300, be located on the Z-direction side relative to, and in opposing spaced relation in the Z-Z' direction to, the corresponding measurement target 223a, and entirely or partly overlap the projected area of the corresponding measurement target 223a in the Z-Z' direction. The or each current sensor 400 is located on the Y-direction side relative to the lead portion 230a of the corresponding first terminal 200a. In this case, the or each current sensor 400 may be configured to perform a non-contact detection of a composite magnetic field of a magnetic field generated around the measurement target 223a and a magnetic field generated around the lead portion 230a by a current flowing through the corresponding first terminal 200a, and to change an output signal (e.g., voltage) according to the strength of the composite magnetic field. Alternatively, the or each current sensor 400 may be configured to detect a magnetic field generated around the measurement target 223a and change the output signal (e.g., voltage) according to the strength of the magnetic field.

With the internal circuit board 300 secured in position in a manner described above, the or each current sensor 400 is secured in position relative to the measurement target 223a of the corresponding first terminal 200a in a manner described above.

The connector C1 may further include at least one shield 500 having electrical conductivity. The at least one shield 500 is a single shield 500 in accordance with the number of the measurement target 223a of the single first terminal 200a or a plurality of shields 500 in accordance with the number of the measurement targets 223a of the first terminals 200a. For convenience of description, the at least one shield 500 may be hereinafter referred to as "the or each shield 500". Where the single shield 500 is provided, the shield 500 of "the or each shield 500" means the single shield 500. Where the plurality of shields 500 is provided, each shield 500 of "the or each shield 500" means each of the shields 500.

The or each shield 500 is made of a magnetic material, such as a metal or a magnetic molding material. The magnetic molding material is a molding material obtained by compounding powder of a magnetic material into an engineering plastic material or other plastic material. The or each shield 500 includes at least one of, or at least two of, a first plate 510, a second plate 520, or a third plate 530. The first plate 510 is fixed to the internal circuit board 300 and disposed in spaced relation to, and on the X-direction side relative to, the corresponding current sensor 400 and the measurement target 223a of the corresponding first terminal 200a. The second plate 520 is fixed to the internal circuit board 300 and disposed in spaced relation to, and on the X'-direction side relative to, the corresponding current sensor 400 and the measurement target 223a of the corresponding first terminal 200a. The third plate 530 is contiguous with at least one of the first plate 510 or the second plate 520 and disposed in spaced relation to, and on the Z'-direction side relative to, the measurement target 223a of the corresponding first terminal 200a.

The or each shield 500 may, but is not required to, further have the following configuration, for example.

The first plate 510 and the second plate 520 are made of a magnetic material, such as a metal, have a plate shape extending in the Z-Z' and Y-Y' directions. The first plate 510 fixedly extends through the corresponding first fixing hole 310 of the internal circuit board 300 in the Z-Z' direction, and is disposed in spaced relation to, and on the X-direction side relative to, the corresponding current sensor 400 on the first face 301 or the second face 302 of the internal circuit board 300 and the measurement target 223a of the corresponding first terminal 200a (see FIGS. 2A to 5B). The second plate 520 fixedly extends through the corresponding second fixing hole 320 of the internal circuit board 300 in the Z-Z' direction, and is disposed in spaced relation to, and on the X'-direction side relative to, the corresponding current sensor 400 on the first face 301 or the second face 302 of the internal circuit board 300 and the measurement target 223a of the corresponding first terminal 200a (also see FIGS. 2A to 5B). The first plate 510 may not extends through the internal circuit board 300, but may be fixed to the first face 301 or the second face 302 of the internal circuit board 300, and the second plate 520 may be modified similarly to the first plate 510. In this case, the first fixing hole(s) 310 and/or the second fixing hole(s) 320 is omitted.

The linear distance in the X-X' direction from the face on the X'-direction side of the first plate 510 to the face on the X-direction side of the second plate 520 is larger than the dimension in the X-X' direction of the corresponding current sensor 400, and than the dimension in the X-X' direction of the measurement target 223a of the corresponding first terminal 200a. Where the corresponding current sensor 400 is mounted on the first face 301 of the internal circuit board 300, each of the first plate 510 and the second plate 520 has a dimension in the Z-Z' direction that is substantially the same as (not illustrated), or larger than (see FIGS. 2C, 3A, and 3B), the linear distance in the Z-Z' direction from the face on the Z-direction side of the corresponding current sensor 400 to the face on the Z'-direction side of the measurement target 223a of the corresponding first terminal 200a. Where the corresponding current sensor 400 is mounted on the second face 302 of the internal circuit board 300, each of the first plate 510 and the second plate 520 has a dimension in the Z-Z' direction that is substantially the same as (not illustrated), or larger than (see FIGS. 4C, 5A, and 5B), the linear distance in the Z-Z' direction from the second face 302 of the internal circuit board 300 to the face on the Z'-direction side of the measurement target 223a of the corresponding first terminal 200a. The dimension in the Y-Y' direction each of the first plate 510 and the second plate 520 is substantially the same as (not illustrated), or larger than (see FIGS. 2D, 3A, 3B, 4D, 5A, and 5B), the dimension in the Y-Y' direction of at least one of the corresponding current sensor 400 or the measurement target 223a of the corresponding first terminal 200a. The first plate 510 covers from the X-direction side, and electromagnetically shields, the corresponding current sensor 400 and the measurement target 223a of the corresponding first terminal 200a. The second plate 520 covers from the X'-direction side, and electromagnetically shields, the corresponding current sensor 400 and the measurement target 223a of the corresponding first terminal 200a.

The third plate 530 is made of a magnetic material, such as a metal, and has a plate shape extending in the X-X' and Y-Y' directions. Where both the first plate 510 and the second plate 520 are provided, the third plate 530 couples between the first plate 510 and the second plate 520 (see FIGS. 2A to 5B). Where one of the first plate 510 or the second plate 520 is provided, the third plate 530 is contiguous with the one plate (not illustrated). In any case, the third plate 530 has a dimension in the Y-Y' direction that is substantially the same as, or larger than, the dimension in the Y-Y' direction of the measurement target 223a of the corresponding first terminal 200a, and has a dimension in the X-X' direction that is larger than the dimension in the X-X' direction of the measurement target 223*a* of the corresponding first terminal 200*a*. The third plate 530 covers from the Z'-direction side, and electromagnetically shields, the measurement target 223*a* of the corresponding first terminal 200*a* from the Z'-direction side.

At least one of the first plate 510 or the second plate 520 of the or each shield 500 is fixed to, but not electrically connected to, the internal circuit board 300. In other words, the or each shield 500 is electrically floated. However, where both the first plate 510 and the second plate 520 are provided, at least one of the first plate 510 or the second plate 520 may be electrically connected to the internal circuit board 300 so that the or each shield 500 may be grounded via the internal circuit board 300. Where one of the first plate 510 or the second plate 520 is provided, the one plate may be electrically connected to the internal circuit board 300 so that the or each shield 500 may be grounded via the internal circuit board 300.

Where the third plate 530 of the or each shield 500 is provided, the corresponding first terminal 200*a* may be attached to the body 100 in a manner described above after the internal circuit board 300 is secured in position to the housing portion 130 of the body 100 in a manner described above.

The at least one shield 500 can be omitted. In this case, the internal circuit board 300 may be provided without the one or more sets of the first and second fixing holes 310 and 320.

The connector C1 may further include at least one third terminal 600. The at least one third terminal 600 is a single third terminal 600 or a plurality of third terminals 600. In this case, the body 100 may further include one or more through holes 1411, in accordance with the number of at least one third terminal 600. The one or more through holes 1411 extend through the first positioning portion 141 (if provided) of the body 100 in the Z-Z' direction (see FIGS. 2C and 4C) or through the bottom of the housing portion 130 of the body 100 in the Z-Z' direction (not illustrated). Where the plurality of through holes 1411 is provided, the through holes 1411 may be disposed in a row in spaced relation to each other in the Y-Y' direction or in the X-X' direction, may include a plurality of rows of through holes 1411 arranged along the X-X' direction, with the through holes 1411 in each row disposed in spaced relation to each other in the Y-Y' direction, or may include a plurality of rows of through holes 1411 arranged along the Y-Y' direction, with the through holes 1411 in each row disposed in spaced relation to each other in the X-X' direction.

For convenience of description, the at least one third terminal 600 may be hereinafter referred to as "the or each third terminal 600". Where the single third terminal 600 is provided, the third terminal 600 of "the or each third terminal 600" means the single third terminal 600. Where the plurality of third terminals 600 is provided, each third terminal 600 of "the or each third terminal 600" means each of the third terminals 600.

The or each third terminal 600 is made of an electrically conductive material, such as a metal. The or each third terminal 600 includes an internal connecting portion 610 and an external connecting portion 620. The internal connecting portion 610 is connected to the internal circuit board 300. This connection allows the or each third terminal 600 to be connected via the internal circuit board 300 to the corresponding current sensor 400, or to the corresponding shield 500 (only if the corresponding shield 500 is provided and electrically connected to the internal circuit board 300). Via the internal circuit board 300 and the or each third terminal 600, the corresponding current sensor 400 is connectable externally of the connector C1. This external connection makes it possible to output output signals of the corresponding current sensor 400 to externally of the connector C1, or supply power from externally of the connector C1 to the corresponding current sensor 400, and/or carry out signal communications of control signals from externally of the connector C1 to the corresponding current sensor 400, for example. Also, via the internal circuit board 300 and the or each third terminal 600, the corresponding shield 500 can be grounded. The external connecting portion 620 is disposed outside the body 100.

The or each third terminal 600 may be, for example, a rod or plate extending in the Z-Z' direction and extends through the corresponding through hole 1411 in the Z-Z' direction. Where the corresponding through hole 1411 is provided in the first positioning portion 141 on which the second face 302 of the internal circuit board 300 abuts indirectly via the support member 700, the or each third terminal 600 extends also through the support member 700. The or each third terminal 600 may, but is not required to, securely fit in the corresponding through hole 1411. The or each third terminal 600 further includes an intermediate portion between the internal connecting portion 610 and the external connecting portion 620. The intermediate portion is disposed in the corresponding through hole 1411. The internal connecting portion 610 is an end portion on the Z-direction side of the or each third terminal 600 extending from the intermediate portion in the Z direction, and is located on the Z-direction side relative to the corresponding through hole 1411. The internal connecting portion 610 may extend through the corresponding electrode 330 in the internal circuit board 300 in the Z-Z' direction and be electrically and mechanically connected (fixed) to the corresponding electrode 330 with solder, a conductive adhesive, or the like where the corresponding electrode 330 is a through-hole electrode. Alternatively, the internal connecting portion 610 may be an L-shaped portion contiguous with the intermediate portion and be electrically and mechanically connected (fixed) to the corresponding electrode 330 of the internal circuit board 300 with solder, a conductive adhesive, or the like where the corresponding electrode 330 is a surface electrode on the second face 302 of the internal circuit board 300. The external connecting portion 620 is an end portion on the Z'-direction side of the or each third terminal 600 extending from the intermediate portion in the Z' direction. The external connecting portion 620 may protrude from the corresponding through hole 1411 to the Z'-direction side and be located on the Z'-direction side relative to the body 100. The external connecting portion 620 may extend in the X' direction from the intermediate portion and include a distal portion located on the X'-direction side relative to the body 100, or alternatively may extend in the X direction from the intermediate portion and include a distal portion located on the X-direction side relative to the body 100.

Where the internal circuit board 300 abuts on the at least one positioning portion from the Z-direction side, when the internal circuit board 300 is received into the housing space 131 of the housing portion 130 of the body 100, the or each third terminal 600 extends through the corresponding through hole 1411 in the Z-Z' direction.

The external connecting portion 620 of the or each third terminal 600 may be disposed inside the body 100 (in the housing space 131, for example). In this case, the body 100 may further include a lead-out hole (not illustrated) in place of the one or more through holes 1411, the external connecting portion 620 may be connected to a first connecting member (not illustrated) (e.g., a wire harness, a flexible printed circuits (FPC) board, a flexible flat cable (FFC), or the like), and the first connecting member may be led through the lead-out hole to the outside of the body 100. The corresponding current sensor 400 may output output signals externally of the connector C1 via the internal circuit board 300, the or each third terminal 600, and the first connecting member. The corresponding shield 500 may be grounded via the internal circuit board 300, the or each third terminal 600, and the first connecting member, The at least one third terminal can be omitted. In this case, the connector C1 may further include a second connection member (not illustrated) (e.g., a wire harness, a flexible printed circuits (FPC) board, a flexible flat cable (FFC), or the like) connected to the internal circuit board 300, and the second connection member may be configured to be led through the lead-out hole to the outside of the body 100. The second connection member is connected via the internal circuit board 300 to the corresponding current sensor 400 or to the corresponding shield 500 (if provided). The corresponding current sensor 400 may output output signals externally of the connector C1 via the internal circuit board 300 and the second connection member. The corresponding shield 500 may be grounded via the internal circuit board 300 and the second connection member.

The connector C1 may further include a shell 800. The shell 800 includes a shell body 810. The shell body 810 may be made of a pressed metal plate (see FIGS. 1A to 3B), a cast metal member (not illustrated), or a metal member formed using a 3D printer (not illustrated). Alternatively, the shell body 810 may be a molded plastic member with a metal plated or vapor-deposited on an outer face and/or an inner face of the shell body 810. The shell body 810 further has the following configuration (A) or (B).

(A) The shell body 810 is generally shaped like a tube extending in the Y-Y' direction and having a cut-out portion on the Z'-direction side (e.g., shaped like a circular- or polygonal-section tube having a cut-out portion on the Z'-direction side) and, in a cross-sectional view taken along the Z-Z' and X-X' directions, is of generally inverted-U shape (see FIGS. 1A to 3). The shell body 810 houses the body 100. The shell body 810 includes a first wall 811, a second wall 812, and a third wall 813. The first wall 811 is a wall on the X-direction side of the shell body 810, and covers the body 100 from the X-direction side. The second wall 812 is a wall on the X'-direction side of the shell body 810, and covers the body 100 from the X'-direction side. The third wall 813 is a wall on the Z-direction side of the shell body 810 coupling between the first wall 811 and the second wall 812, and covers the body 100 from the Z-direction side. The end face on the Z-direction side of each of the first and second walls of the housing portion 130 of the body 100 are located on the Z'-direction side relative to the end face on the Z-direction side of the holding portion 120 of the body 100. The first wall 811, the second wall 812, and the third wall 813 of the shell body 810 define a space that is located on the Z-direction side relative to, and communicates with, the housing space 131 of the housing portion 130. Where the end face on the Z-direction side of each of the first and second walls of the housing portion 130 of the body 100 is at the same height position in the Z-Z' direction as the end face on the Z-direction side of the holding portion 120 of the body 100, the third wall 813 closes the housing space 131 of the housing portion 130 from the Z-direction side.

(B) The shell body 810 is generally shaped like a tube extending in the Y-Y' direction (e.g., shaped like a circular- or polygonal-section tube) and, in a cross-sectional view in the Z-Z' and X-X' directions, is of generally ring-shape (e.g., generally O-shape (a circular ring shape, or a polygonal ring shape, etc.)) (not illustrated). The shell body 810 includes a fourth wall (not illustrated) in addition to the first wall 811, the second wall 812, and the third wall 813. The first wall 811, the second wall 812, and the third wall 813 are configured as described above. The fourth wall is a wall on the Z'-direction side of the shell body 810 coupling between the first wall 811 and the second wall 812, and covers the body 100 from the Z'-direction side.

Where the body 100 is provided with at least one of the first positioning portion 141, the second positioning portion 142, or the third positioning portion 143, the first wall 811 and the second wall 812 of the shell body 810 may or may not be respectively provided with a first locking claw and a second locking claw (not illustrated). Before the internal circuit board 300 is housed in the housing space 131 of the housing portion 130 of the body 100, the first and second locking claws are not bent, but after the internal circuit board 300 is housed in the housing space 131 of the housing portion 130 of the body 100, the first and second locking claws are bent such as to abut on the internal circuit board 300 from the Z-direction side.

The shell 800 further includes at least one first leg 820a and at least one second leg 820b. The at least one first leg 820a is a single first leg 820a or a plurality of first legs 820a, and extends from the shell body 810 in the Z' or X direction. For example, the one or more first legs 820a may extend in the Z' or X direction from the first wall 811 or the fourth wall (if provided) of the shell body 810. The at least one second leg 820b is a single second leg 820b or a plurality of second legs 820b, and extends from the shell body 810 in the Z' or X' direction. For example, the one or more second legs 820b may extend in the Z' or X' direction from the second wall 812 or the fourth wall (if provided) of the shell body 810. The one or more first legs 820a and the one or more second legs 820b are spaced from each other in the X-X' direction. Where the plurality of first legs 820a is provided, the first legs 820a are spaced from each other in the Y-Y' direction. The plurality of second legs 820b is provided, the second legs 820b are spaced from each other in the Y-Y' direction.

The shell 800 may further include a cover 830. The cover 830 extends in the Z-Z' direction from the end on Y'-direction side of the third wall 813 of the shell body 810. The cover 830 covers the body 100 from the Y'-direction side. Where the end face on the Z-direction side of each of the first, second, and third walls of the housing portion 130 of the body 100 is located on the Z'-direction side relative to the end face on the Z-direction side of the holding portion 120 of the body 100, the first wall 811, the second wall 812, the third wall 813, and the cover 830 define a space that is located on the Z-direction side relative to, and communicates with, the housing space 131 of the housing portion 130. Where the end face on the Z-direction side of each of the first and second walls of the housing portion 130 of the body 100 is located at the same height position in the Z-Z' direction as the end face on the Z-direction side of the holding portion 120 of the body 100 while the end face on the Z-direction side of the third wall of the housing portion 130 of the body 100 is located on the Z'-direction side relative to the end face on the Z-direction side of the holding portion 120 of the body 100, the third wall 813 closes the housing space 131 of the housing portion 130 from the Z-direction side, and the cover 830 closes the housing space 131 of the housing portion 130 from the Y'-direction side. Where the end face on the Z-direction side of each of the first, second, and third walls of the housing portion 130 of the body 100 is at the same height position in the Z-Z' direction as the end face on the Z-direction side of the holding portion 120 of the body 100, the third wall 813 closes the housing space 131 of the housing portion 130 from the Z-direction side.

The cover 830 may be formed integrally with the shell body 810 or may be omitted. It is also possible to omit the shell 800 itself.

The connector C1 may further include at least one communication element 900. For convenience of description, the at least one communication element 900 may be hereinafter referred to as "the or each communication element 900". Where a single communication element 900 is provided, the communication element 900 of "the or each communication element 900" means the single communication element 900. Where a plurality of communication elements 900 is provided, each communication element 900 of "the or each communication element 900" means each of the communication elements 900. The or each communication element 900 is a wireless communication circuit, such as an integrated circuit (IC) mounted on the first face 301 or the second face 302 of the internal circuit board 300. The or each communication element 900 is connected via the internal circuit board 300 to the corresponding current sensor 400. The or each communication element 900 is configured to acquire a current value of a current flowing through the corresponding first terminal 200a based on an output signal of the corresponding current sensor 400 and output the acquired current value to a wireless antenna (not illustrated). In this case, the at least one third terminal 600, the at least one third terminal 600 and the first connecting member, or the at least one third terminal 600 and the second connection member may or may not be omitted. Where the shell 800 is not provided, the wireless antenna may also be provided on the first face 301 or the second face 302 of the internal circuit board 300, or alternatively the wireless antenna may be provided inside the or each communication element 900. Where the shell 800 is provided, the wireless antenna is disposed outside the connector C1, and the at least one third terminal 600, the at least one third terminal 600 and the first connecting member, or the second connection member is connected via the internal circuit board 300 to the or each communication element 900. Via the at least one third terminal 600, the at least one third terminal 600 and the first connecting member, or the second connection member, and also via the internal circuit board 300, it is possible to output an acquired current value of a current from the or each communication element 900 to the wireless antenna, or supply power from externally of the connector C1 to the or each communication element 900, and/or carry out signal communication of control signals from externally of the connector C1 to the or each communication element 900, or the like. Note that the at least one communication element 900 and the wireless antenna(s) can be omitted. The at least one communication element 900 is illustrated only in FIG. 2E and but not in the other figures for convenience of illustration.

The assembly A1 further includes an external circuit board B1. The external circuit board B1 includes a mounting face on the Z-direction side, and the connector C1 is mounted on the mounting face. The external circuit board B1 includes at least one first electrode 10a. The at least one first electrode 10a is a through-hole electrode or electrodes extending through the external circuit board B1 in the Z-Z' direction (see FIGS. 1B, 2B, 3A, 3B, 4B, 5A, and 5B), or is a surface electrode or electrodes on the mounting face (not illustrated). The at least one first electrode 10a may be a single first electrode 10a in accordance with the number of the single first terminal 200a of the connector C1, and the single first electrode 10a is disposed in accordance with the position of the mounting portion 231a of the single first terminal 200a. Or alternatively, the at least one first electrode 10a may be a plurality of first electrodes 10a in accordance with the number of the first terminals 200a of the connector C1, and the first electrodes 10a are disposed in accordance with the respective positions of the mounting portions 231a of the first terminals 200a.

Where the mounting portion 231a of the or each first terminal 200a of the connector C1 extends in the Z' direction and the corresponding first electrode 10a is a through-hole electrode, the mounting portion 231a of the or each first terminal 200a extends through the corresponding first electrode 10a and is electrically and mechanically connected (fixed) to the corresponding first electrode 10a with solder, a conductive adhesive, or the like. Where the mounting portion 231a of the or each first terminal 200a of the connector C1 extends in the Y' direction and the corresponding first electrode 10a is a surface electrode, the mounting portion 231a of the or each first terminal 200a is electrically and mechanically connected (fixed) to the corresponding first electrode 10a with solder, a conductive adhesive, or the like.

Where the at least one second terminal 200b of the connector C1 is provided, the external circuit board B1 may further include at least one second electrode 10b, which is a through-hole electrode or electrodes extending through the external circuit board B1 in the Z-Z' direction (see FIGS. 1B, 3A, 3B, 5A, and 5B), or is a surface electrode or electrodes on the mounting face (not illustrated). The at least one second electrode 10b may be a single second electrode 10b in accordance with the number of the single second terminal 200b of the connector C1, and the single second electrode 10b is disposed in accordance with the position of the mounting portion 231b of the single second terminal 200b. Or alternatively, the at least one second electrode 10b is a plurality of second electrodes 10b in accordance with the number of the second terminals 200b of the connector C1, and the second electrodes 10b are disposed in accordance with the respective positions of the mounting portions 231b of the second terminals 200b.

Where the mounting portion 231b of the or each second terminal 200b of the connector C1 extends in the Z' direction and the corresponding second electrode 10b is a through-hole electrode, the mounting portion 231b of the or each second terminal 200b extends through the corresponding second electrode 10b and is electrically and mechanically connected (fixed) to the corresponding second electrode 10b with solder, a conductive adhesive, or the like. Where the mounting portion 231b of the or each second terminal 200b of the connector C1 extends in the Y' direction and the corresponding second electrode 10b is a surface electrode, the mounting portion 231b of the or each second terminal 200b is electrically and mechanically connected (fixed) to the corresponding second electrode 10b with solder, a conductive adhesive, or the like. Where the at least one second terminal 200b is omitted, the at least one second electrode 10b is also omitted.

Where the at least one third terminal 600 of the connector C1 is provided, the external circuit board B1 may further include at least one third electrode 20, which is a through-hole electrode or electrodes extending through the external circuit board B1 in the Z-Z' direction (see FIGS. 1B, 2C, 3A, 3B, 4C, 5A, and 5B), or is a surface electrode or electrodes on the mounting face (not illustrated). The at least one third electrode 20 may be a single third electrode 20 in accordance with the number of the single third terminal 600 of the connector C1, and the single third electrode 20 is disposed in accordance with the position of the external connecting portion 620 of the single third terminal 600. Or alternatively, the at least one third electrode 20 is a plurality of third electrodes 20 in accordance with the number of the third terminals 600 of the connector C1, and the third electrodes 20 are disposed in accordance with the respective positions of the external connecting portions 620 of the third terminals 600.

Where the external connecting portion 620 of the or each third terminal 600 of the connector C1 extends in the Z' direction and the corresponding third electrode 20 is a through-hole electrode, the external connecting portion 620 of the or each third terminal 600 extends through the corresponding third electrode 20 and is electrically and mechanically connected (fixed) to the corresponding third electrode 20 with solder, a conductive adhesive, or the like. Where the external connecting portion 620 of the or each third terminal 600 of the connector C1 extends to the X'- or X-direction side and the corresponding third electrode 20 is a surface electrode, the external connecting portion 620 of the or each third terminal 600 is electrically and mechanically connected (fixed) to the corresponding third electrode 20 with solder, a conductive adhesive, or the like. Where the at least one third terminal 600 is omitted, the at least one third electrode 20 is also omitted.

Where the first or second connection member of the connector C1 is provided in place of the at least one third terminal 600 of the connector C1, the first or second connection member is connected to the external circuit board B1.

Where the shell 800 of the connector C1 is provided, the external circuit board B1 may further include at least one fourth electrode 30*a* and at least one fifth electrode 30*b*. The fourth and fifth electrodes 30*a* are through-hole electrodes extending through the external circuit board B1 in the Z-Z' direction (see FIGS. 1B, 3A, 3B, 5A, and 5B), or are surface electrodes on the mounting face (not illustrated). The at least one fourth electrode 30*a* may be a single fourth electrode 30*a* in accordance with the number of the single first leg 820*a* of the shell 800, and the single fourth electrode 30*a* is disposed according to the position of the single first leg 820*a*. Or alternatively, the at least one fourth electrode 30*a* may be a plurality of fourth electrodes 30*a* in accordance with the number of the at least one first leg 820*a* of the shell 800, and the fourth electrodes are disposed according to the respective positions of the first legs 820*a*. The at least one fifth electrode 30*b* may be a single fifth electrode 30*b* in accordance with the number of the single second leg 820*b* of the shell 800, and the single fifth electrode is disposed according to the position of the single second leg 820*b*. Or alternatively, the at least one fifth electrode 30*b* may be a plurality of fifth electrodes 30*b* in accordance with the number of the at least one second leg 820*b* of the shell 800, and the fifth electrodes 30*b* are disposed according to the respective positions of the second legs 820*b*.

Where the or each first leg 820*a* of the shell 800 of the connector C1 extends from the shell body 810 in the Z' direction and the corresponding fourth electrode 30*a* is a through-hole electrode, the or each first leg 820*a* extends through the corresponding fourth electrode 30*a* and is electrically and mechanically connected (fixed) to the corresponding fourth electrode 30*a* with solder, a conductive adhesive, or the like. Where the or each first leg 820*a* of the shell 800 of the connector C1 extends in the X direction from the shell body 810 and the corresponding fourth electrode 30*a* is a surface electrode, the or each first leg 820*a* is electrically and mechanically connected (fixed) to the corresponding fourth electrode 30*a* with solder, a conductive adhesive, or the like.

Where the or each second leg 820*b* of the shell 800 of the connector C1 extends from the shell body 810 in the Z' direction and the corresponding fifth electrode 30*b* is a through-hole electrode, the or each second leg 820*b* extends through the corresponding fifth electrode 30*b* and is electrically and mechanically connected (fixed) to the corresponding fifth electrode 30*b* with solder, a conductive adhesive, or the like. Where the or each second leg 820*b* of the shell 800 of the connector C1 extends in the X' direction from the shell body 810 and the corresponding fifth electrode 30*b* is a through-hole electrode, the or each second leg 820*b* is electrically and mechanically connected (fixed) to the corresponding fifth electrode 30*b* with solder, a conductive adhesive, or the like.

Where the at least one communication element 900 is provided, it may be mounted not on the internal circuit board 300 but on the external circuit board B1. In this case, the at least one communication element 900 is connected to the at least one current sensor 400 via the at least one third terminal 600, the at least one third terminal 600 and the first connecting member, or the second connection member. The wireless antenna or antennas may be provided on the external circuit board B1.

The novel connector C1 as described above is obtained. Further, the novel connector C1 may provide the following technical features and effects (1) to (9).

Technical Features and Effects (1)

The connector C1 provides improved detection accuracy to the at least one current sensor 400. The internal circuit board 300 is fixed to the body 100, and the at least one current sensor 400 mounted on the internal circuit board 300 is disposed near the measurement target 223*a* of the at least one first terminal 200*a* held by the body 100. As such, fixing the internal circuit board 300 inside the body 100 will results in determining the distance, the position, and the orientation of the at least one current sensor 400 on the internal circuit board 300 relative to the measurement target 223*a* of the at least one first terminal 200*a*, leading to the improved detection accuracy of the at least one current sensor 400.

In particular, where the housing portion 130 of the body 100 is provided with the housing space 131 and at least one positioning portion, namely at least one of the first positioning portion 141, the second positioning portion 142, or the third positioning portion 143, the internal circuit board 300 is secured in position to the housing portion 130 in the Y-Y', X-X', and Z-Z' directions by inserting the internal circuit board 300 into the housing space 131 of the housing portion 130 of the body 100, bringing the internal circuit board 300 into abutment with the at least one positioning portion (at least one of the first positioning portion 141, the second positioning portion 142, or the third positioning portion 143) from the Z-direction side, and securing the internal circuit board 300 in position to the housing portion 130 in the Y-Y' and X-X' directions in a manner described above. This securement in position determines the distance, the position, and the orientation of the at least one current sensor 400 on the internal circuit board 300 relative to the measurement target 223*a* of the at least one first terminal 200*a*, resulting in improved detection accuracy of the at least one current sensor 400.

Technical Features and Effects (2)

The connector C1 is easy to assemble. Where is provided with the housing space 131 and at least one positioning portion, namely at least one of the first positioning portion 141, the second positioning portion 142, or the third positioning portion 143, simply by inserting the internal circuit board 300 mounted with the at least one current sensor 400 into the housing space 131 of the housing portion 130 of the body 100 from the Z-direction side, the internal circuit board 300 is brought into abutment with the at least one positioning portion from the Z-direction side. In this state, by securing the internal circuit board 300 to the housing portion 130 in position in the Y-Y' and X-X' directions in a manner described above, the internal circuit board 300 is secured in position to the housing portion 130 in the Y-Y', X-X', and Z-Z' directions. To the thus secured internal circuit board 300 the at least one shield 500 may or may not be fixed. Thereafter, the at least one first terminal 200a may be assembled to the body 100 in a manner (1) or (2) described above. The at least one current sensor 400 on the internal circuit board 300 is thus secured in position relative to the measurement target 223a of the at least one first terminal 200a as described above. Thus it is possible to facilitate the assembly of the internal circuit board 300 and the at least one current sensor 400 to the housing portion 130 of the body 100. The at least one second terminal 200b, if provided, can be attached to the body 100 at any time.

Where there is provided at least one third terminal 600 being a rod or plate extending in the Z-Z' direction, the at least one third terminal 600 can be attached to the body 100 simply by inserting the internal circuit board 300 into the housing space 131 of the housing portion 130 of the body 100 and making the at least one third terminal 600 pass through the at least one through hole 1411 of the body 100.

Moreover, when the at least one first terminal 200a is assembled to the body 100 in a manner (1) or (2) described above after the internal circuit board 300 is secured in position to the housing portion 130 of the body 100 as described above, the internal circuit board 300 and the at least one current sensor 400 are unlikely to collide with the measurement target 223a of the at least one first terminal 200a. This is because the end face on the Z-direction side of the at least one positioning portion is located on the Z-direction side relative to the face on the Z-direction side of the measurement target 223a of the at least one first terminal 200a, and also because the at least one current sensor 400 is mounted on the first face 301 of the internal circuit board 300, or alternatively the at least one current sensor 400 is mounted on the second face 302 of the internal circuit board 300 and located on the Z-direction side relative to, and in spaced relation to, the measurement target 223a of the at least one first terminal 200a.

Further, where the mounting portion 231a of the at least one first terminal 200a, the mounting portion 231b of the at least one second terminal 200b, and the external connecting portion 620 of the at least one third terminal 600 extend in the Z' direction, the mounting portion 231a, the mounting portion 231b, and the external connecting portion 620 can be readily inserted into, connected to, the at least one first electrode 10a, the at least one second electrode 20a, and the at least one third electrode 20, respectively, which are through-hole electrodes of the external circuit board B1. Where the mounting portion 231a of the at least one first terminal 200a and the mounting portion 231b of the at least one second terminal 200b extend in the Y' direction and the external connecting portion 620 of the at least one third terminal 600 extends in the X' or X direction, the mounting portion 231a, the mounting portion 231b, and the external connecting portion 620 can be readily mounted on, connected to, the at least one first electrode 10a, the at least one second electrode 20a, and the at least one third electrode 20, respectively, which are surface electrodes of the external circuit board B1.

Technical Features and Effects (3)

Where the first plate 510 of the at least one shield 500 is provided, the first plate 510 is disposed in spaced relation to, and on the X-direction side relative to, the at least one current sensor 400 and the measurement target 223a of the at least one first terminal 200a. As such, the first plate 510 of the at least one shield 500 electromagnetically shields the at least one current sensor 400 and the measurement target 223a of the at least one first terminal 200a from the X-direction side. Where the second plate 520 of the at least one shield 500 is provided, the second plate 520 is disposed in spaced relation to, and on the X'-direction side relative to, the at least one current sensor 400 and the measurement target 223a of the at least one first terminal 200a. As such, the second plate 520 of the at least one shield 500 electromagnetically shields the at least one current sensor 400 and the measurement target 223a of the at least one first terminal 200a from the X'-direction side. Where the third plate 530 of the at least one shield 500 is provided, the third plate 530 is disposed in spaced relation to, and on the Z'-direction side relative to, the measurement target 223a of the at least one first terminal 200a. As such, the third plate 530 of the at least one shield 500 electromagnetically shields the measurement target 223a of the at least one first terminal 200a from the Z'-direction side.

Moreover, in a case where the at least one current sensor 400 and the measurement target 223a of the at least one first terminal 200a are disposed between the first plate 510 and the second plate 520 of the at least one shield 500, in the magnetic field generated around the measurement target 223a of the at least one first terminal 200a by the current flowing through the at least one first terminal 200a, the magnetic field distribution is made denser than that in a case where the first plate 510 and the second plate 520 of the at least one shield 500 are not provided. In other words, the magnetic field to detected by the at least one current sensor 400 becomes stronger. This results in improved detection accuracy of the at least one current sensor 400. Where the at least one shield 500 further includes the third plate 530, in the magnetic field generated around the measurement target 223a of the at least one first terminal 200a by the current flowing through the at least one first terminal 200a, the magnetic field distribution is made still denser, resulting in further improved detection accuracy of the at least one current sensor 400.

Technical Features and Effects (4)

Where the at least one current sensor 400 is mounted on the second face 302 of the internal circuit board 300, the at least one current sensor 400 may be configured to perform a non-contact detection of a composite magnetic field that is resulted from the combination of a magnetic field generated around the measurement target 223a and a magnetic field generated around the lead portion 230a by the current flowing through the at least one first terminal 200a, and change an output signal (e.g., voltage) according to the strength of the composite magnetic field. In this case, the magnetic field to be detected by the at least one current sensor 400 is stronger, resulting in improved detection accuracy of the at least one current sensor 400.

Technical Features and Effects (5)

Where the at least one third terminal 600 is provided, via the internal circuit board 300 and the at least one third terminal 600, at least one of the at least one current sensor 400, the at least one shield 500 (if provided), and the at least one communication element 900 (if provided) can be connected externally of the connector C1. This external connection makes it possible to output output signals of the at least one current sensor 400 to externally of the connector C1, or supply power from externally of the connector C1 to the at least one current sensor 400, and/or carry out signal communications of control signals from externally of the connector C1 to the at least one current sensor 400. The external connection also makes it possible to ground the at least one shield 500, or supply power from externally of the connector C1 to the at least one communication element 900, and/or carry out signal communications of control signals from externally of the connector C1 to the at least one communication element 900.

Technical Features and Effects (6)

Where the at least one first terminal 200a is configured such that the dimension in the first perpendicular direction (X-X' direction) of the measurement target 223a is larger than the dimension in the second perpendicular direction (X-X' direction) of the contact portion 211a of the distal portion 210a, and than the dimension in the third perpendicular direction (X-X' direction) of the mounting portion 231a of the lead portion 230a, the magnetic field, which is generated around the measurement target 223a of the at least one first terminal 200a by the current flowing through the at least one first terminal 200a, becomes stronger, resulting in improved detection accuracy of the at least one current sensor 400. Moreover, where the at least one first terminal 200a is the plurality of first terminals 200a, and/or where the at least one first terminal 200a and the at least one second terminal 200b are provided, the at least one first terminal 200a is configured such that the dimension in the second perpendicular direction (X-X' direction) of the contact portion 211a of the distal portion 210a is smaller than the dimension in the first perpendicular direction (X-X' direction) of the measurement target 223a. This makes it possible to reduce the distances in the X-X' direction between the contact portions 211a of the first terminals 200a, and/or reduce the distance between the contact portion 211a of the at least one first terminal 200a and a contact portion 211b of the at least one second terminal 200b that are adjacent to each other. The connector C1 is thus downsized.

Technical Features and Effects (7)

Where the shell 800 is provided, the connector C1 provides improved electromagnetic compatibility (EMC) characteristics. This reduces the possibility that a device external to the connector C1 is adversely affected by electromagnetic noise from at least one of the at least one first terminal 200a, the at least one second terminal 200b (if provided), the at least one third terminal 600 (if provided), the internal circuit board 300, and the at least one current sensor 400, and/or the possibility that the at least one current sensor 400 is adversely affected by electromagnetic noise generated by a device external to the connector C1.

Technical Features and Effects (8)

The connector C1 is configured to be mountable on the external circuit board B1. It is therefore easy to replace an existing connector on the circuit board with the connector C1 including the at least one current sensor 400.

Technical Features and Effects (9)

The connector C1 is configured such that the at least one current sensor 400 can perform a non-contact detection of the current flowing through the at least one first terminal 200a. As such, the at least one current sensor 400 is resistant to Joule heating generated by the current flowing through the at least one first terminal 200a. This eliminates the need to provide a complicated circuit for temperature compensation on the internal circuit board 300, and the need to adopt an electronic component with good temperature characteristics as the at least one current sensor 400 or other electronic component. The connector C1 therefore can be provided at a reduced cost.

The assembly A1 as described above includes the connector C1, and accordingly provides the technical features and effects (1) to (9) described above.

Second Embodiment

Figure 6A:
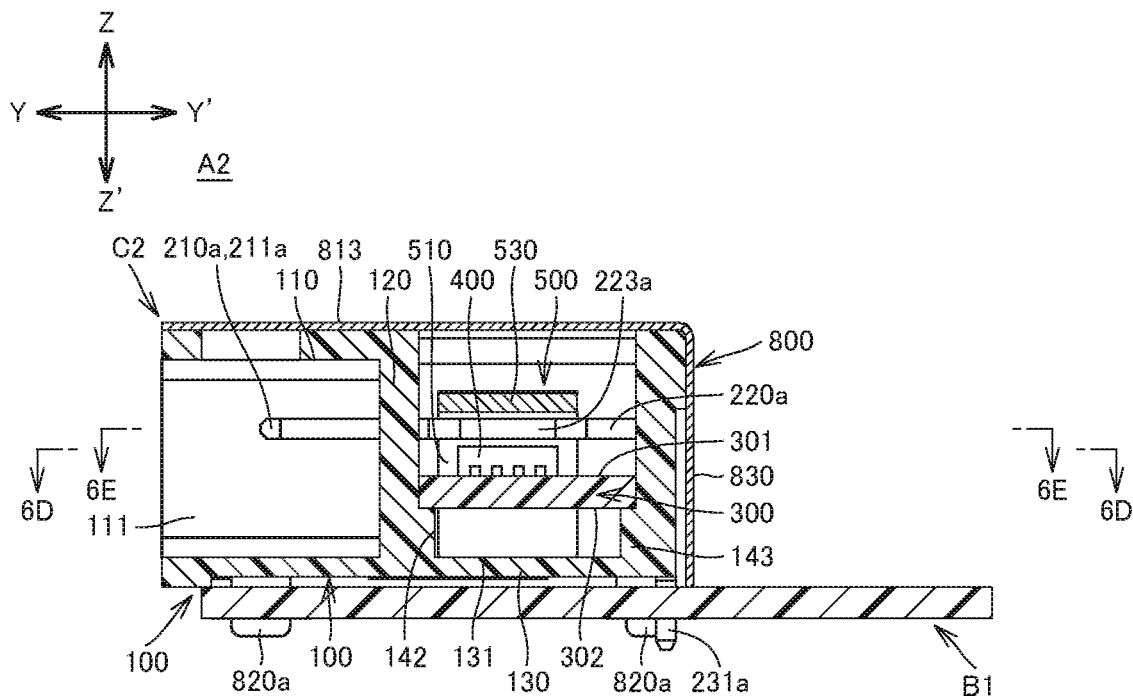
FIG. 6A is a cross-sectional view, corresponding to FIG. 2A, of a connector according to a second embodiment of the invention.
Figure 6B:
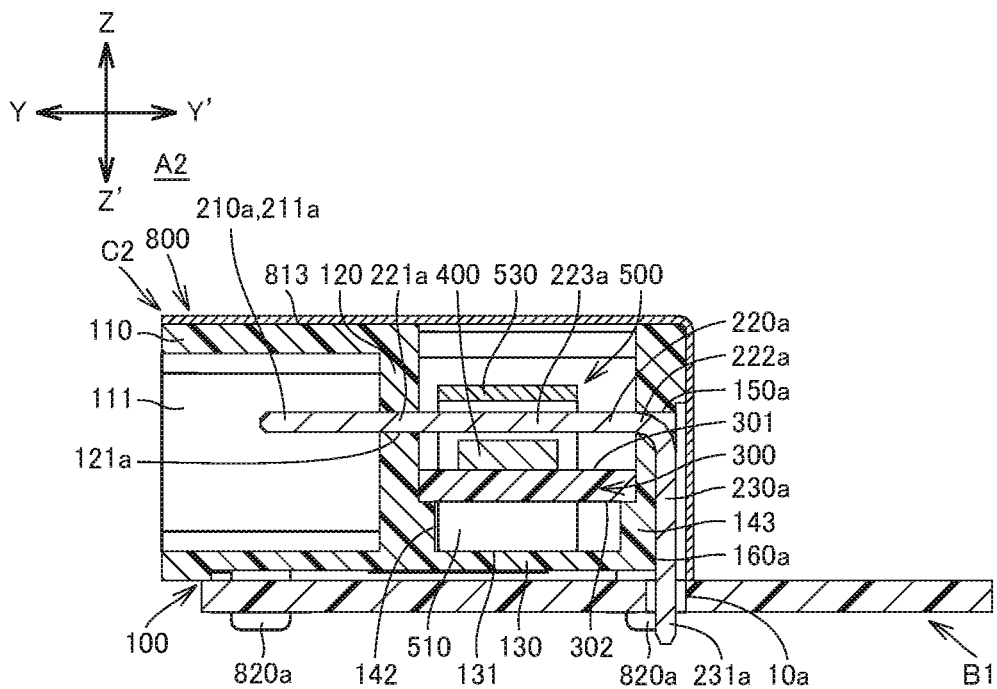
FIG. 6B is a cross-sectional view, corresponding to FIG. 2B, of the connector of the second embodiment.
Figure 6C:
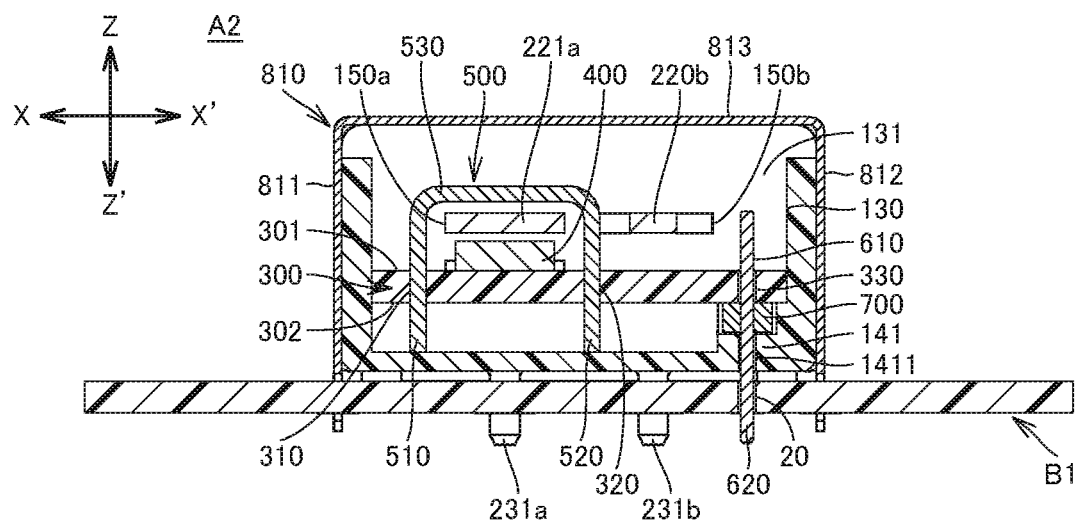
FIG. 6C is a cross-sectional view, corresponding to FIG. 2C, of the connector of the second embodiment.
Figure 6D:
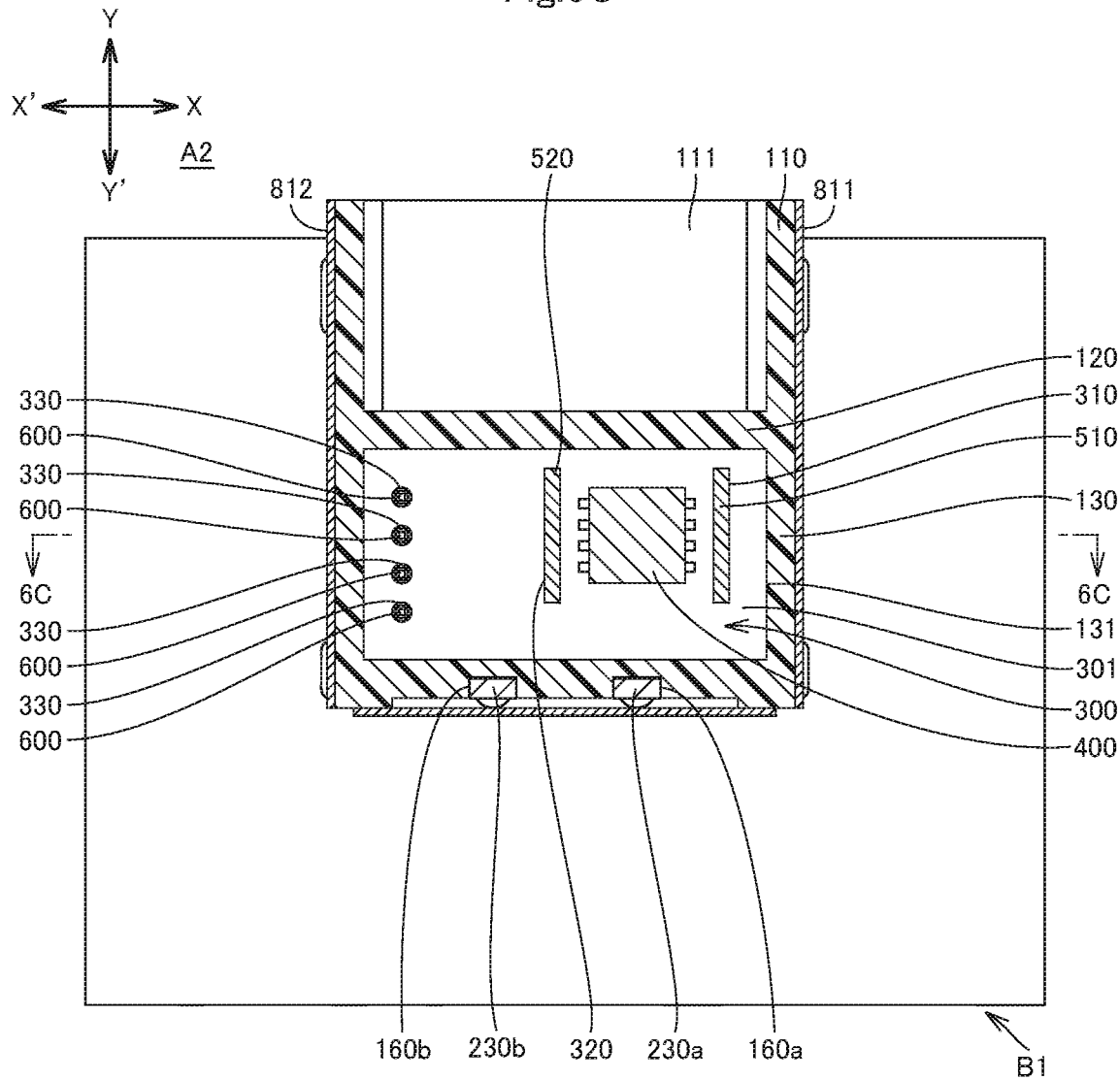
FIG. 6D is a cross-sectional view of the connector of the second embodiment, taken along line 6D-6D in FIG. 6A.
Figure 6E:
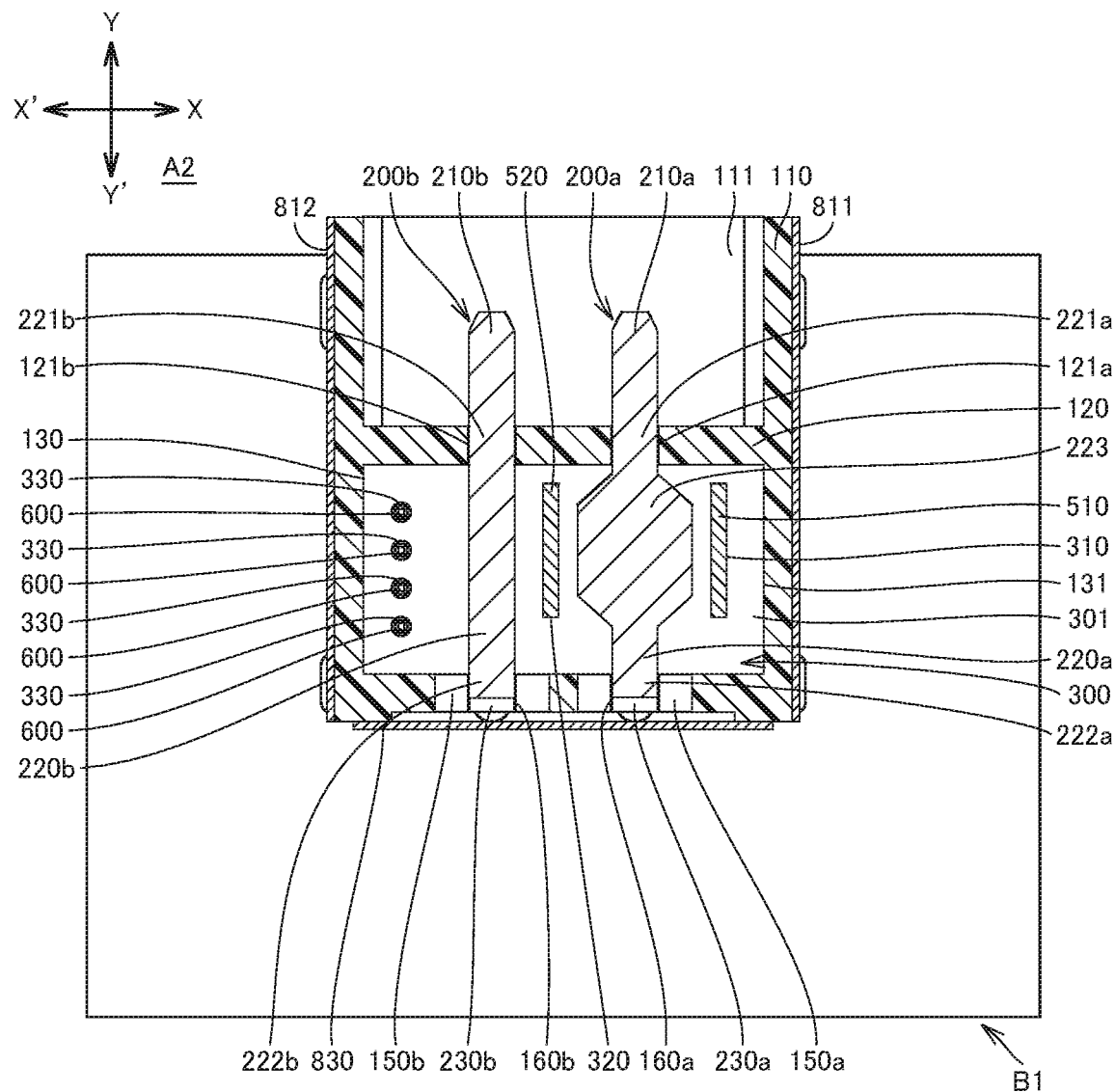
FIG. 6E is a cross-sectional view of the connector of the second embodiment, taken along line 6E-6E in FIG. 6A.
Figure 7A:
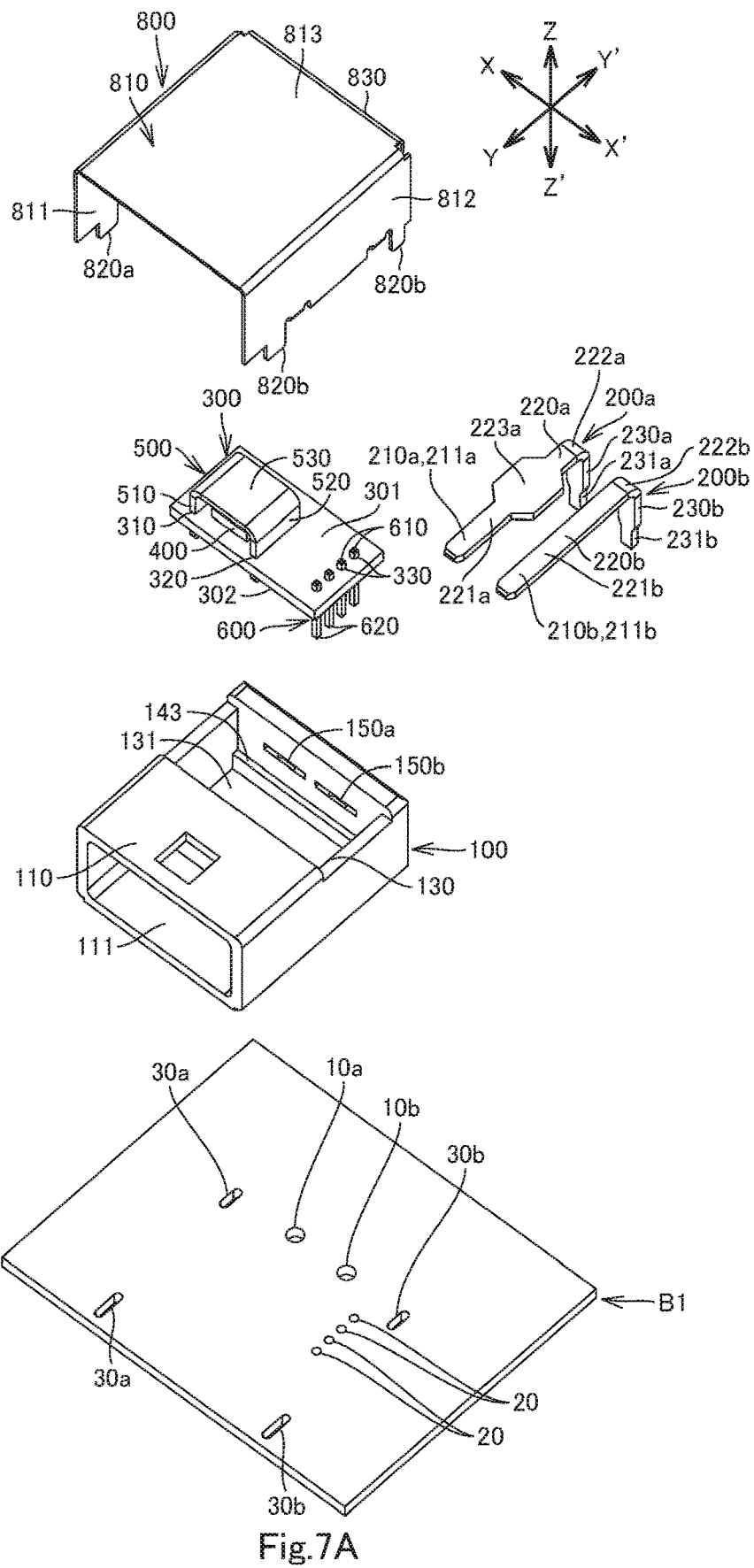
FIG. 7A is an exploded, front, top, right side perspective view of the connector according to the second embodiment.
Figure 7B:
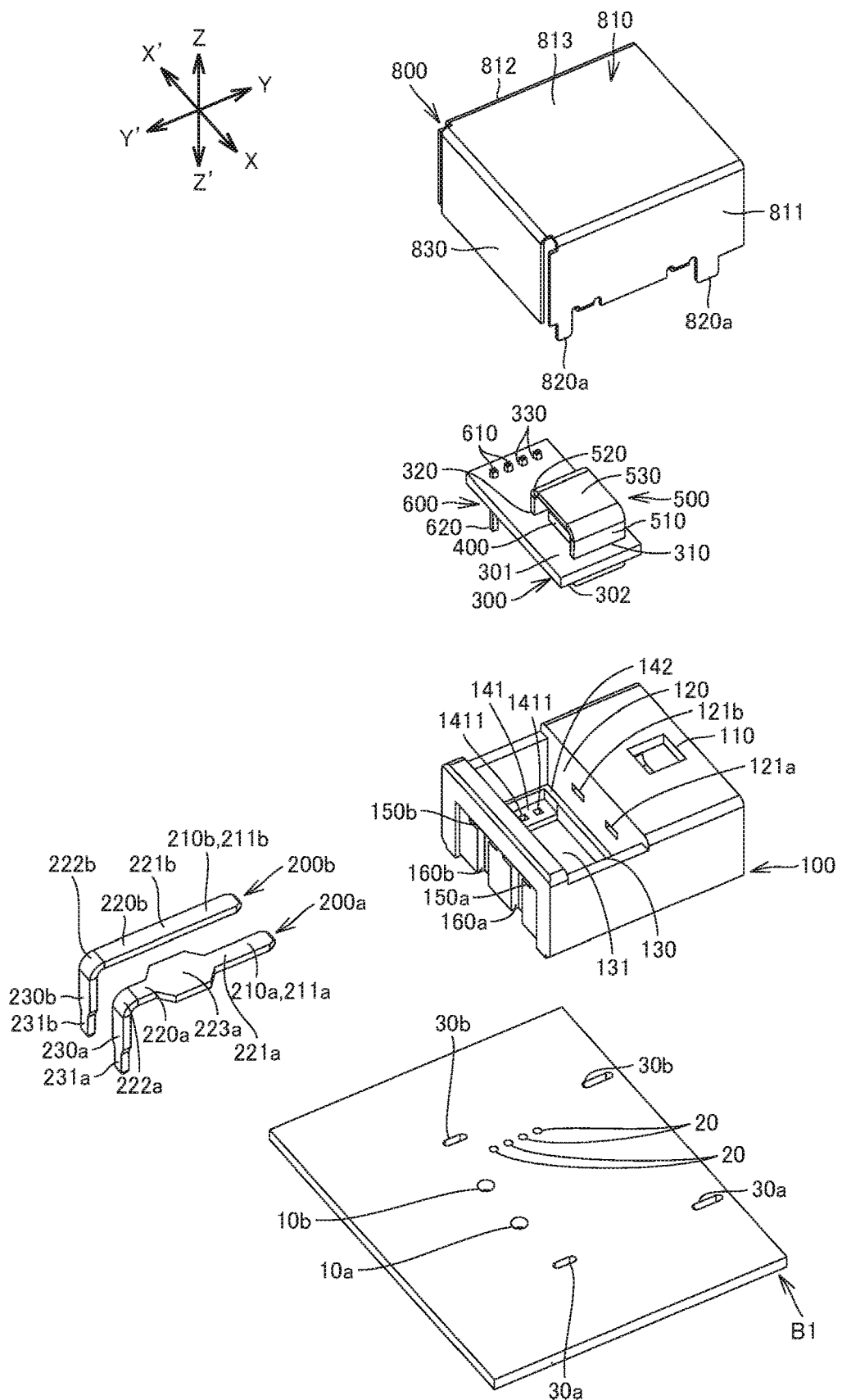
FIG. 7B is an exploded, rear, top, left side perspective view of the connector of the second embodiment.

Hereinafter described is a connector assembly A2, which may be referred to simply as an "assembly A2", according to a plurality of embodiments, including a second embodiment and variants thereof, of the invention with reference to FIGS. 6A to 7B. FIGS. 6A to 7B illustrate the assembly A2 of the second embodiment. FIGS. 6A, 6B, and 6D to 7B show the Y-Y' direction, which is defined similarly to that for the assembly A1. FIGS. 6C to 7B show the X-X' direction, which is defined similarly to that for the assembly A1. FIGS. 6A to 6C, 7A, and 7B show the Z-Z' direction, which is defined similarly to that for the assembly A1.

The assembly A2 includes a connector C2 and the external circuit board B1 described above. The connector C2 is similar in configuration to the connector C1, but different in that the internal circuit board 300 and the one or more current sensors 400 are located on the Z'-direction side relative to the measurement target 223a of the single first terminal 200a (see FIGS. 6A to 6C and FIGS. 7A and 7B), or relative to the measurement targets 223a of the first terminals 200a. The connector C2 will now be described focusing on the differences from the connector C1 and omitting overlapping descriptions.

Where the housing portion 130 of the body 100 is provided with the at least one positioning portion, the first positioning portion 141, the second positioning portion 142, and the third positioning portion 143 of the at least one positioning portion may each have the following configuration.

The end face on the Z-direction side of the first positioning portion 141 is located on the Z'-direction side relative to the face on the Z'-direction side of the measurement target 223a of the single first terminal 200a or relative to the faces on the Z'-direction side of the measurement targets 223a of the first terminals 200a. The end face on the Z-direction side of the first positioning portion 141 abuts on the second face 302 of the internal circuit board 300 from the Z'-direction side, directly or indirectly via the first additional member (for example, the support member 700).

The end face on the Z-direction side of the second positioning portion 142 is located on the Z'-direction side relative to the face on the Z'-direction side of the measurement target 223a of the single first terminal 200a or relative to the faces on the Z'-direction side of the measurement targets 223a of the first terminals 200a. The end face on the Z-direction side of the second positioning portion 142 abuts on the second face 302 of the internal circuit board 300 from the Z'-direction side, directly or indirectly via the second additional member.

The end face on the Z-direction side of the third positioning portion 143 is located on the Z'-direction side relative to the face on the Z'-direction side of the measurement target 223a of the single first terminal 200a or relative to the faces on the Z'-direction side of the measurement targets 223a of the first terminals 200a. The end face on the Z-direction side of the third positioning portion 143 abuts on the second face 302 of the internal circuit board 300 from the Z'-direction side, directly or indirectly via the third additional member.

As described above, at least one of the first positioning portion 141, the second positioning portion 142, or the third positioning portion 143 abuts on the internal circuit board 300, so that the internal circuit board 300 is secured in position on the Z'-direction side relative to the measurement target 223a of the single first terminals 200a or relative to the measurement targets 223a of the first terminals 200a.

Where the or each current sensor 400 is mounted on the first face 301 of the internal circuit board 300 (see FIGS. 6A to 6D, 7A, and 7B), the or each current sensor 400 is disposed such as to be located on the Z-direction side relative to the internal circuit board 300, be located on the Z'-direction side relative to, and in opposing spaced relation in the Z-Z' direction to, the corresponding measurement target 223a, and entirely or partly overlap the projected area of the corresponding measurement target 223a in the Z-Z' direction.

Where the or each current sensor 400 is mounted on the second face 302 of the internal circuit board 300 (not illustrated), the or each current sensor 400 is disposed such as to be located on the Z'-direction side relative to the internal circuit board 300 and the corresponding measurement target 223a, and entirely or partly overlaps the projected area of the corresponding measurement target 223a in the Z-Z' direction.

In either case, the or each current sensor 400 is located on the Y-direction side relative to the lead portion 230a of the corresponding first terminal 200a. In this case, the or each current sensor 400 may be configured to perform a non-contact detection of a composite magnetic field of a magnetic field generated around the measurement target 223a and a magnetic field generated around the lead portion 230a by a current flowing through the corresponding first terminal 200a, and to change an output signal (e.g., voltage) according to the strength of the composite magnetic field. Alternatively, the or each current sensor 400 may be configured to detect a magnetic field generated around the measurement target 223a and change the output signal (e.g., voltage) according to the strength of the magnetic field.

Where the at least one shield 500 of the connector C2 is provided, the or each shield 500 of the connector C2 has substantially the same configuration as the or each shield 500 of the connector C1, except that the third plate 530 is contiguous with at least one of the first plate 510 and the second plate 520, and disposed in spaced relation to, and not on the Z'-direction side but on the Z-direction side relative to, the measurement target 223a of the corresponding first terminal 200a. The at least one shield 500 of the connector C2 will be described focusing on the differences from that of the connector C1 and omitting overlapping descriptions.

The first plate 510 and the second plate 520 of the or each shield 500 of the connector C2 fixedly extend through the corresponding first fixing hole 310 and the corresponding second fixing hole 320, respectively, of the internal circuit board 300 in the Z-Z' direction. The first plate 510 covers the corresponding current sensor 400 and the measurement target 223a of the corresponding first terminal 200a from the X-direction side. The second plate 520 covers the corresponding current sensor 400 and the measurement target 223a of the corresponding first terminal 200a from the X'-direction side. The first plate 510 may not extends through the internal circuit board 300, but may be fixed to the first face 301 or the second face 302 of the internal circuit board 300, and the second plate 520 may be modified similarly to the first plate 510. In this case, the first fixing hole 310 and/or the second fixing hole 320 is omitted.

Where the corresponding current sensor 400 is mounted on the first face 301 of the internal circuit board 300 (see FIGS. 6A to 6C), the dimension in the Z-Z' direction of each of the first plate 510 and the second plate 520 of the or each shield 500 is substantially the same as (not illustrated), or larger than, the linear distance in the Z-Z' direction from the face on the Z-direction side of the measurement target 223a of the corresponding first terminal 200a to the first face 301 of the internal circuit board 300. Where the corresponding current sensor 400 is mounted on the second face 302 of the internal circuit board 300 (not illustrated), the dimension in the Z-Z' direction of each of the first plate 510 and the second plate 520 of the or each shield 500 is substantially the same as (not illustrated), or larger, than the linear distance in the Z-Z' direction from the face on the Z-direction side of the measurement target 223a of the corresponding first terminal 200a to the face on the Z'-direction side of the corresponding current sensor 400. The third plate 530 of the or each shield 500 is disposed in spaced relation to, and on the Z-direction side relative to, the measurement target 223a of the corresponding first terminal 200a, and covers the measurement target 223a of the corresponding first terminal 200a from the Z-direction side.

Where at least one of the first plate 510 or the second plate 520 of the or each shield 500 is provided, such at least one plate may, but is not required to, abut on the bottom of the housing space 131 of the housing portion 130 of the body 100.

The connector C2 may or may not further include the at least one communication element 900.

Similarly to the connector C1, the connector C2 is mounted on the mounting face of the external circuit board B1.

The novel connector C2 as described above is obtained. Further, the novel connector C2 may provide the following technical features and effects (1) to (9).

Technical Features and Effects (1)

The connector C2 provides improved detection accuracy to the at least one current sensor 400. The internal circuit board 300 is fixed to the body 100, and the at least one current sensor 400 mounted on the internal circuit board 300 is disposed near the measurement target 223a of the at least one first terminal 200a held by the body 100. As such, fixing the internal circuit board 300 inside the body 100 will results in determining the distance, the position, and the orientation of the at least one current sensor 400 on the internal circuit board 300 relative to the measurement target 223a of the at least one first terminal 200a, leading to the improved detection accuracy of the at least one current sensor 400.

In particular, where the housing portion 130 of the body 100 is provided with the housing space 131 and at least one positioning portion, namely at least one of the first positioning portion 141, the second positioning portion 142, or the third positioning portion 143, the internal circuit board 300 is secured in position to the housing portion 130 in the Y-Y', X-X', and Z-Z' directions by inserting the internal circuit board 300 into the housing space 131 of the housing portion 130 of the body 100, bringing the internal circuit board 300 into abutment with the at least one positioning portion (at least one of the first positioning portion 141, the second positioning portion 142, or the third positioning portion 143) from the Z-direction side, and securing the internal circuit board 300 in position to the housing portion 130 in the Y-Y' and X-X' directions in a manner described above. This securement in position determines the distance, the position, and the orientation of the at least one current sensor 400 on the internal circuit board 300 relative to the measurement target 223*a* of the at least one first terminal 200*a*, resulting in improved detection accuracy of the at least one current sensor 400.

Technical Features and Effects (2)

The connector C2 is easy to assemble. Where is provided with the housing space 131 and at least one positioning portion, namely at least one of the first positioning portion 141, the second positioning portion 142, or the third positioning portion 143, simply by inserting the internal circuit board 300 mounted with the at least one current sensor 400 into the housing space 131 of the housing portion 130 of the body 100 from the Z-direction side, the internal circuit board 300 is brought into abutment with the at least one positioning portion from the Z-direction side. In this state, by securing the internal circuit board 300 to the housing portion 130 in position in the Y-Y' and X-X' directions in a manner described above, the internal circuit board 300 is secured in position to the housing portion 130 in the Y-Y', X-X', and Z-Z' directions. To the thus secured internal circuit board 300 the at least one shield 500 may or may not be fixed. Thereafter, the at least one first terminal 200*a* may be assembled to the body 100 in a manner (1) or (2) described above. The at least one current sensor 400 on the internal circuit board 300 is thus secured in position relative to the measurement target 223*a* of the at least one first terminal 200*a* as described above. Thus it is possible to facilitate the assembly of the internal circuit board 300 and the at least one current sensor 400 to the housing portion 130 of the body 100. The at least one second terminal 200*b*, if provided, can be attached to the body 100 at any time.

Where there is provided at least one third terminal 600 being a rod or plate extending in the Z-Z' direction, the at least one third terminal 600 can be attached to the body 100 simply by inserting the internal circuit board 300 into the housing space 131 of the housing portion 130 of the body 100 and making the at least one third terminal 600 pass through the at least one through hole 1411 of the body 100.

Moreover, when the at least one first terminal 200*a* is assembled to the body 100 in a manner (1) or (2) described above after the internal circuit board 300 is secured in position to the housing portion 130 of the body 100 as described above, the internal circuit board 300 and the at least one current sensor 400 are unlikely to collide with the measurement target 223*a* of the at least one first terminal 200*a*. This is because the end face on the Z-direction side of the at least one positioning portion is located on the Z'-direction side relative to the face on the Z'-direction side of the measurement target 223*a* of the at least one first terminal 200*a*, and also because the at least one current sensor 400 is mounted on the first face 301 of the internal circuit board 300 and located on the Z'-direction side relative to, and in spaced relation to, the measurement target 223*a* of the at least one first terminal 200*a*, or alternatively the at least one current sensor 400 is mounted on the second face 302 of the internal circuit board 300.

Further, where the mounting portion 231*a* of the at least one first terminal 200*a*, the mounting portion 231*b* of the at least one second terminal 200*b*, and the external connecting portion 620 of the at least one third terminal 600 extend in the Z' direction, the mounting portion 231*a*, the mounting portion 231*b*, and the external connecting portion 620 can be readily inserted into, connected to, the at least one first electrode 10*a*, the at least one second electrode 20*a*, and the at least one third electrode 20, respectively, which are through-hole electrodes of the external circuit board B1.

Where the mounting portion 231*a* of the at least one first terminal 200*a* and the mounting portion 231*b* of the at least one second terminal 200*b* extend in the Y' direction and the external connecting portion 620 of the at least one third terminal 600 extends in the X' or X direction, the mounting portion 231*a*, the mounting portion 231*b*, and the external connecting portion 620 can be readily mounted on, connected to, the at least one first electrode 10*a*, the at least one second electrode 20*a*, and the at least one third electrode 20, respectively, which are surface electrodes of the external circuit board B1.

Technical Features and Effects (3)

Where the first plate 510 of the at least one shield 500 is provided, the first plate 510 is disposed in spaced relation to, and on the X-direction side relative to, the at least one current sensor 400 and the measurement target 223*a* of the at least one first terminal 200*a*. As such, the first plate 510 of the at least one shield 500 electromagnetically shields the at least one current sensor 400 and the measurement target 223*a* of the at least one first terminal 200*a* from the X-direction side. Where the second plate 520 of the at least one shield 500 is provided, the second plate 520 is disposed in spaced relation to, and on the X'-direction side relative to, the at least one current sensor 400 and the measurement target 223*a* of the at least one first terminal 200*a*. As such, the second plate 520 of the at least one shield 500 electromagnetically shields the at least one current sensor 400 and the measurement target 223*a* of the at least one first terminal 200*a* from the X'-direction side. Where the third plate 530 of the at least one shield 500 is provided, the third plate 530 is disposed in spaced relation to, and on the Z'-direction side relative to, the measurement target 223*a* of the at least one first terminal 200*a*. As such, the third plate 530 of the at least one shield 500 electromagnetically shields the measurement target 223*a* of the at least one first terminal 200*a* from the Z'-direction side.

Moreover, in a case where the at least one current sensor 400 and the measurement target 223*a* of the at least one first terminal 200*a* are disposed between the first plate 510 and the second plate 520 of the at least one shield 500, in the magnetic field generated around the measurement target 223*a* of the at least one first terminal 200*a* by the current flowing through the at least one first terminal 200*a*, the magnetic field distribution is made denser than that in a case where the first plate 510 and the second plate 520 of the at least one shield 500 are not provided. In other words, the magnetic field to detected by the at least one current sensor 400 becomes stronger. This results in improved detection accuracy of the at least one current sensor 400. Where the at least one shield 500 further includes the third plate 530, in the magnetic field generated around the measurement target 223*a* of the at least one first terminal 200*a* by the current flowing through the at least one first terminal 200*a*, the magnetic field distribution is made still denser, resulting in further improved detection accuracy of the at least one current sensor 400.

Technical Features and Effects (4)

The at least one current sensor 400 on the first face 301 or the second face 302 of the internal circuit board 300 may be configured to perform a non-contact detection of a composite magnetic field that is resulted from the combination of a magnetic field generated around the measurement target 223*a* and a magnetic field generated around the lead portion 230*a* by the current flowing through the at least one first terminal 200*a*, and change an output signal (e.g., voltage) according to the strength of the composite magnetic field. In this case, the magnetic field to be detected by the at least one current sensor 400 is stronger, resulting in improved detection accuracy of the at least one current sensor 400.

Technical Features and Effects (5)

Where the at least one third terminal 600 is provided, via the internal circuit board 300 and the at least one third terminal 600, at least one of the at least one current sensor 400, the at least one shield 500 (if provided), and the at least one communication element 900 (if provided) can be connected externally of the connector C2. This external connection makes it possible to output output signals of the at least one current sensor 400 to externally of the connector C2, or supply power from externally of the connector C2 to the at least one current sensor 400, and/or carry out signal communications of control signals from externally of the connector C2 to the at least one current sensor 400. The external connection also makes it possible to ground the at least one shield 500, or supply power from externally of the connector C2 to the at least one communication element 900, and/or carry out signal communications of control signals from externally of the connector C2 to the at least one communication element 900.

Technical Features and Effects (6)

Where the at least one first terminal 200a is configured such that the dimension in the first perpendicular direction (X-X' direction) of the measurement target 223a is larger than the dimension in the second perpendicular direction (X-X' direction) of the contact portion 211a of the distal portion 210a, and than the dimension in the third perpendicular direction (X-X' direction) of the mounting portion 231a of the lead portion 230a, the magnetic field, which is generated around the measurement target 223a of the at least one first terminal 200a by the current flowing through the at least one first terminal 200a, becomes stronger, resulting in improved detection accuracy of the at least one current sensor 400. Moreover, where the at least one first terminal 200a is the plurality of first terminals 200a, and/or where the at least one first terminal 200a and the at least one second terminal 200b are provided, the at least one first terminal 200a is configured such that the dimension in the second perpendicular direction (X-X' direction) of the contact portion 211a of the distal portion 210a is smaller than the dimension in the first perpendicular direction (X-X' direction) of the measurement target 223a. This makes it possible to reduce the distances in the X-X' direction between the contact portions 211a of the first terminals 200a, and/or reduce the distance between the contact portion 211a of the at least one first terminal 200a and a contact portion 211b of the at least one second terminal 200b that are adjacent to each other. The connector C2 is thus downsized.

Technical Features and Effects (7)

Where the shell 800 is provided, the connector C2 provides improved electromagnetic compatibility (EMC) characteristics. This reduces the possibility that a device external to the connector C2 is adversely affected by electromagnetic noise from at least one of the at least one first terminal 200a, the at least one second terminal 200b (if provided), the at least one third terminal 600 (if provided), the internal circuit board 300, and the at least one current sensor 400, and/or the possibility that the at least one current sensor 400 is adversely affected by electromagnetic noise generated by a device external to the connector C2.

Technical Features and Effects (8)

The connector C2 is configured to be mountable on the external circuit board B1. It is therefore easy to replace an existing connector on the circuit board with the connector C2 including the at least one current sensor 400.

Technical Features and Effects (9)

The connector C2 is configured such that the at least one current sensor 400 can perform a non-contact detection of the current flowing through the at least one first terminal 200a. As such, the at least one current sensor 400 is resistant to Joule heating generated by the current flowing through the at least one first terminal 200a. This eliminates the need to provide a complicated circuit for temperature compensation on the internal circuit board 300, and the need to adopt an electronic component with good temperature characteristics as the at least one current sensor 400 or other electronic component. The connector C2 therefore can be provided at a reduced cost.

The assembly A2 as described above includes the connector C2, and accordingly provides the technical features and effects (1) to (9) described above.

Third Embodiment

Figure 8A:
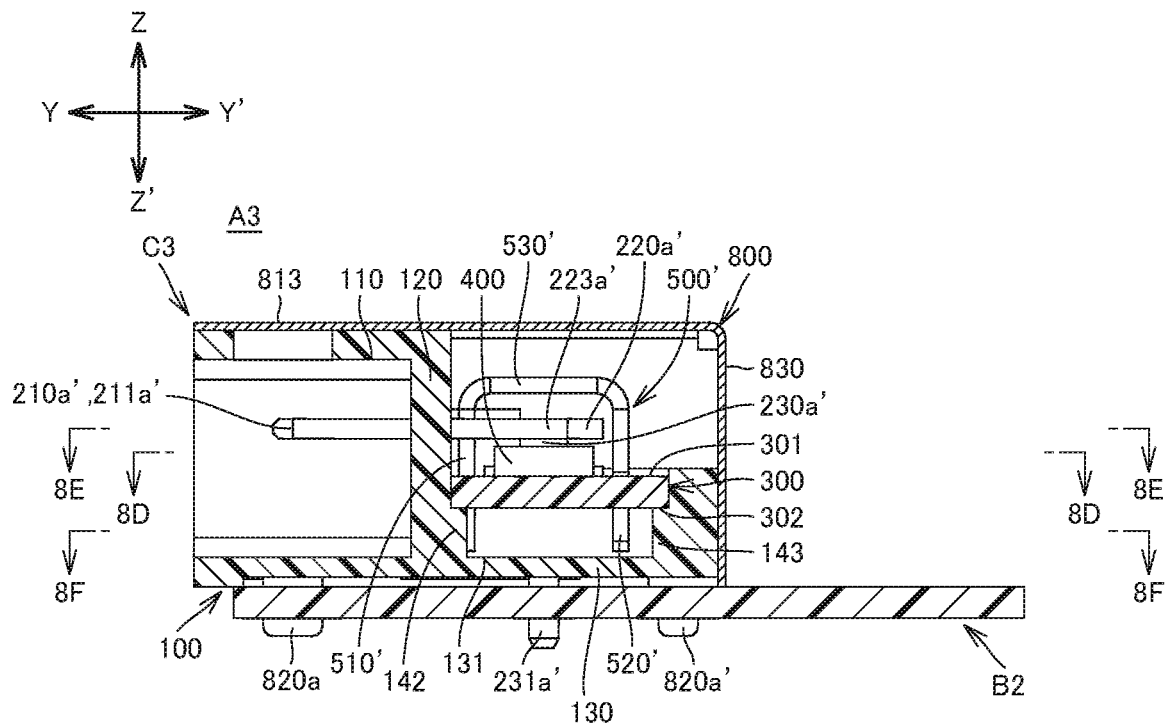
FIG. 8A is a cross-sectional view, corresponding to FIG. 6A, of a connector of a third embodiment.
Figure 8B:
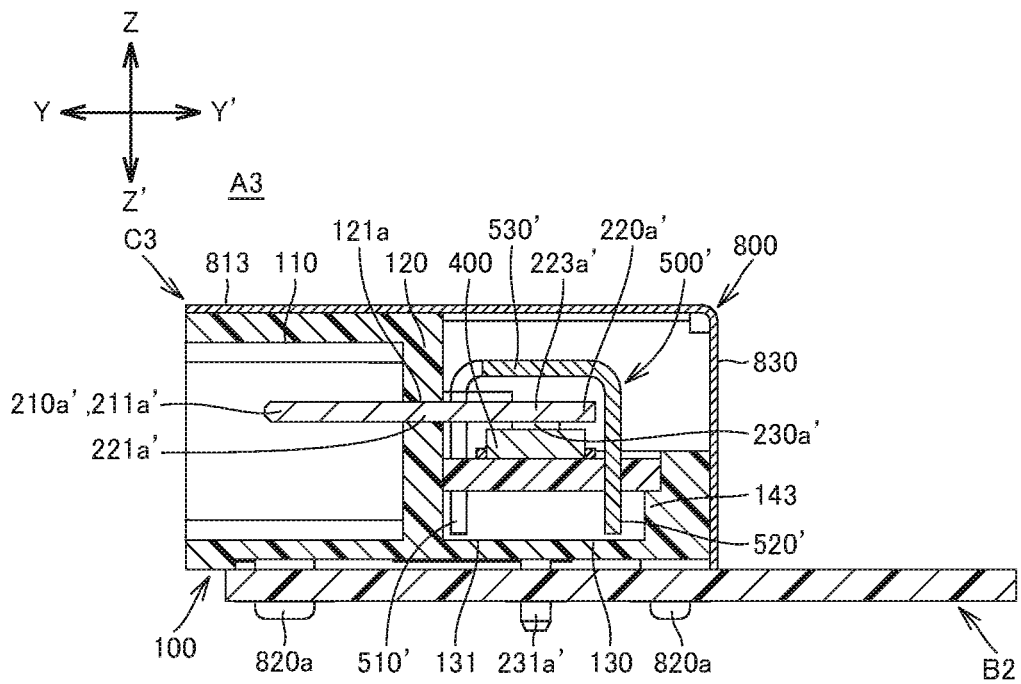
FIG. 8B is a cross-sectional view, corresponding to FIG. 6B, of the connector of the third embodiment.
Figure 8C:
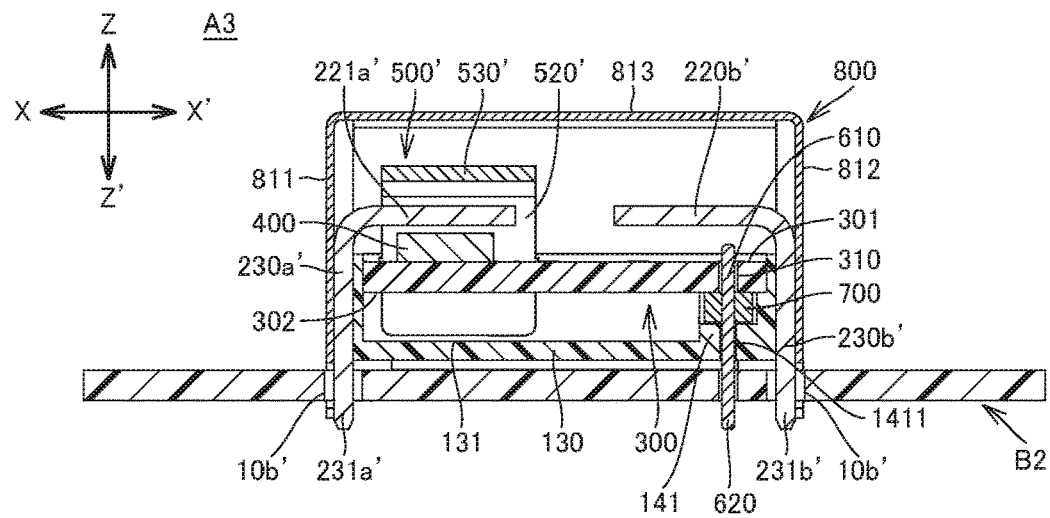
FIG. 8C is a cross-sectional view of the connector of the third embodiment, taken along line 8C-8C in FIG. 8D.
Figure 8D:
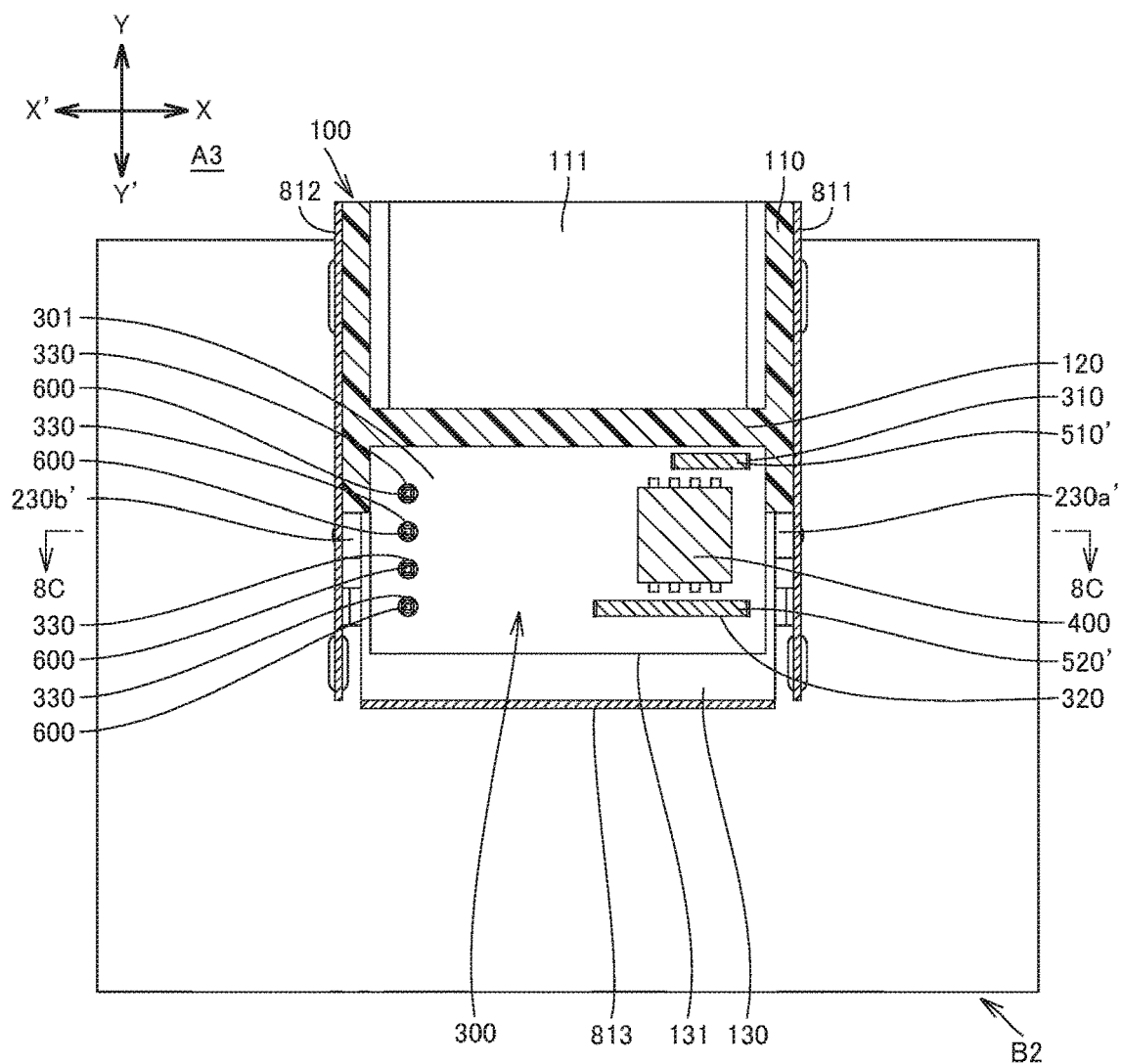
FIG. 8D is a cross-sectional view of the connector of the third embodiment, taken along line 8D-8D in FIG. 8A.
Figure 8E:
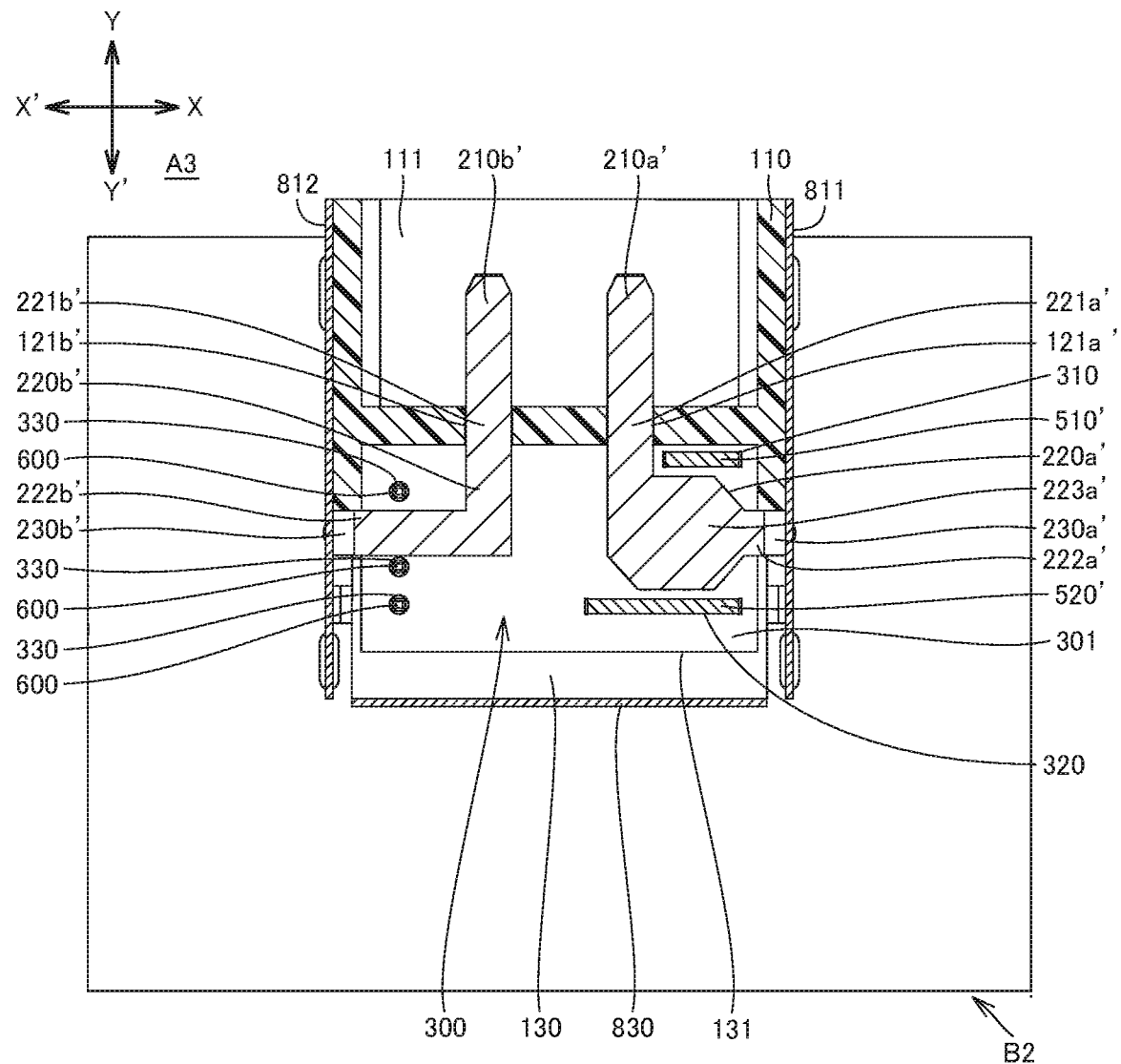
FIG. 8E is a view of the connector of the third embodiment, taken along line 8E-8E in FIG. 8A.
Figure 8F:
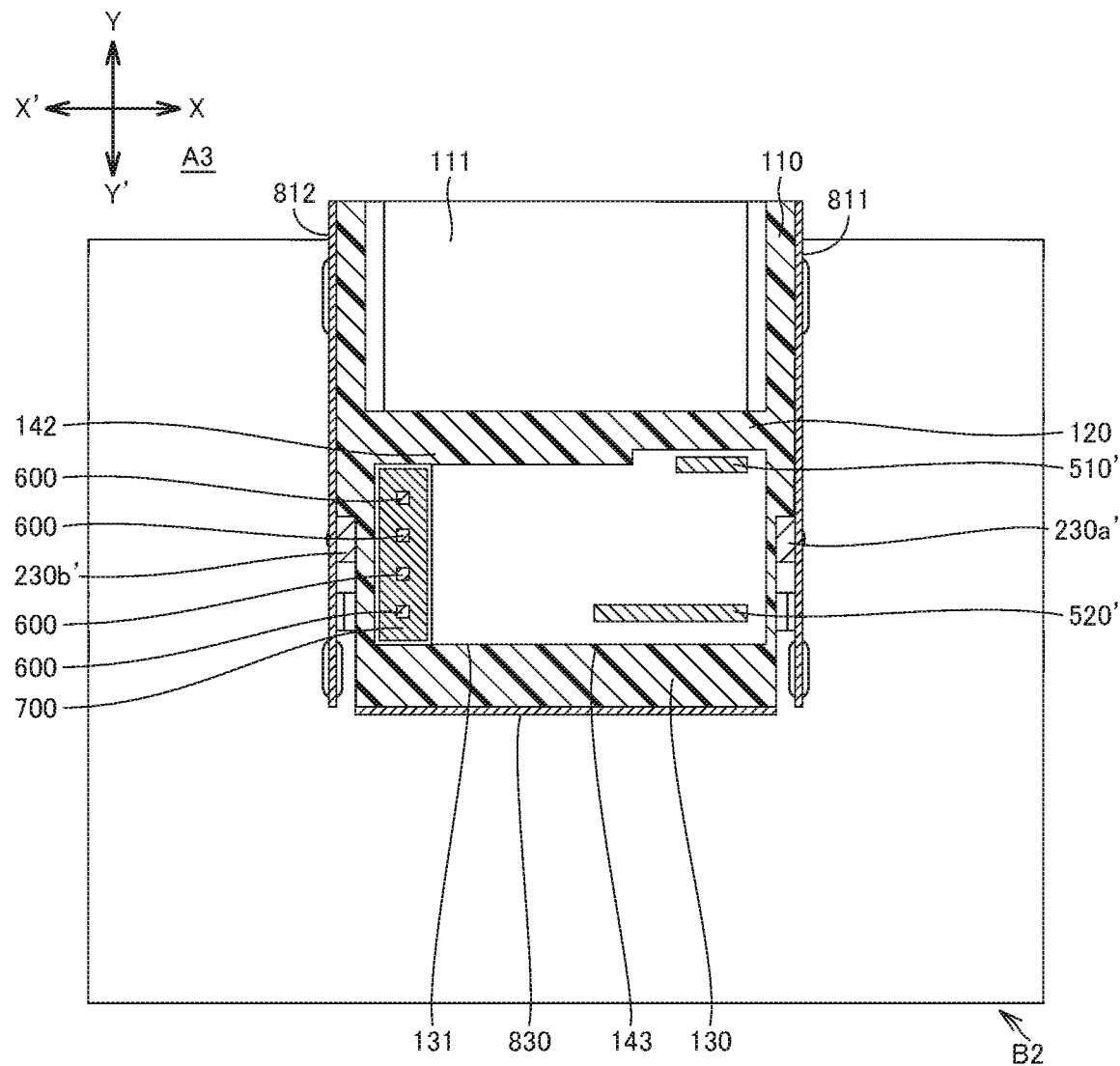
FIG. 8F is a view of the connector of the third embodiment, taken along line 8F-8F in FIG. 8A.
Figure 9A:
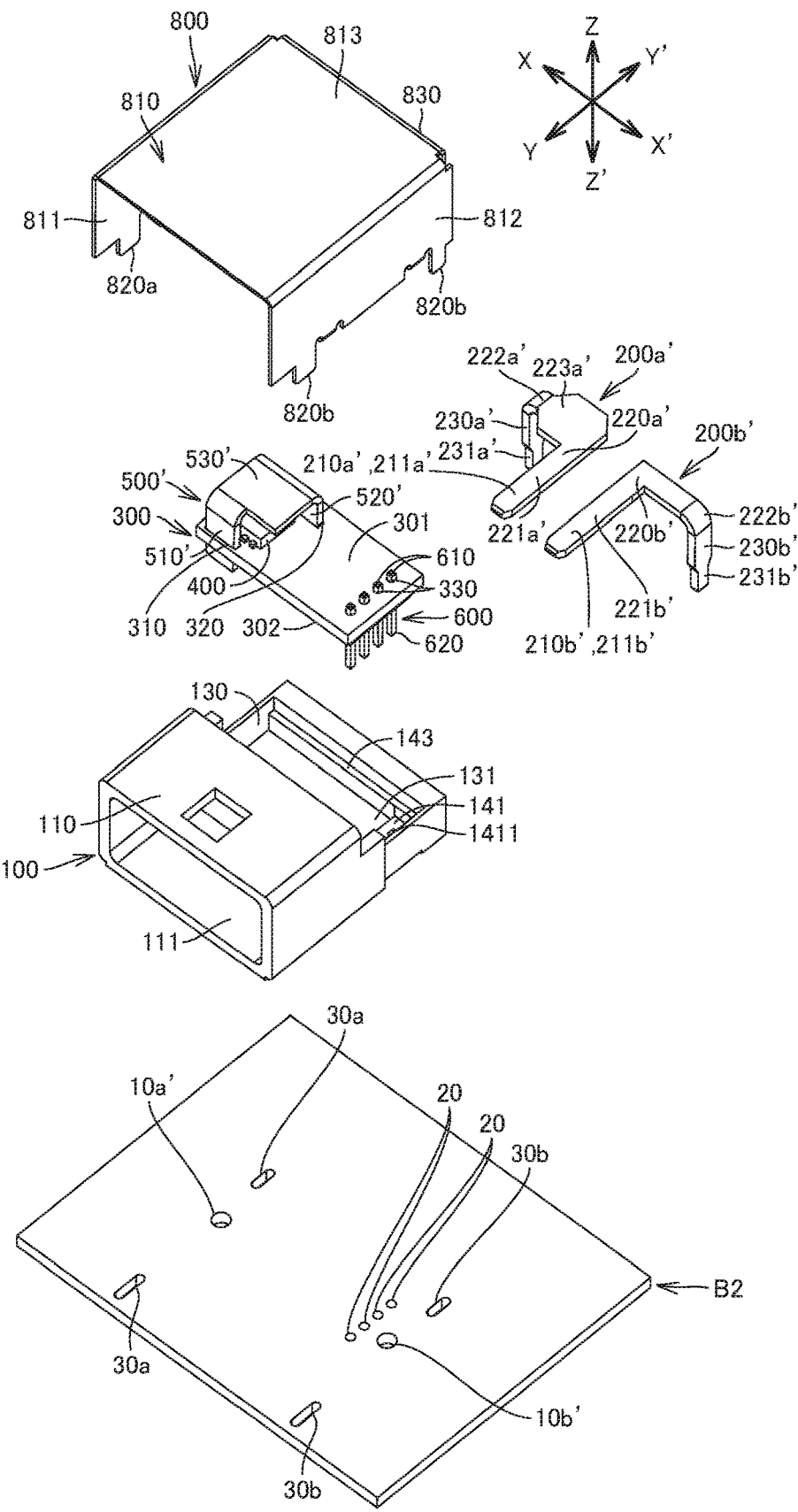
FIG. 9A is an exploded, front, top, right side perspective view of the connector according to the third embodiment.
Figure 9B:
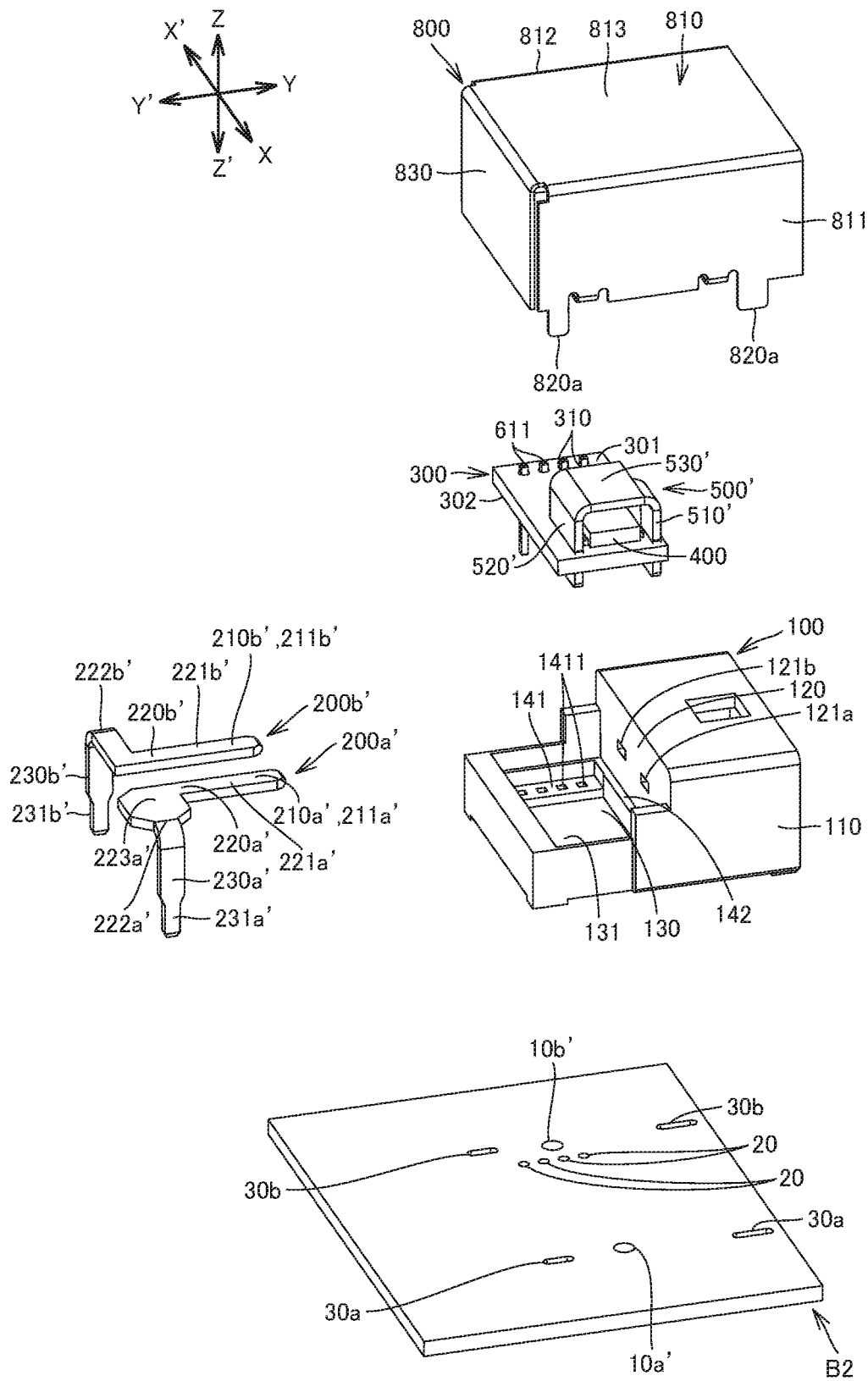
FIG. 9B is an exploded, rear, top, left side perspective view of the connector of the third embodiment.

Hereinafter described is a connector assembly A3, which may be referred to simply as an "assembly A3", according to a plurality of embodiments, including a third embodiment and variants thereof, of the invention with reference to FIGS. 8A to 9B. FIGS. 8A to 9B illustrate the assembly A3 of the third embodiment. FIGS. 8A and 8B and FIGS. 8D to 9B show the Y-Y' direction, which is defined similarly to that for the assembly A1. FIGS. 8C to 9B show the X-X' direction, which is defined similarly to that for the assembly A1. FIGS. 8A to 8C, 9A, and 9B show the Z-Z' direction, which is defined similarly to that for the assembly A1.

The assembly A3 includes a connector C3 and the external circuit board B1 described above. The connector C3 is similar in configuration to the connector C2, but different in the following respects: the connector C3 includes at least one first terminal 200a' of different configuration from that of the at least one first terminal 200a of the connector C2; the connector C3 may include at least one second terminal 200b' of different configuration from that of the at least one second terminal 200b of the connector C2; and the connector C3 may include at least one shield 500' of different configuration from that of the at least one shield 500 of the connector C2. The connector C3 will now be described focusing on the differences from the connector C2 and omitting overlapping descriptions. Note that a prime symbol (') is added to each of the reference numerals for the at least one first terminal 200a', the at least one second terminal 200b', and the at least one shield 500', and their sub-elements, of the connector C3 for the sake of distinction from the at least one first terminal 200a, the at least one second terminal 200b, and the at least one shield 500 of the connectors C2.

The at least one first terminal 200a' of the connector C3 is different from the at least one first terminal 200a of the connector C2 in that the at least one first terminal 200a' includes a body portion 220a' bent in a generally L shape and a lead portion 230a' disposed on the X-direction side relative to the housing portion 130 of the body 100.

The at least one first terminal 200a' includes a distal portion 210a' of the same configuration as that of the distal portion 210a described above. The body portion 220a' includes a first portion 221a', a measurement target 223a' and a second portion 222a'. The first portion 221a' is held in the first holding hole 121a of the body 100 in the same manner as the first portion 221a described above. The measurement target 223a' extends in the X direction. The second portion 222a' is located on the X-direction side relative to the measurement target 223a', and on the Z-direction side relative to the face on the Z-direction side of the first wall of the housing portion 130 of the body 100. In other words, the face on the Z-direction side of the first wall of the housing portion 130 of the body 100 is located on the Z'-direction side relative to the second portion 222a' of the at least one first terminal 200a'. The lead portion 230a' includes a main lead portion and a mounting portion 231a'. The main lead portion extends from the second portion 222a' in the Z' direction. The mounting portion 231a' may extend from the main lead portion in the Z', X, or X' direction. Where the shell 800 is provided, the main lead portion of the lead portion 230a' may be disposed in spaced relation to the first wall 811 of the shell body 810 in the X-X' direction, or alternatively an insulator may be interposed between the main lead portion and the first wall 811.

In the at least one first terminal 200a', a dimension in a first perpendicular direction of the measurement target 223a' may be, but is not required to be, larger than, or the same as, a dimension in a second perpendicular direction of the contact portion 211a' of the distal portion 210a'. Also, in the or each first terminal 200a', the dimension in the first perpendicular direction of the measurement target 223a' may be, but is not required to be, larger than, or the same as, a dimension in a third perpendicular direction of the mounting portion 231a' of the lead portion 230a'. In the at least one first terminal 200a', the Y' direction is the direction in which a current flows through the distal portion 210a' (i.e. the direction in which a current flows through the contact portion 211a'); the Y' direction and then bent to the X direction is the direction in which a current flows to the body portion 220a; the X direction is the direction in which a current flows through the measurement target 223a; where the mounting portion 231a' of the lead portion 230a' extends in the Z' direction, Z' direction is the direction in which a current flows through the mounting portion 231a' of the lead portion 230a; and where the mounting portion 231a' of the lead portion 230a' extends in the X direction, X direction is the direction in which a current flows through the mounting portion 231a' of the lead portion 230a'. The first perpendicular direction, defined as a direction substantially perpendicular to the direction in which a current flows through the measurement target 223a', is the Y-Y' direction. The second perpendicular direction, defined as a direction substantially perpendicular to the direction in which a current flows through the contact portion 211a', is the X-X' direction. The third perpendicular direction, defined as a direction substantially perpendicular to the direction in which a current flows through the mounting portion 231a', is the Y-Y' direction.

Where the at least one second terminal 200b' of the connector C3 is provided, the at least one second terminal 200b' of the connector C3 is different from the at least one second terminal 200b of the connector C2 in that the at least one second terminal 200b' includes a body portion 220b' bent in a generally L shape and a lead portion 230b' disposed on the X'-direction side relative to the housing portion 130 of the body 100.

The at least one second terminal 200b' includes a distal portion 210b' of the same configuration as that of the distal portion 210b described above. The body portion 220b' includes a first portion 221b' and a second portion 222b'. The first portion 221b' is held in the second holding hole 121b of the body 100 in the same manner as the first portion 221b described above. The second portion 222b' is located on the Z-direction side relative to the face on the Z-direction side of the second wall of the housing portion 130 of the body 100. In other words, the face on the Z-direction side of the second wall of the housing portion 130 of the body 100 is located on the Z'-direction side relative to the second portion 222b' of the at least one second terminal 200b'. The lead portion 230b' includes a main lead portion and a mounting portion 231b'. The main lead portion extends in the Z' direction from the second portion 222b' of the body portion 220b'. The mounting portion 231b' may extend from the main lead portion in the Z', X, or X' direction. Where the shell 800 is provided, the main lead portion of the lead portion 230b' may be disposed in spaced relation to the second wall 812 of the shell body 810 in the X-X' direction, or alternatively an insulator may be interposed between the main lead portion and the second wall 812.

The face on the Z-direction side of the third wall of the housing portion 130 of the body 100 may be located on the Z'-direction side relative to the face on the Z-direction side of the second portion 222b' of the body portion 220b', and may be located at the same height position in the Z-Z' direction as the face on the Z-direction side of each of the first and second walls. The body 100 is provided with neither the first receiving hole 150a nor the first guide groove 160a. Even in a case where the at least one second terminal 200b' is provided, the body 100 is provided with neither the second receiving hole 150b nor the second guide groove 160b.

Where the housing portion 130 of the body 100 is provided with the at least one positioning portion, the first positioning portion 141, the second positioning portion 142, and the third positioning portion 143 of the at least one positioning portion may each have the following configuration.

The end face on the Z-direction side of the first positioning portion 141 is located on the Z'-direction side relative to the face on the Z'-direction side of the measurement target 223a' of the at least one first terminal 200a'. The end face on the Z-direction side of the first positioning portion 141 abuts on the second face 302 of the internal circuit board 300 from the Z'-direction side, directly or indirectly via the first additional member (for example, the support member 700).

The end face on the Z-direction side of the second positioning portion 142 is located on the Z'-direction side relative to the face on the Z'-direction side of the measurement target 223a' of the at least one first terminal 200a'. The end face on the Z-direction side of the second positioning portion 142 abuts on the second face 302 of the internal circuit board 300 from the Z'-direction side, directly or indirectly via the second additional member.

The end face on the Z-direction side of the third positioning portion 143 is located on the Z'-direction side relative to the face on the Z'-direction side of the measurement target 223a' of the at least one first terminal 200a'. The end face on the Z-direction side of the third positioning portion 143 abuts on the second face 302 of the internal circuit board 300 from the Z'-direction side, directly or indirectly via the third additional member.

As described above, at least one of the first positioning portion 141, the second positioning portion 142, or the third positioning portion 143 abuts on the internal circuit board 300, so that the internal circuit board 300 is secured in position on the Z'-direction side relative to the measurement target 223a' of the at least one first terminal 200a'.

Where the at least one current sensor 400 is mounted on the first face 301 of the internal circuit board 300 (see FIGS. 8A to 8D, 9A, and 9B), the at least one current sensor 400 is disposed such as to be located on the Z-direction side relative to the internal circuit board 300, be located on the Z'-direction side relative to, and in opposing spaced relation in the Z-Z' direction to, the measurement target 223a' of the at least one first terminal 200*a'*, and entirely or partly overlap the projected area of the measurement target 223*a'* of the at least one first terminal 200*a'* in the Z-Z' direction.

Where the at least one current sensor 400 is mounted on the second face 302 of the internal circuit board 300 (not illustrated), the at least one current sensor 400 is disposed such as to be located on the Z'-direction side relative to the internal circuit board 300 and the measurement target 223*a'* of the at least one first terminal 200*a'*, and entirely or partly overlaps the projected area of the measurement target 223*a'* of the at least one first terminal 200*a'* in the Z-Z' direction.

In either case, the at least one current sensor 400 is located on the X'-direction side relative to the lead portion 230*a'* of the at least one first terminal 200*a'*. In this case, the at least one current sensor 400 may be configured to perform a non-contact detection of a composite magnetic field of a magnetic field generated around the measurement target 223*a'* and a magnetic field generated around the lead portion 230*a'* by a current flowing through the at least one first terminal 200*a'*, and to change an output signal (e.g., voltage) according to the strength of the composite magnetic field. Alternatively, the or each current sensor 400 may be configured to detect a magnetic field generated around the measurement target 223*a'* and change the output signal (e.g., voltage) according to the strength of the magnetic field.

The end face or faces on the Z-direction side of at least one of the first positioning portion 141, the second positioning portion 142, or the third positioning portion 143 may be located on the Z-direction side relative to the face on the Z-direction side of the measurement target 223*a'* of the at least one first terminal 200*a'*. In this case, at least one of the first positioning portion 141, the second positioning portion 142, or the third positioning portion 143 abuts on the internal circuit board 300, so that the internal circuit board 300 is secured in position on the Z-direction side relative to the measurement target 223*a'* of the at least one first terminal 200*a'*.

Where the at least one current sensor 400 is mounted on the first face 301 of the internal circuit board 300 (not illustrated), the at least one current sensor 400 is disposed such as to be located on the Z-direction side relative to the internal circuit board 300 and the measurement target 223*a'* of the at least one first terminal 200*a'*, and entirely or partly overlap the projected area of the measurement target 223*a'* of the at least one first terminal 200*a'* in the Z-Z' direction.

Where the at least one current sensor 400 is mounted on the second face 302 of the internal circuit board 300 (not illustrated), the at least one current sensor 400 is disposed such as to be located on the Z'-direction side relative to the internal circuit board 300, be located on the Z-direction side relative to, and in opposing spaced relation in the Z-Z' direction to, the measurement target 223*a'* of the at least one first terminal 200*a'*, and entirely or partly overlap the projected area of the measurement target 223*a'* of the at least one first terminal 200*a'* in the Z-Z' direction.

In either case, the at least one current sensor 400 may be configured to detect a magnetic field generated around the measurement target 223*a'* by a current flowing through the at least one first terminal 200*a'* and change an output signal (e.g., voltage) according to the strength of the magnetic field.

Where the at least one shield 500' of the connector C3 is provided, the at least one shield 500' of the connector C3 is made of a magnetic material, such as a metal. The at least one shield 500' includes at least one of, or at least two of, a first plate 510', a second plate 520', or a third plate 530'. The first plate 510' is fixed to the internal circuit board 300 and disposed in spaced relation to, and on the Y-direction side relative to, the at least one current sensor 400 and the measurement target 223*a'* of the at least one first terminal 200*a'*. The second plate 520' is fixed to the internal circuit board 300 and disposed in spaced relation to, and on the Y'-direction side relative to, the at least one current sensor 400 and the measurement target 223*a'* of the at least one first terminal 200*a'*.

Where the internal circuit board 300 is located on the Z'-direction side relative to the measurement target 223*a'* of the at least one first terminal 200*a'*, the third plate 530' is contiguous with at least one of the first plate 510' or the second plate 520' and disposed in spaced relation to, and on the Z-direction side relative to, the measurement target 223*a'* of the at least one first terminal 200*a'*.

For example, the at least one shield 500' may, but is not required to, further have the following configuration.

The first plate 510' and the second plate 520' are made of a magnetic material, such as a metal, have a plate shape extending in the Z-Z' and X-X' directions. The first plate 510' fixedly extends through the first fixing hole 310 of the internal circuit board 300 in the Z-Z' direction, and is disposed in spaced relation to, and on the Y-direction side relative to, the at least one current sensor 400 on the first face 301 or the second face 302 of the internal circuit board 300 and the measurement target 223*a'* of the at least one first terminal 200*a*. The first plate 510' is disposed on the X-direction side relative to, and in spaced relation to, a portion between the measurement target 223*a'* and the first portion 221*a'* of the at least one first terminal 200*a'*. The second plate 520' fixedly extends through the second fixing hole 320 of the internal circuit board 300 in the Z-Z' direction, and is disposed in spaced relation to, and on the Y'-direction side relative to, the at least one current sensor 400 on the first face 301 or the second face 302 of the internal circuit board 300 and the measurement target 223*a* of the at least one first terminal 200*a*. The first plate 510' may not extends through the internal circuit board 300, but may be fixed to the first face 301 or the second face 302 of the internal circuit board 300, and the second plate 520' may be modified similarly to the first plate 510'. In this case, the first fixing hole 310 and/or the second fixing hole 320 is omitted.

The linear distance in the Y-Y' direction from the face on the Y-direction side of the first plate 510' to the face on the Y'-direction side of the second plate 520' is larger than the dimension in the Y-Y' direction of the at least one current sensor 400, and than the dimension in the Y-Y' direction of the measurement target 223*a'* of the at least one first terminal 200*a'*. The first plate 510' has a dimension in the X-X' direction that is smaller than the dimension in the X-X' direction of the at least one current sensor 400 and the dimension in the X-X' direction of the measurement target 223*a'* of the at least one first terminal 200*a'*. The second plate 520' has a dimension in the X-X' direction that is substantially the same as (not illustrated), or larger than (see FIGS. 8D, 9A, and 9B), the dimension in the X-X' direction of the at least one current sensor 400 and/or substantially the same as (not illustrated), or larger than (see FIGS. 8D, 9A, and 9B), the dimension in the X-X' direction of the measurement target 223*a'* of the at least one first terminal 200*a'*. The first plate 510' covers from the Y-direction side, and electromagnetically shields, the at least one current sensor 400 and the measurement target 223*a'* of the at least one first terminal 200*a'*. The second plate 520' covers from the Y'-direction side, and electromagnetically shields, the at least one current sensor 400 and the measurement target 223a' of the at least one first terminal 200a'.

Where the internal circuit board 300 is located on the Z'-direction side relative to the measurement target 223a' of the at least one first terminal 200a' and the at least one current sensor 400 is mounted on the first face 301 of the internal circuit board 300, each of the first plate 510' and the second plate 520' has a dimension in the Z-Z' direction that is substantially the same as (not illustrated), or larger than (see FIGS. 8B, 8C, 9A, and 9B), the linear distance in the Z-Z' direction from the face on the Z-direction side of the measurement target 223a' of the at least one first terminal 200a' to the first face 301 of the internal circuit board 300.

Where the internal circuit board 300 is located on the Z'-direction side relative to the measurement target 223a' of the at least one first terminal 200a' and the at least one current sensor 400 is mounted on the second face 302 of the internal circuit board 300, each of the first plate 510' and the second plate 520' has a dimension in the Z-Z' direction that is substantially the same as (not illustrated), or larger than (not illustrated), the linear distance in the Z-Z' direction from the face on the Z-direction side of the measurement target 223a' of the at least one first terminal 200a' to the face on the Z'-direction side of the at least one sensor 400.

Where the internal circuit board 300 is located on the Z-direction side relative to the measurement target 223a' of the at least one first terminal 200a' and the at least one current sensor 400 is mounted on the first face 301 of the internal circuit board 300, each of the first plate 510' and the second plate 520' has a dimension in the Z-Z' direction that is substantially the same as (not illustrated), or larger than (not illustrated), the linear distance in the Z-Z' direction from the face on the Z-direction side of the at least one current sensor 400 to the face on the Z'-direction side of the measurement target 223a' of the at least one first terminal 200a'.

Where the internal circuit board 300 is located on the Z-direction side relative to the measurement target 223a' of the at least one first terminal 200a' and the at least one current sensor 400 is mounted on the second face 302 of the internal circuit board 300, each of the first plate 510' and the second plate 520' has a dimension in the Z-Z' direction that is substantially the same as (not illustrated), or larger than (not illustrated), the linear distance in the Z-Z' direction from the first face 301 of the internal circuit board 300 to the face on the Z'-direction side of the measurement target 223a' of the at least one first terminal 200a'.

The third plate 530' is made of a magnetic material, such as a metal, and has a plate shape extending in the X-X' and Y-Y' directions. Where both the first plate 510' and the second plate 520' are provided, the third plate 530' couples between the first plate 510' and the second plate 520' (see FIGS. 8A to 9B). Where one of the first plate 510' or the second plate 520' is provided, the third plate 530' is contiguous with the one plate (not illustrated). In either case, the third plate 530' has a dimension in the Y-Y' direction that is larger than the dimension in the Y-Y' direction of the measurement target 223a' of the at least one first terminal 200a', and has a dimension in the X-X' direction that is substantially the same as, or larger than, the dimension in the X-X' direction of the measurement target 223a' of the at least one first terminal 200a'. Where the internal circuit board 300 is located on the Z'-direction side relative to the measurement target 223a' of the at least one first terminal 200a', the third plate 530' covers from the Z-direction side, and electromagnetically shields, the measurement target 223a' of the at least one first terminal 200a'. Where the internal circuit board 300 is located on the Z-direction side relative to the measurement target 223a' of the at least one first terminal 200a', the third plate 530' is omitted.

The connector C3 may or may not further include the at least one communication element 900. The connector C3 is mounted on the mounting face of the external circuit board B2.

The external circuit board B2 has substantially the same configuration as the external circuit board B1, except that the external circuit board B2 includes at least one first electrode 10a' disposed at a different position from the position of the at least one first electrode 10a of the external circuit board B1, and may include at least one second electrode 10b' disposed at a different position from the position of the at least one second electrode 10b of the external circuit board B1.

The at least one first electrode 10a' is a through-hole electrode extending through the external circuit board B2 in the Z-Z' direction (see FIGS. 8A and 8B), or is a surface electrode on the mounting face (not illustrated). Where the mounting portion 231a' of the at least one first terminal 200a' of the connector C3 extends in the Z' direction, the at least one first electrode 10a' is a through-hole electrode provided at a position on the external circuit board B2 that corresponds to the mounting portion 231a' of the at least one first terminal 200a'. The mounting portion 231a' of the at least one first terminal 200a' extends through the at least one first electrode 10a' and is electrically and mechanically connected (fixed) to the at least one first electrode 10a' with solder, a conductive adhesive, or the like. Where the mounting portion 231a' of the at least one first terminal 200a' of the connector C3 extends in the X direction, the at least one first electrode 10a' is a surface electrode provided at a position on the external circuit board B2 that corresponds to the mounting portion 231a' of the at least one first terminal 200a'. The mounting portion 231a' of the at least one first terminal 200a is electrically and mechanically connected (fixed) to the at least one first electrode 10a' with solder, a conductive adhesive, or the like.

The at least one second electrode 10b' is a through-hole electrode extending through the external circuit board B2 in the Z-Z' direction (see FIGS. 8A and 8B), or is a surface electrode on the mounting face (not illustrated). Where the mounting portion 231b' of the at least one second terminal 200b' of the connector C3 extends in the Z' direction, the at least one second electrode 10b' is a through-hole electrode provided at a position on the external circuit board B2 that corresponds to the mounting portion 231b' of the at least one second terminal 200b'. The mounting portion 231b' of the at least one second terminal 200b' extends through the at least one second electrode 10b' and is electrically and mechanically connected (fixed) to the at least one second electrode 10b' with solder, a conductive adhesive, or the like. Where the mounting portion 231b' of the at least one second terminal 200b' of the connector C3 extends in the X' direction, the at least one second electrode 10b' is a surface electrode provided at a position on the external circuit board B2 that corresponds to the mounting portion 231b' of the at least one second terminal 200b'. The mounting portion 231b' of the at least one second terminal 200b' is electrically and mechanically connected (fixed) to the at least one second electrode 10b' with solder, a conductive adhesive, or the like.

The novel connector C3 as described above is obtained. Further, the novel connector C3 may provide the following technical features and effects (1) to (9).

Technical Features and Effects (1)

The connector C3 provides improved detection accuracy to the at least one current sensor 400. The internal circuit board 300 is fixed to the body 100, and the at least one current sensor 400 mounted on the internal circuit board 300 is disposed near the measurement target 223a' of the at least one first terminal 200a' held by the body 100. As such, fixing the internal circuit board 300 inside the body 100 will results in determining the distance, the position, and the orientation of the at least one current sensor 400 on the internal circuit board 300 relative to the measurement target 223a' of the at least one first terminal 200a', leading to the improved detection accuracy of the at least one current sensor 400.

In particular, where the housing portion 130 of the body 100 is provided with the housing space 131 and at least one positioning portion, namely at least one of the first positioning portion 141, the second positioning portion 142, or the third positioning portion 143, the internal circuit board 300 is secured in position to the housing portion 130 in the Y-Y', X-X', and Z-Z' directions by inserting the internal circuit board 300 into the housing space 131 of the housing portion 130 of the body 100, bringing the internal circuit board 300 into abutment with the at least one positioning portion (at least one of the first positioning portion 141, the second positioning portion 142, or the third positioning portion 143) from the Z-direction side, and securing the internal circuit board 300 in position to the housing portion 130 in the Y-Y' and X-X' directions in a manner described above. This securement in position determines the distance, the position, and the orientation of the at least one current sensor 400 on the internal circuit board 300 relative to the measurement target 223a' of the at least one first terminal 200a', resulting in improved detection accuracy of the at least one current sensor 400.

Technical Features and Effects (2)

The connector C3 is easy to assemble. Where is provided with the housing space 131 and at least one positioning portion, namely at least one of the first positioning portion 141, the second positioning portion 142, or the third positioning portion 143, simply by inserting the internal circuit board 300 mounted with the at least one current sensor 400 into the housing space 131 of the housing portion 130 of the body 100 from the Z-direction side, the internal circuit board 300 is brought into abutment with the at least one positioning portion from the Z-direction side. In this state, by securing the internal circuit board 300 to the housing portion 130 in position in the Y-Y' and X-X' directions in a manner described above, the internal circuit board 300 is secured in position to the housing portion 130 in the Y-Y', X-X', and Z-Z' directions. Thereafter, in the at least one first terminal 200a', the distal portion 210a' is inserted from the Y' direction into the at least one first holding hole 121a of the body 100, the first portion 221a' of the body portion 220a' is securely inserted from the Y' direction into the at least one first holding hole 121a, the measurement target 223a' of the body portion 220a' is disposed into the housing space 131 of the housing portion 130 of the body 100, and the lead portion 230a' is disposed on the X-direction side relative to the housing portion 130 of the body 100. The at least one current sensor 400 on the internal circuit board 300 is thus secured in position relative to the measurement target 223a' of the at least one first terminal 200a' as described above. Thus it is possible to facilitate the assembly of the internal circuit board 300 and the at least one current sensor 400 to the housing portion 130 of the body 100. The at least one shield 500', if provided, may be fixed to the internal circuit board 300 after the at least one first terminal 200a' is assembled to the housing portion 130 of the body 100.

Where there is provided at least one third terminal 600 being a rod or plate extending in the Z-Z' direction, the at least one third terminal 600 can be attached to the body 100 simply by inserting the internal circuit board 300 into the housing space 131 of the housing portion 130 of the body 100 and making the at least one third terminal 600 pass through the at least one through hole 1411 of the body 100.

Moreover, when the at least one first terminal 200a' is assembled to the body 100 after the internal circuit board 300 is secured in position to the housing portion 130 of the body 100 as described above, the internal circuit board 300 and the at least one current sensor 400 are unlikely to collide with the measurement target 223a' of the at least one first terminal 200a'. This is because the end face on the Z-direction side of the at least one positioning portion is located on the Z'-direction side relative to the face on the Z'-direction side of the measurement target 223a' of the at least one first terminal 200a', and also because the at least one current sensor 400 is mounted on the first face 301 of the internal circuit board 300 and is located on the Z'-direction side relative to, and in spaced relation to, the measurement target 223a' of the at least one first terminal 200a', or alternatively the at least one current sensor 400 is mounted on the second face 302 of the internal circuit board 300.

Further, where the mounting portion 231a' of the at least one first terminal 200a', the mounting portion 231b' of the at least one second terminal 200b', and the external connecting portion 620 of the at least one third terminal 600 extend in the Z' direction, the mounting portion 231a', the mounting portion 231b', and the external connecting portion 620 can be readily inserted into, connected to, the at least one first electrode 10a, the at least one second electrode 20a, and the at least one third electrode 20, respectively, which are through-hole electrodes of the external circuit board B1.

Technical Features and Effects (3)

Where the first plate 510' of the at least one shield 500' is provided, the first plate 510' is disposed in spaced relation to, and on the X-direction side relative to, the at least one current sensor 400 and the measurement target 223a of the at least one first terminal 200a'. As such, the first plate 510' of the at least one shield 500' electromagnetically shields the at least one current sensor 400 and the measurement target 223a' of the at least one first terminal 200a' from the X-direction side. Where the second plate 520' of the at least one shield 500' is provided, the second plate 520' is disposed in spaced relation to, and on the X'-direction side relative to, the at least one current sensor 400 and the measurement target 223a' of the at least one first terminal 200a'. As such, the second plate 520' of the at least one shield 500' electromagnetically shields the at least one current sensor 400 and the measurement target 223a' of the at least one first terminal 200a' from the X'-direction side. Where the third plate 530' of the at least one shield 500' is provided, the third plate 530' is disposed in spaced relation to, and on the Z'-direction side relative to, the measurement target 223a' of the at least one first terminal 200a'. As such, the third plate 530' of the at least one shield 500' electromagnetically shields the measurement target 223a' of the at least one first terminal 200a' from the Z'-direction side.

Moreover, in a case where the at least one current sensor 400 and the measurement target 223a' of the at least one first terminal 200a' are disposed between the first plate 510' and the second plate 520' of the at least one shield 500', in the magnetic field generated around the measurement target 223a' of the at least one first terminal 200a' by the current flowing through the at least one first terminal 200a', the magnetic field distribution is made denser than that in a case where the 510' and the second plate 520' of the at least one shield 500' are not provided. In other words, the magnetic field to detected by the at least one current sensor 400 becomes stronger. This results in improved detection accuracy of the at least one current sensor 400. Where the at least one shield 500' further includes the third plate 530', the current flows through the at least one first terminal 200a', in the magnetic field generated around the measurement target 223a' of the at least one first terminal 200a' by the current flowing through the at least one first terminal 200a', the magnetic field distribution is made still denser, resulting in further improved detection accuracy of the at least one current sensor 400.

Technical Features and Effects (4)

The at least one current sensor 400 on the first face 301 or the second face 302 of the internal circuit board 300 may be configured to perform a non-contact detection of a composite magnetic field that is resulted from the combination of a magnetic field generated around the measurement target 223a' and a magnetic field generated around the lead portion 230a' by the current flowing through the at least one first terminal 200a', and change an output signal (e.g., voltage) according to the strength of the composite magnetic field. In this case, the magnetic field to be detected by the at least one current sensor 400 is stronger, resulting in improved detection accuracy of the at least one current sensor 400.

Technical Features and Effects (5)

Where the at least one third terminal 600 is provided, via the internal circuit board 300 and the at least one third terminal 600, at least one of the at least one current sensor 400, the at least one shield 500' (if provided), and the at least one communication element 900 (if provided) can be connected externally of the connector C3. This external connection makes it possible to output output signals of the at least one current sensor 400 to externally of the connector C3, or supply power from externally of the connector C3 to the at least one current sensor 400, and/or carry out signal communications of control signals from externally of the connector C3 to the at least one current sensor 400. The external connection also makes it possible to ground the at least one shield 500', or supply power from externally of the connector C3 to the at least one communication element 900, and/or carry out signal communications of control signals from externally of the connector C3 to the at least one communication element 900.

Technical Features and Effects (6)

Where the at least one first terminal 200a' is configured such that the dimension in the first perpendicular direction (Y-Y' direction) of the measurement target 223a' is larger than the dimension in the second perpendicular direction (X-X' direction) of the contact portion 211a' of the distal portion 210a', and than the dimension in the third perpendicular direction (Y-Y' direction) of the mounting portion 231a' of the lead portion 230a', the magnetic field, which is generated around the measurement target 223a' of the at least one first terminal 200a' by the current flowing through the at least one first terminal 200a', becomes stronger, resulting in improved detection accuracy of the at least one current sensor 400.

Technical Features and Effects (7)

Where the shell 800 is provided, the connector C3 provides improved electromagnetic compatibility (EMC) characteristics. This reduces the possibility that a device external to the connector C3 is adversely affected by electromagnetic noise from at least one of the at least one first terminal 200a', the at least one second terminal 200b' (if provided), the at least one third terminal 600 (if provided), the internal circuit board 300, and the at least one current sensor 400, and/or the possibility that the at least one current sensor 400 is adversely affected by electromagnetic noise generated by a device external to the connector C3.

Technical Features and Effects (8)

The connector C3 is configured to be mountable on the external circuit board B2. It is therefore easy to replace an existing connector on the circuit board with the connector C3 including the at least one current sensor 400.

Technical Features and Effects (9)

The connector C3 is configured such that the at least one current sensor 400 can perform a non-contact detection of the current flowing through the at least one first terminal 200a'. As such, the at least one current sensor 400 is resistant to heating generated by the current flowing through the at least one first terminal 200a'. This eliminates the need to provide a complicated circuit for temperature compensation on the internal circuit board 300, and the need to adopt an electronic component with good temperature characteristics as the at least one current sensor 400 or other electronic component. The connector C3 therefore can be provided at a reduced cost.

The assembly A3 as described above includes the connector C3, and accordingly provides the technical features and effects (1) to (9) described above.

The assembly, the connector, and the external circuit board described above of the invention are not limited to the embodiments described above, but may be modified as appropriate within the scope of the claims. Some examples of modification are described below.

The connecting portion 110 of the body 100 may further include a connecting projection extending in the Y direction from the holding portion 120 and being disposed in the connecting space 111 (not illustrated). Alternatively, the connecting portion 110 may not be the tube extending in the Y-Y' direction as described above, but may be a member including a connecting projection extending in the Y direction from the holding portion 120 (not illustrated). In the latter case, the connecting space 111 is omitted. Where the shell 800 is provided, the connecting projection of the connecting portion 110 may be disposed in the shell body 810 of the shell 800. The connecting portion of the mating connector may be removably received in the shell body 810 in the Y-Y' direction.

The connecting projection is provided with at least one first hole or groove. The at least one first hole extends in the Y-Y' direction, communicates with the at least one first holding hole 121a, and is open in the Y direction. The distal portion 210a of the at least one first terminal 200a is received in, and exposed in the Y direction from, the at least one first hole. The at least one first groove extends in the Y-Y' direction, communicates with the at least one first holding hole 121a, and is open in the Z or Z' direction. The distal portion 210a of the at least one first terminal 200a is received in, and exposed in the Z or Z' direction from, the at least one first groove. Where the at least one second holding hole 121b and the at least one second terminal 200b are provided, the connecting projection may be further provided with at least one second hole or groove. The at least one second hole extends in the Y-Y' direction, communicates with the at least one second holding hole 121b, and is open in the Y direction. The distal portion 210b of the at least one second terminal 200b is received in, and exposed in the Y direction from the at least one second hole. The at least one second groove extends in the Y-Y' direction, communicates with the at least one second holding hole 121b, and is open in the Z or Z' direction. The distal portion 210b of the at least one second terminal 200b is received in, and exposed in the Z or Z' direction from, the at least one second groove.

The connecting portion 110 described above can be omitted. In this case, the distal portion 210a of the at least one first terminal 200a and the distal portion 210b of the at least one second terminal 200b (if the second terminal 200b is provided) protrude from the holding portion 120 in the Y direction. Where the shell 800 is provided, the distal portion 210a of the at least one first terminal 200a and the distal portion 210b of the at least one second terminal 200b (if the second terminal 200b is provided) may be disposed inside the shell body 810 of the shell 800. The shell body 810 may be configured to removably receive a connecting portion of a mating connector along the Y-Y' direction.

The body 100 may include first and second positioning grooves (not illustrated) in place of the at least one positioning portion. The first and second positioning grooves are provided on the first and second walls, respectively, of the housing portion 130, extend in the Y-Y' direction, and communicate with the housing space 131. Each of the first and second positioning grooves has a dimension in the Z-Z' direction that is substantially the same as, or slightly smaller than, the dimension in the Z-Z' direction of the internal circuit board 300. Each of the first and second positioning grooves has a dimension in the Y-Y' direction that is substantially the same as, or slightly smaller than, the dimension in the Y-Y' direction of the internal circuit board 300. The linear distance in the X-X' direction from an inner face on the X'-direction side of the first positioning groove to an inner face on the X-direction side of the second positioning groove is substantially the same as, or slightly smaller than, the dimension in the X-X' direction of the internal circuit board 300. The first and second positioning grooves are located on the Z-direction side relative to the face on the Z-direction side of the measurement target 223a of the single first terminal 200a or relative to the faces on the Z-direction side of the measurement targets 223a of the first terminals 200a, or alternatively located on the Z'-direction side relative to the face on the Z'-direction side of the measurement target 223a of the single first terminal 200a or relative to the faces on the Z'-direction side of the measurement targets 223a of the first terminals 200a. The end on the X-direction side and the end on the X'-direction side of the internal circuit board 300 are fitted respectively into the first and second positioning grooves from the Y' direction and are in contact with inner faces on the Y-direction side of the first and second positioning grooves. The internal circuit board 300 is thus secured fixed in position to the first and second positioning grooves in the Y-Y', X-X', and Z-Z' directions, on the Z- or Z'-direction side relative to the measurement target 223a of the single first terminal 200a or relative to the measurement targets 223a of the first terminals 200a. The end face on the Z-direction side of the third wall of the housing portion 130 may be located on the Z'-direction side relative to the faces on the Z'-direction side of the first and second positioning grooves. Alternatively, the end face on the Z-direction side of the third wall may be located on the Z-direction side relative to the face on the Z-direction sides of the first and second positioning grooves. In the latter case, the third wall of the housing portion 130 may be provided with a through hole extending therethrough in the Y-Y' direction and communicating with the first and second positioning grooves (not illustrated). The through hole has a dimension in the Z-Z' direction that is larger than the dimension in the Z-Z' direction of each of the first and second positioning grooves. The through hole has a dimension in the X-X' direction that is substantially the same as, or larger than, the linear distance described above. In this case, the end on the X-direction side and the end on the X'-direction side of the internal circuit board 300 are inserted through the through hole, fitted respectively into the first and second positioning grooves from the Y' direction, and brought into abutment with the inner faces on the Y-direction side of the first and second positioning grooves. Where the at least one shield 500 is fixed to the internal circuit board 300, the through hole may serve as a hole to pass therethrough the internal circuit board 300 and the at least one shield 500. Where the or each third terminal 600 is provided, the or each third terminal 600 may be passed through the corresponding through hole 1411 in the Z-Z' direction after the internal circuit board 300 is fitted into the first and second positioning grooves.

By fitting the internal circuit board 300 into the first and second positioning grooves from the Y'-direction side, the internal circuit board 300 is secured in position to the housing portion 130 in the Y-Y', X-X', and Z-Z' directions. In any case, when the internal circuit board 300 is secured in position to the housing portion 130 in the Y-Y', X-X', and Z-Z' directions, the at least one current sensor 400 on the internal circuit board 300 is secured in position to the housing portion 130 in the Y-Y', X-X', and Z-Z' directions, on the Z- or Z'-direction side relative to the measurement target 223a of the at least one first terminal 200a, such that the at least one current sensor at least partly overlaps in the Z-Z' direction with the projected area of the measurement target 223a of the at least one first terminal 200a. This securement in position further facilitates the determination of the distance, the position, and the direction of the at least one current sensor 400 relative to the measurement target 223a of the at least one first terminal 200a, resulting in further improved detection accuracy of the at least one current sensor 400.

The above housing space 131 of the housing portion 130 of the body 100 may be filled with an insulating resin by potting the insulating resin. In this case, the insulating resin forms part of the body 100. Where the body 100 has configuration of (1) or (2) described above but not configuration (3) or (4) described above, the body portion or portions 220a (including the measurement target or targets 223a) of the one or more first terminals 200a, the internal circuit board 300, the one or more current sensors 400, and the shield 500 (if provided) in the housing space 131 are embedded in the insulating resin filled in the housing space 131. Where the body 100 has configurations (1) and (3) or configurations (2) and (4), the body or portions 220a (including the measurement target or targets 223a) of the one or more first terminals 200a, the body portion or portions 220b of the one or more second terminals 200b, the internal circuit board 300, the one or more current sensors 400, and the shield 500 (if provided) in the housing space 131 are embedded in the insulating resin filled in the housing space 131.

Where the at least one shield 500 or 500' is not provided, or alternatively where the at least one shield 500 or 500' does not include the third plate 530 or 530', the main body 220a or 220a' of the at least one first terminal 200a or 200a' may be embedded in the holding portion 120 of the body 100 by insert molding. In this case, the housing portion 130 of the body 100 may be provided on the Z-direction side of the holding portion 120 of the body 100 and on the Z-direction side relative to the main body 220a or 220a' of the at least one first terminals 200a or 200a'. Also where the at least the second terminal 200b or 200b' is provided, the main body 220b or 220b' of the at least one second terminal 200b or 200b' may be embedded in the holding portion 120 of the body 100 by insert molding.

The lead portion 230a of the at least one first terminal 200a is only required to be externally connectable. For example, the lead portion 230a of the at least one first terminal 200a of the connector C1 or C2 may be connectable to the external circuit board B1 as in any of manners (a) to (d) described below, or alternatively may be connectable not to the external circuit board B1 but to a cable (not illustrated) in a manner (e) described below.

(a) In the at least one first terminal 200a, the lead portion 230a extends in the Y' direction, on the Y'-direction side relative to the housing portion 130 of the body 100 described above, the mounting portion 231a of the lead portion 230a also extends in the Y' direction, and the mounting portion 231a of the lead portion 230a is received from the Y-direction side in, and electrically and mechanically connected to, the at least one first electrode 10a of the external circuit board B1. In this case, the external circuit board B1 is disposed on the Y'-direction side relative to the housing portion 130 of the body 100, and the at least one first electrode 10a of the external circuit board B1 is a through-hole electrode extending through the external circuit board B1 in the Y-Y' direction.

(b) In the at least one first terminal 200a, the lead portion 230a has a generally L shape extending in the Z' direction then in the Y' direction, on the Y'-direction side relative to the housing portion 130 of the body 100, and the mounting portion 231a of the lead portion 230a extends in the Y' direction, received from the Y-direction side in, and electrically and mechanically connected to, the at least one first electrode 10a of the external circuit board B1. In this case, the external circuit board B1 has the same configuration as the that described for manner (a) described above.

(c) In the at least one first terminal 200a, the lead portion 230a may extend in the Z direction, on the Y'-direction side relative to the housing portion 130 of the body 100 described above, the mounting portion 231a of the lead portion 230a may also extend in the Z direction, and the mounting portion 231a of the lead portion 230a may be in contact from the Y-direction side with, and electrically and mechanically connected to, the at least one first electrode 10a of the external circuit board B1. In this case, the external circuit board B1 is disposed on the Y'-direction side relative to the housing portion 130 of the body 100, and the at least one first electrode 10a of the external circuit board B1 is a surface electrode on the face on the Y-direction side of the external circuit board B1.

(d) In the at least one first terminal 200a, the lead portion 230a may extend in the Z' direction, on the Y'-direction side relative to the housing portion 130 of the body 100 described above, the mounting portion 231a of the lead portion 230a may also extend in the Z' direction, and the mounting portion 231a of the lead portion 230a may be in contact from the Y-direction side with, and electrically and mechanically connected to, the at least one first electrode 10a of the external circuit board B1. In this case, the external circuit board B1 has the same configuration as the that described for manner (c) described above.

(e) In the at least one first terminal 200a, the lead portion 230a may extend in the Y' direction in the housing space 311 of the housing portion 130 of the body 100 described above, and be electrically and mechanically connectable to a cable or the like in the housing space 311. The cable or the like may be led out in the Y', Z, or Z' direction from the housing space 311 of the housing portion 130 of the body 100.

The lead portion 230b of the at least one second terminal 200b of the connector C1 or C2 can be modified similarly to the lead portion 230a described for any of manners (a) to (e) described above. The external connecting portion 620 of the at least one third terminal 600 of the connector C1 or C2 may also be modified similarly to the lead portion 230a described for any of manners (a) to (e) described above. The at least one second electrode 10b of the external circuit board B1 may be modified similarly to the at least one first electrode 10a described for any of manners (a) to (d) described above. The at least one third electrode 20 of the external circuit board B1 may be modified similarly to the at least one first electrode 10a described for any of manners (a) to (d) described above.

Where the lead portion 230a of the at least one first terminal 200a is configured as described for any of manners (a) to (d), the at least one first leg 820a and the at least one second leg 820b of the connector C1 or C2 may extend in the Y' direction from the end on the Y'-direction side of the shell body 810, and may be received from the Y-direction side in, and electrically and mechanically connected to, the at least one fourth electrode 30a and the at least one fifth electrode 30b, respectively, which are through-hole electrodes of the external circuit board B1. Alternatively, where the lead portion 230a of the at least one first terminal 200a is configured as described for any of manners (a) to (d), the at least one first leg 820a and the at least one second leg 820b of the connector C1 or C2 may extend in the X direction and the X' direction, respectively, from the Y'-direction side end of the shell body 810, and may be in contact from the Y-direction side with, and electrically and mechanically connected to, the at least one fourth electrode 30a and the at least one fifth electrode 30b, respectively, which are surface electrodes of the external circuit board B1.

The internal connecting portion 610 of the at least one third terminal 600 may be electrically and mechanically connected (fixed) to the first face 301 of the internal circuit board 300.

REFERENCE SIGNS LIST

A1, A2, A3: connector assembly
C1, C2, C3: connector
100: body; 110: connecting portion; 111: connecting space; 120: holding portion; 121a: first holding hole; 121b: second holding hole; 130: housing portion; 131: housing space; 141: first positioning portion; 142: second positioning portion; 143: third positioning portion; 150a: first receiving hole; 150b: second receiving hole; 160a: first guide groove; 160b: second guide groove; 1411: through hole
200a: first terminal; 210a: distal portion; 211a: contact portion; 220a: body portion; 221a: first portion; 222a: second portion; 223a: measurement target; 230a: lead portion; 231a: mounting portion
200b: second terminal; 210b: distal portion; 211b: contact portion; 220b: body portion; 221b: first portion; 222b: second portion; 230b: lead portion; 231b: mounting portion
300: internal circuit board; 301: first face; 302: second face; 310: first fixing hole; 320: second fixing hole; 330: electrode
400: current sensor
500: shield; 510: first plate; 520: second plate; 530: third plate 600: third terminal; 610: internal connecting portion; 620: external connecting portion
700: support member
800: shell; 810: shell body; 811: first wall; 812: second wall; 813: third wall; 820a: first leg; 820b: second leg; 830: cover
900: communication element
B1, B2: external circuit board; 10a: first electrode; 10b: second electrode; 20: third electrode; 30a: fourth electrode; 30b: fifth electrode

What is claimed is:

1. A connector comprising:
a body having an insulating property;
at least one first terminal, each first terminal of the at least one first terminal including:
  a first distal portion extending in a first direction, the first distal portion protruding from the body to one side in the first direction or being exposed from the body,
  a first lead portion externally connectable, and
  a first body portion being provided between the first distal portion and the first lead portion, extending in the first direction and in a second direction that is substantially orthogonal to the first direction, being at least partly held by the body, and including a measurement target, the measurement target extending in the first and second directions and being disposed inside the body; and
an internal circuit board fixed to the body and disposed in spaced relation to the measurement target of the at least one first terminal in a third direction, the third direction being substantially orthogonal to the first and second directions; and
at least one current sensor mounted on the internal circuit board, the at least one current sensor being disposed near the measurement target of the at least one first terminal and configured to perform a non-contact detection of a current flowing through the at least one first terminal.

2. The connector according to claim 1, wherein
the at least one current sensor is disposed in spaced relation to the measurement target of the at least one first terminal in the third direction, and is disposed so as to at least partly overlap, in the third direction, a projected area of the measurement target of the at least one first terminal.

3. The connector according to claim 2, wherein
the internal circuit board is disposed on one side in the third direction relative to the measurement target of the at least one first terminal, and
the at least one current sensor is disposed on the one side or on an other side in the third direction relative to the internal circuit board and on the one side in the third direction relative to the measurement target of the at least one first terminal.

4. The connector according to claim 2, wherein
the at least one current sensor is disposed on the one side or on the other side in the third direction relative to the internal circuit board and on the other side in the third direction relative to the measurement target of the at least one first terminal, and
the internal circuit board is disposed on the other side in the third direction relative to the measurement target of the at least one first terminal.

5. The connector according to claim 1, further comprising:
at least one shield having electrical conductivity, wherein
the at least one shield includes at least one of a first plate, a second plate, or a third plate,
the first plate is fixed to the internal circuit board and disposed in spaced relation to, and either on one side in the second direction or on the one side in the first direction relative to, the at least one current sensor and the measurement target of the at least one first terminal,
the second plate is fixed to the internal circuit board and disposed in spaced relation to, and either on an other side in the second direction or the other side in the first direction relative to, the at least one current sensor and the measurement target of the at least one first terminal, and
the third plate is contiguous with at least one of the first plate or the second plate, and is disposed in spaced relation to, and either on one side or an other side in the third direction relative to, the measurement target of the at least one first terminal.

6. The connector according to claim 1, wherein
the first lead portion of the at least one first terminal extends in the third direction or in an oblique direction,
the oblique direction includes components of an other side in the first direction and the other side in the third direction,
the first lead portion of the at least one first terminal includes a first mounting portion, and
the first mounting portion is an end portion, on the other side in the third direction, of the first lead portion and extends to the other side in the third direction or to the other side in the first direction.

7. The connector according to claim 6, wherein
in the at least one first terminal, the measurement target has a dimension in a first perpendicular direction that is larger than a dimension in a second perpendicular direction of a contact portion of the first distal portion, and larger than a dimension in a third perpendicular direction of the first mounting portion of the first lead portion,
the first perpendicular direction is substantially perpendicular to a direction in which a current flows through the measurement target of the at least one first terminal,
the second perpendicular direction is substantially perpendicular to a direction in which a current flows through the contact portion of the at least one first terminal, and
the third perpendicular direction is substantially perpendicular to a direction in which a current flows through the first mounting portion of the at least one first terminal.

8. The connector according to claim 6, further comprising at least one second terminal, each second terminal of the at least one second terminal including:
  a second distal portion extending in the first direction, the second distal portion protruding from the body to the one side in the first direction or being exposed from the body,
  a second lead portion extending in the third direction or in the oblique direction and including a second mounting portion, the second mounting portion of the second lead portion being a second end portion on the other side in the third direction of the second lead portion and extending to the other side in the third direction or to the other side in the first direction, and
  a second body portion provided between the second distal portion and the second lead portion, extending in the first and second directions, and being at least partly held by the body.

9. The connector according to claim 1, wherein
the body includes a housing portion including a housing space, the housing space extending in the second direction and opening to one side in the third direction, and
the internal circuit board is housed in the housing space from the one side in the third direction and held by the housing portion at least in the first and second directions.

10. The connector according to claim 9, wherein
the body further includes at least one positioning portion on the housing portion, the at least one positioning portion being configured to position the internal circuit board relative to the measurement target or targets of the at least one first terminal, in the third direction.

11. The connector according to claim 9, wherein
the housing portion further includes at least one through hole extending in the third direction, communicating with the housing space, and opening out from the body to the other side in the third direction,
the first lead portion of the at least one first terminal extends in the third direction,
the first lead portion of the at least one first terminal includes a first mounting portion, the first mounting portion being an end portion on the other side in the third direction of the first lead portion, extending to the other side in the third direction, and being located on the other side in the third direction relative to the body, and
the connector further comprises at least one third second terminal, each second terminal of the at least one second terminal extending in the third direction through the through hole of the body housing portion and including:
an internal connecting portion that is an end portion on the one side in the third direction of the at least one second terminal and that is connected to the internal circuit board, and
an external connecting portion that is an end portion on the other side in the third direction of the at least one second terminal and that protrudes from the through hole to the other side in the third direction.

12. The connector according to claim 11, wherein
the at least one positioning portion includes a first positioning portion abutting on the internal circuit board from the other side in the third direction, and the abutting is either directly, or indirectly via an additional member.

13. The connector according to claim 12, wherein
the at least one through hole extends through the first positioning portion in the third direction.

14. The connector according to claim 1, further comprising:
at least one second terminal, each second terminal of the at least one second terminal including:
an internal connecting portion connected to the internal circuit board, and
an external connecting portion.

15. The connector according to claim 6, further comprising a shell having electrical conductivity, the shell including:
a shell body having a generally inverted U-shape or O-shape in a cross-sectional view taken along the second and third directions and housing the body,
at least one first leg extending from the shell body to the other side in the third direction or to the one side in the second direction, and
at least one second leg extending from the shell body to the other side in the third direction or to the other side in the second direction.

16. The connector according to claim 1, further comprising at least one communication element mounted on the internal circuit board and connected to the at least one current sensor via the internal circuit board,
wherein the at least one communication element is configured to acquire a current value of a current flowing through the at least one first terminal based on an output signal of the at least one current sensor, and output the acquired current value.

17. A connector assembly comprising:
the connector according to claim 6; and
an external circuit board that is mounted with the connector and includes at least one first electrode,
wherein the first mounting portion of the at least one first terminal is connected to the at least one first electrode.

18. A connector assembly comprising:
the connector according to claim 8; and
an external circuit board that is mounted with the connector and that includes:
at least one first electrode, wherein the first mounting portion of the at least one first terminal is connected to the at least one first electrode, and
at least one second electrode, wherein the second mounting portion of the at least one second terminal is connected to the at least one second electrode.

19. A connector assembly comprising:
the connector according to claim 11; and
an external circuit board that is mounted with the connector, wherein the connector further comprises at least one third terminal, and the external circuit board includes:
at least one first electrode being at least one through-hole electrode, wherein the first mounting portion of the at least one first terminal is received in, and connected to, the at least one first electrode,
at least one second electrode being at least one through-hole electrode, wherein a mounting portion of the at least one third terminal is received in, and connected to, the at least one second electrode, and
at least one third electrode being at least one through-hole electrode, wherein the external connecting portion of the at least one second terminal of the connector is received in, and connected to, the at least one third electrode.

20. A connector assembly comprising:
the connector according to claim 15; and
an external circuit board that is mounted with the connector and that includes:
at least one first electrode, wherein the first mounting portion of the at least one first terminal is connected to the at least one first electrode,
at least one second electrode, wherein the at least one first leg is connected to the at least one second electrode, and
at least one third electrode, wherein the at least one second leg is connected to the at least one third electrode.

* * * * *